United States Patent
O'Dougherty et al.

(10) Patent No.: US 9,802,808 B2
(45) Date of Patent: Oct. 31, 2017

(54) FLUID STORAGE AND DISPENSING SYSTEMS AND PROCESSES

(71) Applicant: ENTEGRIS, INC., Billerica, MA (US)

(72) Inventors: Kevin T. O'Dougherty, Arden Hills, MN (US); Glenn M. Tom, Bloomington, MN (US)

(73) Assignee: ENTEGRIS, INC., Billerica, MA (US)

( * ) Notice: Subject to any disclaimer, the term of this patent is extended or adjusted under 35 U.S.C. 154(b) by 97 days.

(21) Appl. No.: 14/812,651

(22) Filed: Jul. 29, 2015

(65) Prior Publication Data

US 2015/0360929 A1 Dec. 17, 2015

Related U.S. Application Data

(60) Division of application No. 14/744,202, filed on Jun. 19, 2015, which is a continuation of application No.
(Continued)

(51) Int. Cl.
*B67D 7/02* (2010.01)
*F16K 35/00* (2006.01)
(Continued)

(52) U.S. Cl.
CPC ......... *B67D 7/0288* (2013.01); *B67D 7/0261* (2013.01); *B67D 7/32* (2013.01);
(Continued)

(58) Field of Classification Search
CPC ...... B67D 7/02; B67D 7/0238; B67D 7/0255; B67D 7/0261; B67D 7/0288;
(Continued)

(56) References Cited

U.S. PATENT DOCUMENTS 3,214,054 A 10/1965 Poethig et al.
3,240,399 A 3/1966 Frandeen
(Continued)

FOREIGN PATENT DOCUMENTS

CN 1161250 A 10/1997
CN 1422185 A 6/2003
(Continued)

OTHER PUBLICATIONS

U.S. Application No. 14/744,202, filed Jun. 19, 2015, inventor Kevin T. O'Dougherty.

*Primary Examiner* — J. Casimer Jacyna

(57) ABSTRACT

Fluid storage and dispensing systems and processes involving various structures methods for fluid storage and dispensing, including, pre-connect verification couplings that are usefully employed with fluid storage and dispensing packages to ensure proper coupling and avoid fluid contamination issues, empty detect systems (e.g., monitoring pressure of dispensed liquid medium to detect pressure droop conditions) useable with fluid storage and dispensing packages incorporating liners that are pressure-compressed in the fluid dispensing operation, ergonomically enhanced structures for facilitating removal of a dispense connector from a capped vessel, cap integrity assurance systems for preventing misuse of vessel caps, and keycoding systems for ensuring coupling of proper dispense assemblies and vessels. Fluid storage and dispensing systems achieve zero or near-zero headspace character, and prevent or ameliorate solubilization effects in liquid dispensing from liners in overpack vessels.

7 Claims, 53 Drawing Sheets

Related U.S. Application Data

13/149,844, filed on May 31, 2011, now Pat. No. 9,079,758, which is a continuation of application No. 11/915,996, filed as application No. PCT/US2006/021622 on Jun. 5, 2006, now abandoned.

(60) Provisional application No. 60/687,896, filed on Jun. 6, 2005.

(51) Int. Cl.
*B67D 7/32* (2010.01)
*F16K 35/02* (2006.01)
*B67D 7/34* (2010.01)
*F16L 37/08* (2006.01)

(52) U.S. Cl.
CPC ......... *B67D 7/3227* (2013.01); *B67D 7/3281* (2013.01); *B67D 7/34* (2013.01); *B67D 7/344* (2013.01); *F16K 35/00* (2013.01); *F16K 35/025* (2013.01); *F16L 37/08* (2013.01); *Y10T 29/49826* (2015.01); *Y10T 29/53* (2015.01)

(58) Field of Classification Search
CPC ...... B67D 7/0283; B67D 7/32; B67D 7/3227; B67D 7/3263; B67D 7/3281; B67D 7/329; B67D 7/34; B67D 7/344; F16L 37/08; F16L 37/084; F16L 37/086; F16K 35/00; F16K 35/02; F16K 35/022; F16K 35/025; F16K 35/027
USPC ........................................ 222/153.09; 285/38
See application file for complete search history.

(56) References Cited

U.S. PATENT DOCUMENTS

| | | |
|---|---|---|
| 3,756,367 A | 9/1973 | Mitchell et al. |
| 3,756,459 A | 9/1973 | Bannister et al. |
| 4,024,897 A * | 5/1977 | Hall .......................... B60P 3/22 137/351 |
| 4,109,677 A * | 8/1978 | Burnside ................. B60P 3/224 137/586 |
| 4,696,840 A | 9/1987 | McCullough et al. |
| 4,871,087 A | 10/1989 | Johnson |
| 5,035,339 A | 7/1991 | Meyersburg |
| 5,049,349 A | 9/1991 | McCullough et al. |
| 5,102,010 A * | 4/1992 | Osgar .................... B65D 47/36 222/1 |
| 5,129,415 A | 7/1992 | Runyon et al. |
| 5,148,945 A | 9/1992 | Geatz |
| 5,335,821 A | 8/1994 | Osgar |
| 5,356,045 A * | 10/1994 | Parks ................... B67D 1/0802 220/214 |
| 5,370,269 A | 12/1994 | Bernosky et al. |
| 5,425,404 A | 6/1995 | Dyer |
| 5,526,956 A | 6/1996 | Osgar |
| 5,555,996 A | 9/1996 | Lang-Ree et al. |
| 5,570,815 A | 11/1996 | Ramsay |
| 5,693,017 A | 12/1997 | Spears et al. |
| 5,711,354 A | 1/1998 | Siegele et al. |
| 5,750,216 A | 5/1998 | Horino et al. |
| 5,799,830 A | 9/1998 | Carroll et al. |
| 5,861,060 A * | 1/1999 | Maugans .............. B05B 5/1608 118/300 |
| 5,868,278 A | 2/1999 | Chen |
| 5,875,921 A * | 3/1999 | Osgar ..................... B67D 7/02 222/1 |
| 5,878,793 A | 3/1999 | Siegele et al. |
| 5,919,360 A | 7/1999 | Contaxis, III |
| 5,968,014 A | 10/1999 | Neftel et al. |
| 5,988,422 A | 11/1999 | Vallot |
| 6,015,068 A | 1/2000 | Osgar et al. |
| 6,021,921 A | 2/2000 | Lan et al. |
| 6,040,776 A | 3/2000 | Glover et al. |
| 6,067,906 A | 5/2000 | Ryan et al. |
| 6,077,356 A | 6/2000 | Bouchard |
| 6,168,048 B1 | 1/2001 | Xu et al. |
| 6,199,599 B1 | 3/2001 | Gregg et al. |
| 6,206,240 B1 * | 3/2001 | Osgar .................. B67D 7/0255 222/389 |
| 6,237,809 B1 | 5/2001 | Kawai et al. |
| 6,267,132 B1 | 7/2001 | Guarneri |
| 6,319,317 B1 | 11/2001 | Takamori et al. |
| 6,357,632 B1 * | 3/2002 | Salmela ................... B67D 7/02 222/334 |
| 6,360,546 B1 | 3/2002 | Wang et al. |
| 6,406,276 B1 | 6/2002 | Normand et al. |
| 6,460,404 B1 | 10/2002 | Chan et al. |
| 6,460,730 B1 | 10/2002 | Liedtke |
| 6,499,617 B1 | 12/2002 | Niedospial, Jr. et al. |
| 6,604,555 B2 | 8/2003 | Blatt et al. |
| 6,648,201 B1 | 11/2003 | Marinaro et al. |
| 6,698,619 B2 | 3/2004 | Wertenberger |
| 6,786,714 B2 | 9/2004 | Haskew |
| 6,789,699 B2 | 9/2004 | Clark et al. |
| 6,843,285 B2 | 1/2005 | Ozawa |
| 6,848,599 B2 | 2/2005 | Hammarth et al. |
| 6,942,123 B2 | 9/2005 | Wertenberger |
| 6,942,127 B2 | 9/2005 | Raats |
| 7,114,517 B2 | 10/2006 | Sund et al. |
| 7,172,096 B2 | 2/2007 | O'Dougherty |
| 7,188,644 B2 | 3/2007 | Kelly et al. |
| 7,204,950 B2 | 4/2007 | Farha et al. |
| 7,316,329 B2 | 1/2008 | Wertenberger |
| RE43,288 E | 4/2012 | Sund et al. |
| 8,322,571 B2 | 12/2012 | Hovinen et al. |
| 9,079,758 B2 | 7/2015 | O'Dougherty et al. |
| 2002/0007849 A1 | 1/2002 | Wang et al. |
| 2002/0014275 A1 | 2/2002 | Blatt et al. |
| 2003/0075566 A1 | 4/2003 | Priebe et al. |
| 2003/0080142 A1 | 5/2003 | Meheen |
| 2003/0138358 A1 | 7/2003 | Eipel et al. |
| 2003/0205285 A1 | 11/2003 | Kelly et al. |
| 2003/0205581 A1 | 11/2003 | Wertenberger |
| 2004/0011826 A1 | 1/2004 | Stradella |
| 2004/0058453 A1 | 3/2004 | Free et al. |
| 2004/0069347 A1 | 4/2004 | Graves et al. |
| 2005/0087237 A1 | 4/2005 | O'Dougherty et al. |
| 2005/0224523 A1 | 10/2005 | O'Dougherty et al. |
| 2005/0279207 A1 | 12/2005 | O'Dougherty et al. |
| 2006/0037968 A1 | 2/2006 | Brenner |
| 2006/0138177 A1 | 6/2006 | Wauters et al. |
| 2006/0163292 A1 | 7/2006 | Wauters et al. |
| 2007/0180993 A1 | 8/2007 | Byun et al. |
| 2008/0298727 A1 | 12/2008 | Edgington et al. |
| 2009/0020176 A1 | 1/2009 | Hasegawa et al. |
| 2010/0112815 A1 | 5/2010 | O'Dougherty et al. |
| 2010/0133292 A1 | 6/2010 | Ware et al. |
| 2011/0187028 A1 | 8/2011 | Menning et al. |

FOREIGN PATENT DOCUMENTS

| | | |
|---|---|---|
| CN | 1617828 A | 5/2005 |
| EP | 0 138 718 A2 | 4/1985 |
| EP | 0 971 165 A2 | 1/2000 |
| EP | 1 001 265 A2 | 5/2000 |
| EP | 2 148 771 B1 | 5/2011 |
| FR | 2902083 | 12/2007 |
| GB | 2 172 261 A | 9/1986 |
| JP | 60-013659 A | 1/1985 |
| JP | S60-139799 U | 9/1985 |
| JP | 63252538 A | 10/1988 |
| JP | 01 162352 | 6/1989 |
| JP | 05128383 A | 5/1993 |
| JP | 05253461 | 10/1993 |
| JP | 05319500 | 12/1993 |
| JP | 2006/100087 A | 4/1994 |
| JP | 06135471 | 5/1994 |
| JP | 06-247499 A | 9/1994 |
| JP | 07-315388 A | 12/1995 |
| JP | 08313324 A | 11/1996 |
| JP | 09026350 A | 1/1997 |

(56) References Cited

FOREIGN PATENT DOCUMENTS

| | | |
|---|---|---|
| JP | 09-104481 | 4/1997 |
| JP | 10189438 | 7/1998 |
| JP | 10-211451 | 8/1998 |
| JP | 2000/015082 | 1/2000 |
| JP | 2000/109195 A | 4/2000 |
| JP | 2004/140066 | 5/2004 |
| JP | 2004/534170 A | 11/2004 |
| JP | 2005/010196 A | 1/2005 |
| JP | 2005/507835 | 3/2005 |
| JP | 2007/204102 | 8/2007 |
| JP | 2009/183493 | 8/2009 |
| KR | 0136644 B1 | 1/1998 |
| KR | 2001/0066624 A | 7/2001 |
| KR | 10/0385555 | 5/2003 |
| KR | 10/0438101 | 6/2004 |
| KR | 0742282 | 7/2007 |
| KR | 101297004 | 8/2013 |
| TW | 442429 B | 6/2001 |
| TW | 445172 B | 7/2001 |
| TW | 496942 | 8/2002 |
| WO | WO 92/16304 | 10/1992 |
| WO | WO 96/01226 | 1/1996 |
| WO | WO 99/04060 | 1/1999 |
| WO | WO 00/00767 | 1/2000 |
| WO | WO 01/38835 A1 | 5/2001 |
| WO | WO 03/014380 | 2/2003 |
| WO | WO 03/066509 | 8/2003 |
| WO | WO 2004/050537 A2 | 6/2004 |
| WO | WO 2004/058425 | 7/2004 |
| WO | WO 2006/133026 | 12/2006 |
| WO | WO 2007/088661 A1 | 8/2007 |

* cited by examiner

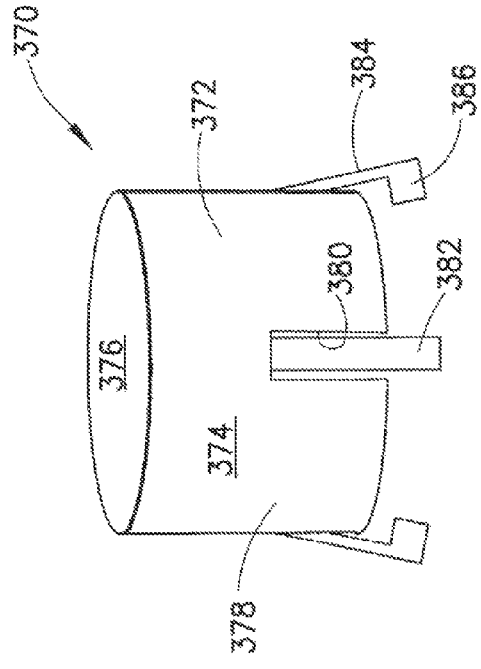
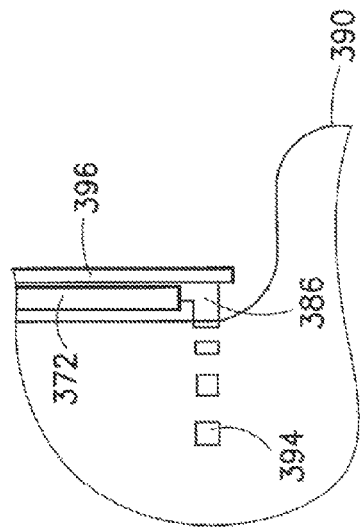
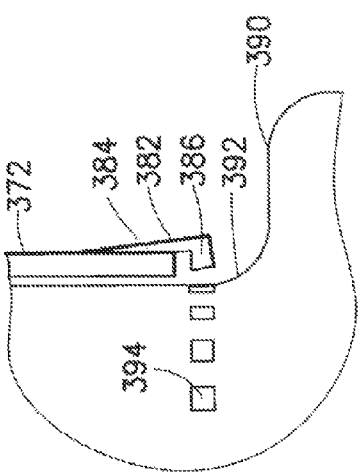

FLUID STORAGE AND DISPENSING SYSTEMS AND PROCESSES

CROSS-REFERENCE TO RELATED APPLICATIONS

This application is a divisional of U.S. patent application Ser. No. 14/744,202, filed on Jun. 19, 2015, which is a continuation of U.S. patent application Ser. No. 13/149,844, filed on May 31, 2011, now U.S. Pat. No. 9,079,758, which is a continuation of U.S. patent application Ser. No. 11/915,996 filed on Jan. 6, 2010, now abandoned, which is a 371 of PCT/US2006/021622, filed Jun. 5, 2006 which claims the benefit of U.S. Provisional Patent Application No. 60/687,896 filed on Jun. 6, 2005, all of which are incorporated herein in their entireties by reference.

FIELD OF THE DISCLOSURE

The present invention relates to fluid storage and dispensing systems and processes. Aspects of the invention, hereinafter disclosed, relate to various devices, structures and arrangements, as well as processes and methods, for fluid storage and dispensing, and include, without limitation, pre-connect verification couplings that are usefully employed in application to fluid storage and dispensing packages, to ensure proper coupling and avoid fluid contamination issues, empty detect systems that are usefully employed for fluid storage and dispensing packages incorporating liners that are pressure-compressed in the fluid dispensing operation, ergonomically enhanced structures for facilitating removal of a dispense connector from a capped vessel, cap integrity assurance systems for preventing misuse of vessel caps, and keycoding systems for ensuring coupling of proper dispense assemblies and vessels.

BACKGROUND OF THE DISCLOSURE

In the use of fluid storage and dispensing packages, the package may contain a fluid such as a high-purity reagent for use and semiconductor manufacturing. The fluid in such application in many instances is costly in character, and/or deleterious in effect if mis-dispensed. For such reason, it is desired that the reagent be conserved against any losses due to wastage, e.g., such as may occur through mis-dispensing of the fluid. Mis-dispensing of the fluid additionally may impair, or even render useless, a semiconductor device that is being manufactured. Further, many chemical reagents used in semiconductor manufacturing are very hazardous in character, e.g., being toxic, pyrophoric, corrosive or otherwise harmful in exposure to persons or processing equipment.

For these reasons, it is important for the fluid storage and dispensing package to be coupled with dispensing apparatus in a correct and reliable manner. This is particularly the case in many semiconductor manufacturing operations, where numerous chemical reagent packages are utilized in the course of wafer processing and semiconductor device fabrication, and each such fluid package is coupled to flow circuitry interconnecting the package with the semiconductor tool or other fluid-utilizing apparatus.

One type of package that has been widely utilized in the semiconductor manufacturing field is a liner-based fluid storage and dispensing package, in which a high-purity chemical reagent is contained in a flexible, polymeric liner, and the liner is disposed inside a rigid outer vessel commonly termed an "overpack." In use, a dispensing assembly including a dispense head is coupled with the liner, and pressurizing gas is flowed into the overpack. The pressurizing gas exerts compressive force on the liner and progressively collapses the liner under the applied gas pressure, to effect dispensing of fluid from the liner. The dispense head in various embodiments is configured with a dip tube that extends downwardly into liquid in the liner when the dispensing assembly is coupled to the package and connected to suitable flow circuitry for the dispensing operation. The liner after being filled with fluid is typically sealed against atmospheric or ambient contamination by a membrane seal at the mouth of the liner.

An illustrative package of the above-described type is commercially available from ATMI, Inc. (Danbury, Conn.) under the trademark NOWPAK®.

In the coupling of a dispensing assembly with a liner package, it is critical that a dispensing assembly and associated flow circuitry be interconnected with a proper fluid storage and dispensing package, for the reasons discussed hereinabove. An intrinsic problem with such coupling of supply vessel and dispensing assembly is that an incorrect coupling, i.e., connection of a wrong dispensing assembly to a supply vessel, results in contamination when the sealing membrane on the package is punctured by the dip tube of the dispense head, and it then is discovered that a wrong dispensing assembly has been utilized. This can occur even if the mis-connection is immediately discovered, e.g., by inability to engage the dispensing assembly with any complementary connection structure on the fluid package. Although package systems have been developed in which mis-coupling of the dispensing assembly and the cap on a fluid storage and dispensing vessel is electronically effected, e.g., in vessels of the type commercially available from ATMI, Inc. (Danbury, Conn., USA) under the trademark NOWTRAK®, it is desirable to prevent such mis-connections of fluid delivery components in a simple, mechanical manner in applications in which electronic monitoring and control is excessively costly, impractical or otherwise infeasible.

It would therefore be a significant advance in the art to provide a coupling that provides a pre-connect verification of the correctness of a connection, which is applicable to fluid storage and dispensing packages of the foregoing type, to avoid circumstances in which dispensing equipment is contaminated with fluid from an incorrectly selected package.

Another issue of significance in the use of liner-based fluid storage and dispensing packages of the above-describe type, is the need to dispense as much of the fluid contents of the liner as possible, so that the fluid, which as discussed above may be costly in character, is efficiently utilized, without significant amounts of fluid being left in the liner at the conclusion of the dispensing operation.

In the original filling of liner packages, fluid conventionally is charged to the liner in a manner producing a nominal headspace that may for example be on the order of 5% of the interior volume of the liner, to accommodate expansion of the fluid during the subsequent storage and transport of the package. The headspace thereby provides a small volume of extraneous gas, e.g., air or other ambient gas, above the fluid in the liner. Although small in volume, this headspace gas is deleterious to the contained fluid.

A primary disadvantage of the headspace gas is that when the liner is subjected to external pressure in the dispensing operation, the resultingly compressed headspace gas solubilizes in the contained fluid to produce dissolved gas therein, in accordance with Henry's Law. The dissolved gas subsequently comes out of solution as the dispense pressure drops along the dispense train in the dispensing operation. This liberation of dissolved gas causes irregular and variable dispense profiles of the chemical reagent, e.g., a photoresist that is being flowed to a semiconductor manufacturing tool in a semiconductor manufacturing operation, resulting in the formation of potentially severe wafer defects, bubble formation on surfaces and subsequent popping of such bubbles, etc. Thus, the presence of significant headspace in the liner entails significant adverse consequences along the entire extent of the fluid delivery path including the final use of the fluid in the process system.

Despite this disadvantageous effect, headspace gas nonetheless has continued to be employed due to its utility as a "measuring fluid" in determining the approach to exhaustion of the fluid inventory in the liner during the latter stages of the dispensing operation. In the dispensing of liquid from a liner-based package containing headspace gas, the exhaustion of fluid from the liner causes headspace gas to be drawn into the suction train of the dispensing flow circuitry, and this entrainment of headspace gas results in the appearance of bubbles in the downstream liquid flow. Initial bubble appearance of the headspace gas is detected in the liquid flow and provides a useful indication that the liquid in the liner is approaching depletion.

The foregoing phenomenon has been usefully exploited in the provision of "first bubble" detectors for dispensing systems utilizing liner-based packages, in conjunction with the use of buffering reservoirs, to provide for continuity of fluid supply to the downstream tool or other location of use.

In such systems, the "first bubble" empty detector, upon sensing of the initial bubble, triggers the flow of a transitional supply of fluid from the buffering reservoir, so that the fluid-utilizing process is not interrupted, and can progress to completion. The reservoir may for example provide a volume on the order of 50 mL up to 200 mL or even more, of a photoresist material, so that when the liner-based package of photoresist material approaches depletion, as indicated by the appearance of the initial bubble in the downstream liquid, the supplemental volume of the buffering reservoir is tapped to provide sufficient fluid to finish a boat of wafers to which photoresist is being applied.

The "first bubble" sensing method of empty detection has proven reliable, but is associated with the inherent disadvantages of headspace gas becoming solubilized in the liquid in the liner and subsequently being released from the liquid during the dispensing operation, since such efflux of gas may give a premature indication of exhaustion of liquid from the liner, thereby preventing maximum utilization of liquid from the liner from being achieved, as well as interfering with the operation of downstream process equipment.

Accordingly, it would be a significant advance in the art to provide an empty detect system suitable for application to liner-based fluid storage and dispensing packages, which avoids the need for headspace gas, and concurrently provides an efficient and reliable detection of an approaching empty state of the liner package, with sufficiently early warning of such impending empty condition to accommodate switch-in of a fresh package of fluid for continued dispensing, without the requirement of an oversized buffering reservoir for providing continuity of fluid supply to the downstream fluid-utilizing location or facility.

Apart from the foregoing fluid inventory management issues, liner-based fluid storage and dispensing packages of the so-called "bag-in-drum" (BID), "bag-in-can" (BIC) and "bag-in-bottle" (BIB) types are in use, which engage with a dispensing assembly. An illustrative dispensing assembly for such purpose is the SMARTPROBE® connector commercially available from ATMI, Inc., Danbury, Conn., USA, and), which includes a dispense head (connector body) from which downwardly depends a dip tube that is inserted through a sealing membrane, termed a breakseal, in a fitment associated with the cap port of the liner package. After penetrating the membrane, the dip tube thereafter is in contact with the liquid in the liner, to effect dispensing when a pump is coupled with the dispense head. After breaking the membrane seal, pivot clamps associated with the dispense head are locked into place in order to securely position the dispense head on the liner overpack.

In order to subsequently remove the SMARTPROBE® from the fluid package, the user must press in the pivot clamps and exert upward force on the connector body, while concurrently holding the fluid package in place. Users having small hands generally experience difficulty in this disassembly procedure, particularly in pressing in the pivot clamps. Additionally, it is very difficult to break the static seal of the O-rings. Even after the static seal has been broken, the O-rings not infrequently catch on the breakseal. These factors, taken together, adversely impact the ease of use of such liner-based fluid storage and dispensing packages.

It would therefore be a significant advance to provide a SMARTPROBE®-type dispense assembly that is ergonomically enhanced in design, to obviate the foregoing difficulties.

Further, considering the shortcomings involved in prior use of liner-based fluid storage and dispensing packages, various problems are encountered with so-called breakseal or membrane elements that are pierced by the probe of the dispensing assembly when the connector is brought into engagement with the cap of the vessel.

First, breaking through the currently employed breakseal with the dispense probe produces particles that are carried into the contained chemical by the probe, thereby compromising the purity of the contained fluid. Second, the currently employed breakseal does not allow for material changes to match the needs of the chemical in the liner. Third, the currently employed breakseal does not allow vessels to be easily resealed for disposal. Fourth, the currently employed breakseal requires high force to insert the probe connector assembly, since the probe must pierce the membrane seal, which may entail resistance to the engagement of the connector with the vessel. Fifth, the seal integrity of the currently employed breakseal can be compromised by plastic creep induced relaxation of the seal clamping force.

For these reasons, a breakseal structure that would overcome such deficiencies would be a substantial advance in the use and reliability of breakseal-equipped vessels for fluid storage and dispensing.

In the use of liner-based fluid storage and dispensing packages, the dispense probe is inserted into a fluid in the liner, through a closure cap. In such packages, it is intended that the user not open the container, by removal of the cap. In some instances, due to inadequate training or accident, caps are unscrewed from containers with the probe still installed. This creates difficulties in removing the cap from the probe body and exposes the probe to contaminants, as well as providing the potential for subsequent mis-connection if the probe body and attached cap are then coupled with another container.

In various specific embodiments of the cap and probe, the cap and probe are key coded with respect to one another, to prevent insertion of a probe into an incorrect fluid storage and dispensing vessel. In certain instances, the cap and probe have been twisted off the vessel at the same time, rather than depressing pivot clamps at the side of the connector to permit the connector to be pulled upwardly and removed from the cap, and thereafter unscrewing the cap from the vessel.

It therefore would be a significant improvement to provide a closure cap for a liner-based fluid storage and dispensing package, in which the cap cannot be unscrewed from the vessel when the dispense probe has been inserted.

A further deficiency associated with the cap utilized in current liner-based fluid storage and dispensing packages relates to the pressurization opening in the cap, through which pressurizing gas is introduced into the vessel containing the liner, to exert pressure on the exterior surface of the liner, and thereby achieve pressure-mediated dispensing of fluid contained in the liner. Such pressurization opening in the cap is sealed by a tear tab, and removal of the tear tab to expose the opening for gas introduction frequently produces rough edges at the pressurization opening, due to the tear tab removal process. These rough edges in turn cause leaks to the O-ring seal of the dispense nozzle of the dispensing assembly.

In some instances of use of keycoded caps and probes in liner-based fluid storage and dispensing systems, users have been known to switch caps in order to defeat the keycode system, and occurrence that could lead to damage or destruction of products manufactured using fluid from such systems. As a result, it is desirable for caps of such systems to have a locking feature to prevent such switching, but which will still allow removal of the cap and replacement of same with a new cap when absolutely necessary. Such necessity may result from an incorrect keycoding of a fluid reagent by a chemical supplier, or performance of specialty chemical and process trials in which keycodes are not assigned, or accidental damage to a cap requiring its replacement.

In addition, the widespread commercial acceptance of the liner-based fluid storage and dispensing packages for high purity chemical reagents has resulted in a proliferation of such packages of varying types. Such multiplication of varieties of fluid packages also makes it necessary to provide packaging that prevents the mis-connection of caps to fluid storage and dispensing vessels that are inappropriate for such caps.

SUMMARY OF THE DISCLOSURE

The present invention relates to fluid dispensing systems and processes.

The invention relates in one aspect to a pre-connect verification coupling, comprising a first coupling body, a ring including a first keycode structure and interlock, and a second coupling body including a second keycode structure, the ring being cooperative with the first coupling body to allow translational movement of the body against the ring in a post-verification coupling with the second coupling body, with the interlock preventing such translational movement prior to verification coupling of the first keycode structure with the second keycode structure.

In another aspect, the invention relates to a fluid storage and dispensing package, comprising a fluid storage and dispensing vessel and a fluid dispensing assembly adapted for connection to flow circuitry, said fluid storage and dispensing package comprising a pre-connect verification coupling as described above, in which the fluid dispensing assembly includes the first coupling body and the ring, and the fluid storage and dispensing vessel has a cap thereon, wherein the cap includes the second coupling body.

Yet another aspect of the invention relates to a pre-connect verification coupling including a first coupling body and a ring cooperative therewith to allow a translational movement of the body against the ring in a post-verification coupling with a second coupling body including second keycode structure, wherein the ring includes a first keycode structure and an interlock preventing such translational movement prior to verification coupling of the first keycode structure with the second keycode structure.

A further aspect of the invention relates to a fluid supply system including a liner-based fluid storage and dispensing package coupled with flow circuitry for delivery of fluid from a liner in said package to a location of use, wherein the liner-based fluid storage and dispensing package is coupled with a source of pressurizing gas for delivery of pressurizing gas into the package to exert pressure on the liner for pressure-mediated dispensing of fluid from the liner into said flow circuitry, a pressure transducer adapted to sense pressure of fluid dispensed from the liner into said flow circuitry and produce a transducer output indicative of the said pressure, and a processor adapted to receive said transducer output and determine rate of change of pressure of said fluid and provide a processor output indicative of an increased rate of change correlative to onset of exhaustion of fluid in the liner.

In another aspect, the invention relates to a fluid supply system comprising a liner-based fluid storage and dispensing package including a liner adapted to contain a liquid medium, a pressurized gas source adapted to exteriorly exert on the liner a gas pressure for pressure-mediated dispensing of liquid medium from the liner, and a monitor adapted to monitor pressure of liquid medium dispensed from the liner and adapted to output a monitor output signal indicative of a pressure droop condition indicating onset of exhaustion of liquid medium from the liner.

Yet another aspect of the invention relates to a method of achieving a zero or near-zero headspace condition in a liner of a fluid storage and dispensing package in which dispensing is carried out with imposition of pressure on the liner for progressive compaction thereof to discharge fluid from an interior volume of the liner through a discharge passage of a probe coupled with the liner, in which the probe is a stubby probe having a terminus including an opening to the discharge passage, and the terminus of the stubby probe is disposed in an upper portion of the interior volume of the liner for removal of headspace gas prior to discharge of fluid from the liner.

A still further aspect of the invention relates to a method of supplying fluid to a location of use from a liner-based fluid storage and dispensing package including a liner holding said fluid, the method comprising applying exterior pressure to the liner to progressively collapse the liner and dispense fluid therefrom, and monitoring pressure of the dispensed fluid during operation to generate an output signal indicative of a pressure droop condition indicating onset of exhaustion of fluid from the liner.

In a further aspect, the invention relates to a method of supplying a fluid from a collapsible liner subjected to pressure to effect dispensing of the fluid, such method including monitoring pressure of the dispensed fluid as a function of time, and determining slope droop of the pressure-time function as indicative of a predetermined approach to exhaustion of fluid from the liner.

In a further embodiment, the invention relates to a fluid storage and dispensing system, including a fluid storage and dispensing vessel adapted for holding fluid in an interior volume thereof, said vessel having a port opening, a cap engaged with said port opening for sealing thereof, and a dispense assembly including a connector engageable with the cap, to access fluid in the vessel for dispensing thereof through the dispense assembly, such connector including at least one engagement member engageable with the cap to lockingly retain the connector in position for dispensing, and a manually graspable member coupled with at least one engagement member and manually translatable between a first biased position (down position) at which such at least one engagement member lockingly retains the connector in position for dispensing, and a second release position (up position) at which such at least one engagement member is disengaged from the cap to prevent removal of the connector from the cap.

Another aspect of the invention relates to a method of storing and dispensing fluid, comprising use of a fluid storage and dispensing system of the invention.

A further aspect of the invention relates to a fitment seal, comprising a main disk-shaped body and a cylindrical sealing wall depending downwardly therefrom at a radius less than radius of the main disk-shaped body, whereby the main disk-shaped body forms a peripheral flange, the main disk-shaped body having a main top surface and an annular boss extending upwardly from said main top surface and forming a corresponding well in a center portion of said main disk-shaped body.

In another aspect, the invention relates to a cap adapted for locking engagement with a container having an array of circumferentially spaced-apart locking cavities on a neck of the container, said cap comprising a main cap body including a cylindrical sidewall, and a circular top wall joined to said cylindrical sidewall at an upper end thereof, said cylindrical sidewall having a series of circumferentially spaced-apart cut-outs at a lower portion of said sidewall, each cut-out having joined thereto at an upper end of the cut-out a downwardly depending anti-rotation finger element, each said finger element comprising an elongate strip joined at an upper end thereof to the upper end of the cut-out, and joined at a lower end thereof to a radially inwardly directed lug adapted to engage with one of said locking cavities when over-fit by a connector adapted for engagement with said cap.

Yet another aspect of the invention relates to a fluid storage and dispensing package, comprising a container adapted to hold fluid, said container having an array of circumferentially spaced-apart locking cavities on the neck of the container, and a cap adapted for locking engagement with said container, said comprising a main cap body including a cylindrical sidewall, and a circular top wall joined to said cylindrical sidewall at an upper end thereof, said cylindrical sidewall having a series of circumferentially spaced-apart cut-outs at a lower portion of said sidewall, each cut-out having joined thereto at an upper end of the cut-out a downwardly depending anti-rotation finger element, each said finger element comprising an elongate strip joined at an upper end thereof to the upper end of the cut-out, and joined at a lower end thereof to a radially inwardly directed lug adapted to engage with one of said locking cavities when over-fit by a connector adapted for engagement with said cap.

A further aspect of the invention relates to a method of preventing removal of a cap, along with a connector, from a container of a fluid storage and dispensing package, including said container, said cap and said connector, said method comprising providing said container with locking cavities at a neck region of the container, and providing said cap has comprising a main cap body including a cylindrical sidewall, and a circular top wall joined to said cylindrical sidewall at an upper end thereof, said cylindrical sidewall having a series of circumferentially spaced-apart cut-outs at a lower portion of said sidewall, each cut-out having joined thereto at an upper end of the cut-out a downwardly depending anti-rotation finger element, each said finger element comprising an elongate strip joined at an upper end thereof to the upper end of the cut-out, and joined at a lower end thereof to a radially inwardly directed lug adapted to engage with one of said locking cavities when over-fit by the connector.

In another aspect, the invention relates to a cap adapted for engagement with a fluid storage and dispensing container, and for engagement with a dispensing assembly including a dispense connector adapted to cooperatively overfit the cap, said cap having an outward protrusion element at a lower portion thereof engageable with locking structure on the fluid storage and dispensing container.

Another aspect of the invention relates to a fluid storage and dispensing package, comprising a container adapted for holding fluid, said container including a port and locking structure on a surface of the container, and a cap adapted for engagement with said port, wherein said cap is adapted for engagement with a dispensing assembly including a dispense connector adapted to cooperatively overfit the cap, said cap having an outward protrusion element at a lower portion thereof engageable with said locking structure when said dispense connector overfits said cap.

In a further aspect, the invention relates to a fluid storage and dispensing package, comprising a container adapted for holding fluid, said container including a port and a first locking structure on a surface of the container, and a cap adapted for engagement with said port, wherein said cap is adapted for engagement with a dispensing assembly including a dispense connector adapted to cooperatively overfit the cap, said cap having a second locking structure at a lower portion thereof engageable with said locking structure when said dispense connector overfits said cap, and wherein said second locking structure is non-engageable with the first locking structure when said dispense connector does not overfit said cap.

A further aspect of the invention relates to a fluid storage and dispensing package, comprising a container adapted for holding fluid, said container including a port, and a cap adapted for engagement with said port, wherein said cap is adapted for engagement with a dispensing assembly including a dispense connector adapted to cooperatively overfit the cap, said cap having a locking structure that is operative when said dispense connector overfits said cap, and that is de-actuatable when said dispense connector does not overfit said cap.

Still another aspect of the invention relates to a fluid storage and dispensing package, comprising a container including a port, a liner in said container adapted for holding fluid, a fitment including an opening for fluid egress, coupled to said liner and to said port, and a cap adapted for engagement with said port, wherein said cap is additionally adapted for engagement with a dispensing assembly including a dispense connector adapted to cooperatively overfit the cap for withdrawal of fluid from the liner when pressure is exteriorly exerted on said liner, said dispense connector being adapted for connection to pressurizing gas for flow of the pressurizing gas into the container for exterior exertion of pressure on liner, a gas seal element positioned between the cap and the fitment to seal against the pressurizing gas in the container, and a plug seal to prevent fluid escape from the liner at the fitment.

In another aspect, the invention relates to a fluid storage and dispensing package, comprising a container adapted for holding fluid, said container including a first engagement structure, a cap adapted for engagement with said container, a code ring engageable with said cap to form a cap/code ring assembly, wherein said cap/code ring assembly is adapted for engagement with a dispensing assembly including a dispense connector adapted to cooperatively overfit the cap/code ring assembly for withdrawal of fluid from the container, wherein the cap/code ring assembly includes second engagement structure engageable with said first engagement structure, to fixedly position the cap/code ring assembly on the container and oppose removal thereof.

A still further aspect the invention relates to a cap including threading for connection thereof to a container having a complementary threading, said cap including non-reuse structure rendering the cap non-reusable subsequent to initial engagement of the cap with the container, said non-reuse structure adapted to deform, destroy or remove said threading upon attempted or effected removal of the cap from the container subsequent to said initial engagement, wherein said non-reuse structure is selected from the group consisting of: toothed locks that cut or tear the area above the threading; arrangements in which attempted removal of the cap results in ripping or destruction of threads; two-piece caps that thread on the neck of the vessel with a detent stop, whereby the threads peel off under high torque when the cap is removed; screw-on caps with anti-rotation features that prevent the cap from being unscrewed; arrangements in which the cap has a tear area above the thread that is activated by unscrewing, in which the remaining threaded area is removed by pulling a vertical tear tab; two-piece threading; tear-off threading; helical threadings that unscrew themselves; and threading on the cap which is additionally formed over large features on the container neck, whereby the cap threading is destroyed when the cap is removed from the container.

Another aspect of the invention relates to a cap including threading for connection thereof to a container having a complementary threading, said cap including a cap modification to prevent removal and/or reuse of the cap, wherein said cap modification is selected from the group consisting of: provision of caps with clips that require a tool to press them into position, wherein the cap when the clip is pressed into position is able to be installed or removed in a ready manner; provision of pins holding the cap in place, with a removal tool being adapted to withdraw the pins out of the position securing the cap; provision of a screw-on cap with pressed-in pins to prevent unscrewing of the cap, wherein the pins can only be removed with a special tool in order to unscrew the cap; provision of a screw-on cap with anti-rotation lock, wherein the code ring must be removed to unlock the cap, and wherein the lock includes pins that must be pulled up or tabs that must be squeezed together to release the lock; provision of a screw-on cap with an anti-rotation lock, in which the code ring must be removed to unlock the cap, wherein the anti-rotation lock is a ratchet type, with teeth on the cap and teeth on the vessel, whereby high torque is required to remove the cap, using a special tool; use of a code ring torque tool having grab features are torque on only; provision of a second ring on the cap to attach the cap to the vessel, wherein the ring breaks off when the cap is removed; provision of a snap-on cap with a tear tab to remove the cap, wherein the cap will not lock on once the tear tab is removed; provision of a tear ring that snaps over, wherein the snap is at the tear ring; provision of a snap-on cap that requires a special tool to cut it off the vessel; provision of a shrink cap or wrap, which is heat activated or wet-to-dry activated; provision of a non-threaded cap that is formed over features on the vessel neck, wherein interference between the vessel features and the cap retains the cap in position, so that the cap is removable only with a tool or otherwise by prying it off, and removal of the cap rips off the formed areas of the cap, so that part of the cap remains on the vessel and can be removed with a special tool or vertical tear tab; provision of a cap constructed and arranged so that cap removal alters the code ring so that the cap will not work with the dispense probe again; provision of a code ring that is cut by the installation of the dispense probe, so that the code ring falls off when the dispense probe is removed; provision of a magnetic structure that is broken off when the dispense probe is removed; fabrication of the vessel with a feature that mates with the recess in the cap, so that when the cap is removed, the vessel feature breaks off and becomes lodged in the cap recess, and the cap then cannot be used with a new vessel; fabrication of a cap with break-off tabs that hold the cap in position on the vessel and slide down complementary grooves in the vessel when installed, and break off when the cap is removed; fabrication of a cap with a built-in dye release mechanism operating to release dye when the cap is removed; fabrication of the cap with a security-type tag that breaks upon removal of the cap, so that empty vessels bearing broken tags will evidence misuse; and provision of radio-frequency identification (RFID) integrated circuit chips on caps or other components of an associated package, e.g., an overpack, liner, etc., in conjunction with monitoring software that prevents an operator from switching caps.

A further aspect of the invention relates to a fluid storage and dispensing system adapted for coupling with a fluid-utilizing tool by flow circuitry therebetween, said system including a liner-based fluid storage and dispensing package adapted for pressure-mediated dispensing of fluid from a liner in the package, and said flow circuitry containing a filter, a pump, and a pressure transducer arrange to monitor pressure of dispense fluid, and to actuate a controller adapted to modulate dispensing operation, wherein said pressure transducer is positioned in said flow circuitry at a fluid inlet to the fluid-utilizing tool.

In respect of various apparatus, assemblies and systems of the invention, as hereinafter more fully described, it will be appreciated that the invention farther encompasses various components, parts, subassemblies and sub-systems, within the scope of inventive aspects of such apparatus, assemblies and systems.

Further, it will be appreciated that although various embodiment in aspects of the invention are hereafter described in application to liner-based fluid storage and dispensing packages, such aspects are not limited in utility, but are variously susceptible to being implemented in containers, vessels and packages of other types, e.g., glass bottles, metal cans, wax-coated cellulosic containers, dewars, ampoules, film-sealed packages, etc.

Yet another aspect of the invention relates to a method of supplying a fluid from a collapsible liner subjected to pressure to effect dispensing of the fluid, said method including monitoring pressure of the dispensed fluid as a function of time, and determining pressure slope droop of the pressure-time function as indicative of a predetermined approach to exhaustion of fluid from the liner, and at said predetermined approach to exhaustion of fluid from the liner, imposing a pressure spike on the liner to effect further dispensing of fluid from the liner.

In a further aspect, the invention relates to a dispensing assembly for coupling with a cap of a fluid storage and dispensing vessel, comprising a connector body, a handle mounted on the connector body for pivotable movement thereon from a first position at which the connector body is in a locked position on said cap, to a second position at which the connector body is releasable by upward pull of the handle, clamps mounted on the connector body and adapted for movement between a first position at which the clamps lockingly engage the cap, and a second position at which the clamps release the cap, said handle at ends thereof being coupled with cams engageable with the clamps in the first position of the handle and the first position of the clamps, and disengaged from the clamps in the second position of the handle and the second position of the clamps.

The invention in another aspect relates to a connector for a material storage and dispensing package, comprising a main body portion, including a handle mounted on the main body portion and pivotally translatable thereon, between an up position, and a down position, wherein the connector is adapted to be coupled with a material storage and dispensing vessel for closure thereof, and the connector includes a dispensing assembly for dispensing material from the vessel, and a pressure relief device operatively coupled with the handle and adapted when the handle is in the down position to prevent removal of the connector from the material storage and dispensing vessel, and a stop element operatively coupled with the pressure relief device to maintain the handle in the down position when the handle is pivotally translated to such down position, the stop element being selectively disengageable to cause the pressure relief device to vent the vessel to an ambient pressure, and to allow the handle to be pivotally translated upwardly, and with the connector thereafter being disengageable from the vessel when the handle is in the up position, whereby disengagement of the connector from the vessel is enabled to occur at said ambient pressure.

A further aspect of the invention relates to a material storage and dispensing package, comprising a material storage and dispensing vessel, and a connector as described in the preceding paragraph, coupled with the vessel for closure thereof.

A still further aspect of the invention relates to a method of storage and dispensing of material, in which the material is disposed in a vessel, and a connector is coupled with the vessel, to form a containment package, wherein the connector includes a handle that is translatable between a first locking position in which pressure in the vessel is contained, and a second position in which the connector is removable from the vessel without difference in pressure between the vessel and an ambient environment of the package, such method including selectively depressurizing the vessel while the handle is in the first position, to enable the handle to be translated from the first locking position to the second position.

Other aspects, features and embodiments of the invention will be more fully apparent from the ensuing disclosure and appended claims.

BRIEF DESCRIPTION OF THE DRAWINGS

FIG. 25 is a schematic perspective view of a cap for a fluid storage and dispensing package, featuring anti-rotation structure on the side wall of the cap.

FIG. 26 is a schematic view of a fluid storage and dispensing vessel and associated cap structure matably engageable therewith.

FIG. 27 is a schematic view of a fluid storage and dispensing vessel and associated cap structure and connector body structure, showing the cooperative character thereof.

DETAILED DESCRIPTION OF THE FIGURES

The disclosures of the following patents and pending applications are hereby incorporated by reference, in their entirety, for all purposes:

U.S. Patent Application Publication No. 2009/0212071 published Aug. 27, 2009 in the name of Glenn M. Tom, et al. for "Material Storage and Dispensing Packages and Methods;"

U.S. Patent Application Publication No. 2009/0314798 published Dec. 24, 2009 in the name of Minna Hovina, et al. for "Liner-Based Liquid Storage and Dispensing Systems with Empty Detection Capability;"

U.S. Provisional Patent Application No. 60/674,577 filed Apr. 25, 2005 in the name of Weihua Wang, et al. for "Apparatus and Process for Storage and Dispensing of Chemical Reagents and Compositions;"

International Patent Application Publication No. WO 2006/116428 published Nov. 2, 2006 in the name of Weihua Wang, et al. for "Apparatus and Process for Storage and Dispensing of Chemical Reagents and Compositions;" and U.S. Pat. No. 6,879,876 issued Apr. 12, 2005 in the names of Kevin O'Dougherty, et al. for "Liquid Handling System with Electronic Information Storage."

The present invention relates to fluid dispensing systems and processes. In various aspects, the invention relates to a pre-connect verification coupling that is usefully employed in fluid storage and dispensing packages, to ensure proper coupling and avoid fluid contamination issues, as well as to an empty detect system that is usefully employed for liner-based fluid storage and dispensing packages that are pressure-compressed in the fluid dispensing operation.

Figure 1:
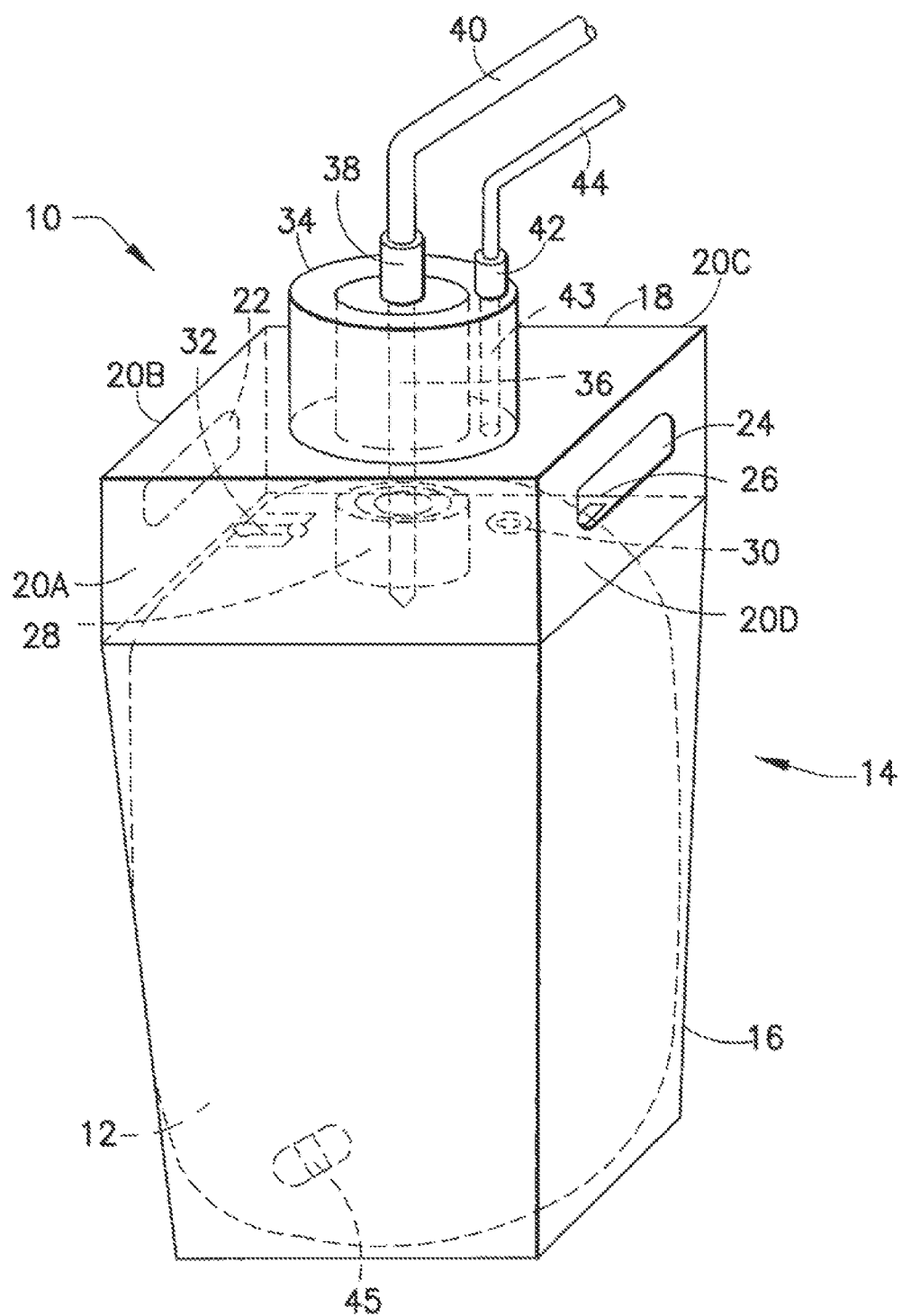
FIG. 1 is a perspective view of an illustrative liner-based fluid storage and dispensing package to which the pre-connect verification coupling of the invention is applicable.

Referring now to the drawings, FIG. 1 is a perspective view of one illustrative liner-based fluid storage and dispensing container 10 to which the pre-connect verification coupling of the invention is applicable.

The container 10 includes a flexible, resilient liner 12 capable of holding liquid, e.g., a high purity liquid (having a purity of >99.99% by weight) in a generally rigid housing 14. The liner 12 may have any suitable conformation, and can be formed with an open head or a closed head structure, and can be provided as a 2-dimensional liner structure or alternatively as a 3-dimensional liner structure.

The liner 12 may for example be formed as a 3-dimensional, closed head liner. The term "3-dimensional" in reference to the liner means that the liner is formed from tubular stock material, as opposed to a 2-dimensional liner formed by heat-sealing superimposed flat sheet stock pieces at superimposed edges thereof to form the liner structure. In the use of a tubular stock that is retained in tubular form and not slit or cut, e.g., a blown tubular polymeric film material retained in tubular form, heat seals and welded seams along the sides of the liner are avoided. The absence of side welded seams may be preferred in some instances to enable the liner to better withstand forces and pressures that may tend to stress the liner and cause failure of seams in 2-dimensional liners. A closed-head liner is a liner that has a sealed or otherwise closed head portion, as opposed to an open head liner that is formed with a neck opening or a port opening on the head portion of the liner.

It will be appreciated that the minor may be formed by any of a variety of suitable forming techniques. For example, as mentioned, a blown film can be retained in tubular form to form the liner. Alternatively, the blown film can be cut to yield constituent sheet or web-form panels or liner precursor structures. As a still further alternative, sheets of a film material may be fabricated to form 3-dimensional liner structures using gussets and other techniques to form fit the resulting liner article to the overpack. Thus, various form-fitting conformations of the liner may be employed, which are adapted to the shape and size of the overpack or other containment vessel in which the liner is disposed.

The liner in a specific embodiment may be a single-use, thin membrane, 3-dimensional, closed head liner, whereby the liner 12 can be removed after each use (e.g., when the container is depleted of the liquid contained therein) and replaced with a new, clean liner to enable the reuse of the overall container 10.

The liner film preferably is free of components such as plasticizers, antioxidants, fillers, etc. that may be or become a source of contaminants, e.g., by leaching into the liquid contained in the liner, or by decomposing to yield degradation products that have greater diffusivity in the liner film and that migrate to the surface and solubilize or otherwise become contaminants of the liquid in the liner.

The liner may be formed of any suitable material of construction, and preferably is formed of a polymeric film. In high purity fluid containment applications, the liner may be formed of a suitable fluoropolymer material, such as for example polytetrafluoroethylene (PTFE), fluorinated ethylene propylene (FEP), or perfluoroalkoxy (PFA). Alternatively, the liner may be formed of an olefinic polymer. As a still further alternative, the liner may be formed of a copolymer including any suitable monomeric constituents. The liner film may be a single-ply film, or may be formed as a multi-layer laminate or a composite film material, e.g., being coextruded, calendared, or otherwise fabricated with multiple layers or components, e.g., as a multi-layer laminate including one or more intermediate adhesive layers, etc.

Preferably, a substantially pure film is utilized for the liner, such as virgin (additive-free) polyethylene film, virgin polytetrafluoroethylene (PTFE) film, or other suitable virgin polymeric material such as polypropylene, polyurethane, polyvinylidene chloride, polyvinylchloride, polyacetal, polystyrene, polyacrylonitrile, polybutylene, etc. The thickness of the liner film material can be any suitable thickness, e.g., in a range of from about 1.5 mils (0.0015 inch; 0.0381 mm) to about 30 mils (0.030 inch; 0.762 mm). In one embodiment, the liner has a thickness of 20 mils (0.020 inch; 0.508 mm).

A 3-dimensional, closed head liner can be formed in any suitable manner, but preferably is manufactured using tubular blow molding of the liner with formation of an integral fill opening at an upper end of the vessel, which may, as shown in FIG. 1, be joined to a port or cap structure 28. The liner thus may have an opening for coupling of the liner to a suitable connector for fill or dispense operations involving respective introduction or discharge of fluid. The cap joined to the liner port may be manually removable and may be variously configured, as regards the specific structure of the liner port and cap. The cap also may be arranged to couple with a dip tube for introduction or dispensing of fluid.

The liner 12 includes 2 ports in the top portion thereof, as shown in FIG. 1. The liner is disposed in a substantially rigid housing or overpack 14, which can be of a generally rectangular parallelepiped shape as illustrated, including a lower receptacle portion 16 for containing the liner 12 therein, and an upper stacking and transport handling section 18. The stacking and transport handling section 18 includes oppositely facing front and rear walls 20A and 20C, respectively, and oppositely facing side walls 20B and 20D. The oppositely facing side walls 20B and 20D have manual handling openings 22 and 24, respectively, to enable the container to be manually grasped, and physically lifted or otherwise transported in use of the container. Alternatively, the overpack can be of a cylindrical form, or of any other suitable shape or conformation.

The lower receptacle portion 16 of the housing 14 is as shown slightly tapered. All of the four walls of the lower receptacle portion 16 are downwardly inwardly tapered, to enable the stacking of the containers for storage and transport, when a multiplicity of such containers are stored and transported. In one embodiment, the lower portion 16 of housing 14 may have tapered walls whose taper angle is less than 15°, e.g., an angle between about 2° and 12°.

The generally rigid housing 14 also includes an overpack lid 26, which is leak-tightly joined to the walls of the housing 14, to bound an interior space in the housing 14 containing the liner 12, as shown.

The liner has two rigid ports, including a main top port coupling to the cap 28 and arranged to accommodate passage therethrough of the dip tube 36 for dispensing of liquid. The dip tube 36 is part of the dispensing assembly including the dip tube, dispensing head 34, coupling 38 and liquid dispensing tube 40. The dispensing assembly also includes a gas fill tube 44 joined to dispensing head 34 by coupling 42 and communicating with a passage 43 in the dispensing head. Passage 43 in turn is adapted to be leak-tightly coupled to the interior volume port 30 in the overpack lid 26, to accommodate introduction of a gas for exerting pressure against liner 12 in the dispensing operation, so that liquid contained in liner 12 is forced from the liner through the interior passage of the hollow dip tube 36 and through the dispensing assembly to the liquid dispensing tube 40.

The liner 12 advantageously is formed of a film material of appropriate thickness to be flexible and collapsible in character. In one embodiment, the liner is compressible to about 10% or less of the rated fill volume, i.e., the volume of liquid able to be contained in the liner when same is fully filled in the housing 14. The liner should also possess suitable barrier properties for the specific application in which it is utilized, to prevent gas from permeating into the fluid in the liner from the ambient environment, e.g., the gas volume within the overpack that is exterior to the liner. Preferred liner materials are sufficiently pliable to allow for folding or compressing of the liner during shipment as a replacement unit. The liner preferably is of a composition and character that is resistant to particle and microbubble formation when liquid is contained in the liner, and that is effective to maintain purity for the specific end use application in which the liquid is to be employed, e.g., in semiconductor manufacturing or other high purity-critical liquid supply application.

For semiconductor manufacturing applications, the liquid contained in the liner 12 of the container 10 should have less than 75 particles/milliliter of particles having a diameter of 0.25 microns, at the point of fill of the liner, and the liner should have less than 30 parts per billion total organic components (TOC) in the liquid, with less than 10 parts per trillion metal extractable levels of critical elements, such as calcium, cobalt, copper, chromium, iron, molybdenum, manganese, sodium, nickel, and tungsten, and with less than 150 parts per trillion iron and copper extractable levels per element for liner containment of hydrogen fluoride, hydrogen peroxide and ammonium hydroxide, consistent with the specifications set out in the Semiconductor Industry Association, International Technology Roadmap for Semiconductors (SIA, ITRS) 1999 Edition.

The liner 12 of the FIG. 1 container contains in its interior space a pellet 45, as illustrated, to aid in non-invasive magnetic stirring of the liquid contents, as an optional feature. The pellet may be formed of a metal or other material that is non-deleterious in interaction with the fluid in the liner, or of a material that is coated with an inert film or coating to render the pellet compatible with the fluid. The magnetic stirring pellet 45 may be of a conventional type as used in laboratory operations, and can be utilized with an appropriate magnetic field-exerting table, so that the container is able, when reposed on the table with the liner filled with liquid, to be stirred, to render the liquid homogeneous and resistant to settling. Such magnetic stirring capability may be employed to resolubilize components of the liquid subsequent to transit of the liquid under conditions promoting precipitation or phase separation of the liquid contents. The stirring element being remotely actuatable in such manner has the advantage that no invasive introduction of a mixer to the interior of the sealed liner is necessary.

The port 30 in deck 26 of the housing 14 can be coupled with a rigid port on the liner, so that the liner is fabricated with two ports, or alternatively the liner can be fabricated so that it is ventable using a single port configuration.

Deck 26 of the housing 14 may be formed of a same generally rigid material as the remaining structural components of the housing, such as polyethylene, polytetrafluoroethylene, polypropylene, polyurethane, polyvinylidene chloride, polyvinylchloride, polyacetal, polystyrene, polyacrylonitrile, or polybutylene.

As a further optional modification of the container 10, a radio frequency identification (RFID) tag 32 may be provided on the liner, for the purpose of providing information relating to the contained liquid and/or its intended usage. The radio frequency identification tag can be arranged to provide information via a radio frequency transponder and receiver to a user or technician who thereby can ascertain the condition of the liquid in the container, its identity, source, age, intended use location and process, etc. In lieu of an RFID device, other information storage may be employed which is readable, and/or transmittable, by remote sensor, such as a hand-held scanner, computer equipped with a receiver, etc.

In the FIG. 1 container the liner 12 allows the liquid to expand and contract due to temperature changes.

In the dispensing operation involving the container 10 shown in FIG. 1, air or other gas (nitrogen, argon, etc.) may be introduced into tube 44 and through port 30 of lid 26, to exert pressure on the exterior surface of the liner, causing it to contract and thereby forcing liquid through the dip tube 36 and dispensing assembly to the liquid dispensing tube 40.

Correspondingly, air may be displaced from the interior volume of housing 14 through port 30, for flow through the passage 43 in dispensing head 34 to tube 44 during the filling operation, so that air is displaced as the liner expands during liquid filling thereof.

In one embodiment of the invention, a zero or near zero headspace is maintained in the liner of a fluid storage and dispensing package in which dispensing is carried out with imposition of pressure on the liner for progressive compaction thereof to discharge fluid from an interior volume of the liner through a discharge passage of a probe coupled with the liner. The storage and dispensing system including such package and employees a stubby probe having a terminus including an opening to the discharge passage. For such purpose, the terminus of the stubby probe is disposed in an upper portion of the interior volume of the liner for removal of headspace gas prior to discharge of fluid from the liner.

As used herein, the term "zero head space" in reference to fluid in a liner means that the liner is totally filled with liquid medium, and that there is no volume of gas overlying liquid medium in the liner.

Correspondingly, the term "near zero head space" as used herein in reference to fluid in a liner means that the liner is substantially completely filled with liquid medium except for a very small volume of gas overlying liquid medium in the liner, e.g., the volume of gas is less than 5% of the total volume of fluid in the liner, preferably being less than 3% of the total volume of fluid, more preferably less than 2% of the total volume of fluid and most preferably, being less than 1% of the total volume of fluid (or, expressed another way, the volume of liquid in the liner is greater than 95% of the total volume of the liner, preferably being more than 97% of such total volume, more preferably more than 98% of such total volume, and most preferably more than 99% of such total volume).

The greater the volume of the head space, the greater the likelihood that the overlying gas will become entrained and/or solubilized in the liquid medium, since the liquid medium will be subjected to sloshing, splashing and translation in the liner, as well as impact of the liner against the rigid surrounding container during transportation of the package. This circumstance will in turn result in the formation of bubbles, microbubbles, and particulates in the liquid medium, which degrade the liquid medium, and render it potentially unsuitable for its intended purpose. For this reason, head space is desired to be minimized and preferably eliminated (i.e., in a zero or near-zero head space conformation) with complete filling of the interior volume of the liner with liquid medium.

Figure 2:
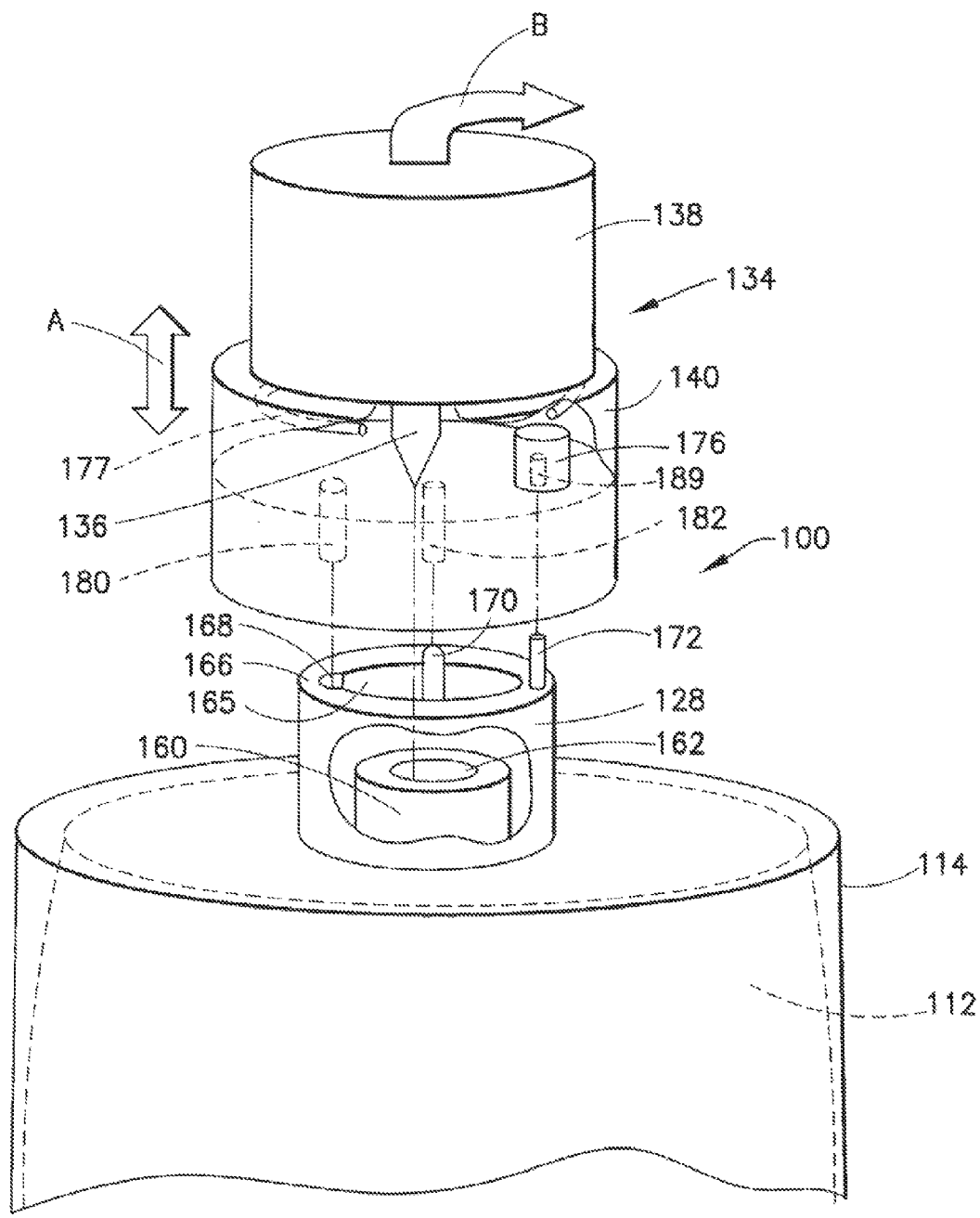
FIG. 2 is a perspective schematic view of a pre-connect verification coupling, according to one embodiment of the present invention.

FIG. 2 is a perspective schematic view of a pre-connect verification coupling, according to one embodiment of the present invention. As shown in FIG. 2, the coupling is implemented in a fluid storage and dispensing package 100, including a liner 112 disposed in the rigid overpack 114. The liner 112 has a port 160 extending upwardly from the top cylindrical surface of the overpack 114, through an opening in such top cylindrical surface. The port 160 includes a sealing membrane 162 in the opening of the port. The membrane 162 may be formed of any suitable material, such as a rubber, cellulosic or polymeric material, which effectively seals the liner and maintains its contents isolated from contamination by the atmosphere or ambient environment.

The port 160 is circumscribed by a cap 128 of cylindrical form defining a central opening 165. The top annular surface 166 of the cap 128 features keying elements, including keycode notches 168 and 170, and keycode pin 172. It will be appreciated that any keying elements may be employed that provide a suitable keycode structure, and that such elements may include other permutations of a notches and pins, or alternatively any other types of matably engageable structural elements that cooperatively interfit with one another to define a correctly engaged cap and dispenser. Examples of other matably engageable structural elements include channel and protrusion elements, interdigitating ribs of circumferentially varied transverse dimensions, tongue and groove elements, and the like.

In the FIG. 2 package 100, the dispenser 134 is shown schematically, as including an upper cylindrical dispenser body 138 and a lower, larger-diameter cylindrical dispenser ring 140. The upper cylindrical dispenser body 138 and the lower cylindrical dispenser ring are interconnected with one another, such that the upper dispenser body is biased to a retracted position by suitable biasing structure such as a biasing spring 177. After the ring has been engaged and fixedly positioned on the cap 128, as hereafter described, the dispenser body 138 is downwardly translatable to an extended position, by application of manual downward force on the dispenser body 138, so that the dispenser body 138 is translated downwardly through the circumferential dispenser ring 140, with accompanying compression of the biasing spring.

The circumferential dispenser ring 140 features keycode elements that are complementary to the keying elements of the cap 128. The keycode elements on the dispenser ring 140 include a first pin 180 that is matably engageable with keycode notch 168 of the cap, a second pin 182 that is matably engageable with keycode notch 170 of the cap, and channel 189 in the dispenser interlock 176 that is matably engageable with the pin 172 of the cap.

The dispenser interlock 176 prevents the ring 140 from moving against the dispenser body 138 until the interlock mechanism is activated by pin 172 entering channel 189 and fully engaging therewith along the length of the pin. The interlock 176 may be of any suitable type, as for example an electronic interlock mechanism, an electromechanical interlock mechanism, a mechanical interlock mechanism, or the like. In one embodiment, the interlock mechanism includes spring-biased tumblers that respond to engagement with the keycode structures of the cap, so as to retract and allow such downward translation movement of the dispenser body against the dispenser ring.

Once the interlock 176 is engaged by the pin, the dispenser body 138 is freely translatable against the dispenser ring 140, in a downward direction by application of manual pressure exerted downwardly on the dispenser body 138, or upwardly by release of such manual pressure, as indicated by bidirectional arrow A.

The dispenser body 138 is schematically illustrated as having a fluid output B associated therewith. The fluid output B is in fluid flow communication with the probe 136, to enable delivery of fluid from the liner through the probe and fluid output B to an external location of use, e.g., by flow circuitry joining the fluid output B to such external location. The external location may for example include a fluid-utilizing facility such as a semiconductor manufacturing tool, or other installation in which the dispensed fluid is treated, used as a treatment agent, or otherwise employed to facilitate a process or operation.

Figure 3:
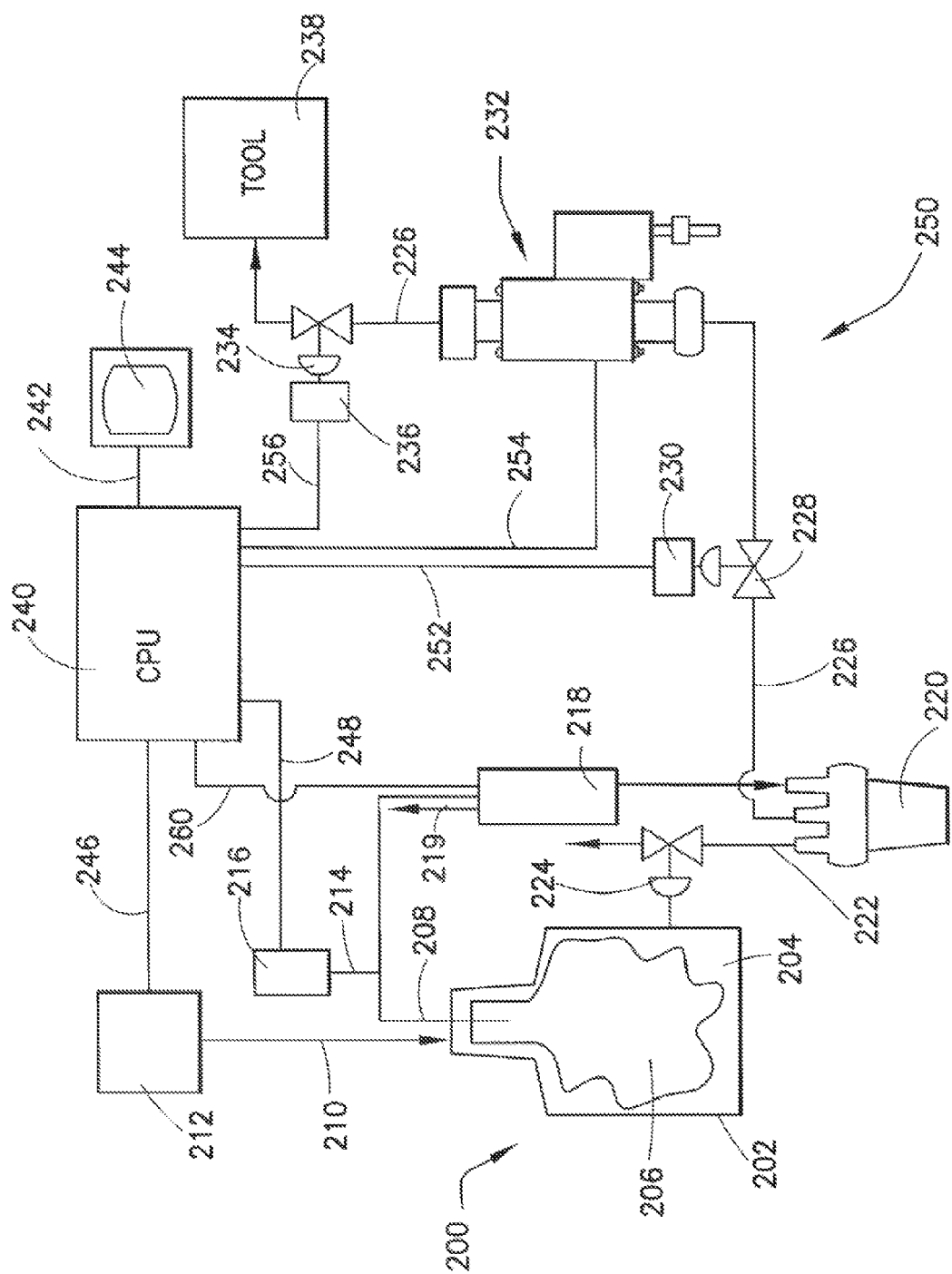
FIG. 3 is a schematic representation of a process installation, including a liner-based fluid storage and dispensing package interconnected by flow circuitry with a semiconductor manufacturing tool, and an empty detect system according to one embodiment of the present invention.

As shown in FIG. 3, the probe 136 has a short length, in relation to the overall height of the package with which the dispensing assembly, including the probe, is associated. The probe thus is configured as a "stubby probe," taken here as denoting that the probe has a longitudinal dimension that places the bottom inlet opening thereof at a position in the upper end portion of the liner, when the dispensing assembly is fully engaged with the cap and associated vessel. For example, the probe may have a longitudinal dimension that is on the order of the height dimension of the connector body, or it may even be less than such height dimension of the connector body. By such arrangement, headspace gas that may be present at an upper portion of the liner, overlying the liquid therein, may readily be vented from the liner prior to active liquid dispensing, so that gas efflux from the vessel is minimized or eliminated during active gas dispensing, and so that downstream gas desolubilization is likewise minimized or eliminated. For this purpose, the liner preferably is constructed as shown, with a top port facilitating headspace gas removal.

Thus, the stubby probe allows the headspace gas to be removed prior to flow of the chemistry from the liner through the dispense network. Further, the ability to remove headspace gas prior to dispensing facilitates achievement of minimal headspace throughout the downstream flow circuitry and at the end-use facility, e.g., semiconductor manufacturing tool, thereby minimizing or avoiding the problems incident to the presence of headspace gas in the source vessel, as well as lines, downstream tanks and reservoirs, feed channels, and the like. By eliminating headspace gas, the use of the stubby probe and the provision of an upper end venting of the liner produces optimal conditions for pressure-dispensing of fluid from the liner, without the occurrence of gross gas voids in the liquid or effervescence of dissolved gas from the liquid as the liquid is subjected to progressively lower pressure in pressure drop segments of the flow circuitry and downstream process network.

Additionally, the stubby probe facilitates early detection of misconnection, without contamination of the probe, since attempted engagement of the probe with the cap of the vessel will result in the breaking of the breakseal membrane, but since the probe is initially in contact with the headspace volume and not the underlying liquid, there is no contamination of the probe, a distinct advantage over prior use of long-length probes in which the open lower end of the probe is disposed in the lower portion of the liner.

In one embodiment, the fluid output B is constituted by a fluid discharge conduit equipped with connection structure to facilitate the interconnection of the fluid discharge conduit with downstream flow circuitry.

The minimization of head space in the liner and downstream network and flow circuitry is a significant advance in the art, since chemical reagent liners have heretofore typically been filled with chemical reagent under air-fill conditions, with about 5% headspace gas being introduced into the liner to accommodate expansion of the liquid in the liner during storage and transport, when temperature of the fluid in the liner may change significantly. When the headspace gas is pressurized during imposition of pressure on the external surface of the liner for fluid dispensing, such pressurized headspace gas goes into solution and thereafter holds the potential for effluxing from the liquid, and introducing headspace gas throughout the downstream system, in addition to headspace gas being entrained in the dispensed liquid, and resulting in slugs of gas that can interfere with pumps, mass flow controllers, and other components of the downstream process system.

By providing porting for headspace gas venting at the highest possible elevation on the liquid-containing package, the complete or near-complete venting of headspace gas can be effected, so that the top port can thereby serve in initial removal of headspace gas as well as subsequent discharge of liquid from the package.

Such highest possible port elevation has a number of advantages: (i) it can be implemented in any size package, so that a stubby probe can be utilized across a broad range of sizes of package volumes, (ii) this connection between the probe and the cap is readily detected before crossing-contamination occurs and (iii) manufacturing costs can be minimized with a one-size-fits-all approach to probe and port designs.

In the dispense operation of the FIG. 2 system, a pressurizing gas is introduced into the interior volume of the overpack outside the liner therein, so that the pressurizing gas exerts a compressive force on the liner, causing it to progressively contract, to pressure-dispense the fluid from the liner. Thus, the fluid in the liner, e.g., a photoresist, is forced upwardly through the probe 136 and passage (not shown) in the dispenser body 138 to the fluid output B, from which it passes into the downstream flow circuitry.

By the arrangement shown in FIG. 2, the dispenser ring 140 initially is engaged with the cap so that the keying elements mate with one another. If the respective keying elements on the ring and the cap do not engage with one another, due to a mis-connection in which a wrong dispenser is attempted to be coupled with the fluid storage and dispensing package 100, the probe 136 is prevented from engaging and puncturing the sealing membrane 162. Accordingly, the attempted connection of the incorrect elements is immediately detected, without the occurrence of contamination of the contained fluid or of the dispenser, such as would otherwise occur in the absence of the keycode structure of the dispenser and cap.

If a proper dispenser has been selected for engagement with the fluid storage and dispensing package 100, then the engagement of the ring 140 with the cap 28 de-actuates the dispenser interlock 176, and allows the dispenser body 138 to be vertically translated downwardly against the ring 140, by application manual pressure on the dispenser body. The dispenser body 138 thereupon is downwardly translated so that the probe 136 engages and punctures the membrane 162, thereby placing the dispenser 134 in condition for dispensing operation involving discharge of fluid from the liner 112 in overpack 114.

Once the dispenser body is downwardly translated to its dispensing position, the dispenser body may be locked in place, by suitable lock structure (not shown in FIG. 2), such as a bayonet locking structure, or a dimple-and-ball detent structure, or other structural arrangement, by which the dispenser body is locked in an extended lower position for dispensing of fluid from the package 100.

The fluid storage and dispensing system shown in FIG. 2 thus employs a dispenser 134 and package 100 incorporating the pre-connect verification coupling of the invention, as including a first coupling body and a ring cooperative therewith to allow a translational movement of the body against the ring in a post-verification coupling with a second coupling body including second keycode structure, wherein the ring includes a first keycode structure and an interlock preventing such translational movement prior to verification coupling of the first keycode structure with the second keycode structure. The term "verification coupling" refers to the first and second keycode structures being sufficiently, and preferably fully, engaged with one another so as to indicate that the first and second keycode structures are complementary and properly fit one another.

Although described with reference to the fluid storage and dispensing system of FIG. 2 as an illustrative implementation, it will be recognized that the application of the pre-connect verification coupling of the invention is not thus limited, but rather extends to and encompasses other implementations in which coupling members are desirably verified as to their proper match, before the coupling is assembled by complete engagement of the first and second coupling bodies. The first and second coupling bodies thus may be of any suitable type, e.g., embodied as connectors, matable fittings, engageable lock structures, etc.

FIG. 3 is a schematic representation of a process arrangement 250, including a liner-based fluid storage and dispensing package 200 interconnected by flow circuitry with a semiconductor manufacturing tool 238, and an empty detect system according to one embodiment of the present invention.

The liner-based fluid storage and dispensing package 200 includes a liner 206 that is disposed in the interior volume 204 of a rigid overpack 202. The interior volume 204 of the overpack 202 is in fluid communication with a source 212 of a suitable pressurizing gas, by means of the pressurizing gas feed line 210. The pressurizing gas can be of any suitable type, such as for example, argon, helium, nitrogen, air, etc., as may be necessary or desirable in a given application of the liner-based fluid storage and dispensing package.

The liner 206 contains a fluid, such as a photoresist liquid composition, a chemical mechanical polishing slurry, or other suitable fluid composition. The liner is coupled in fluid dispensing relationship to the downstream fluid-utilizing semiconductor manufacturing tool 238, by flow circuitry including dispense line 208. The dispense line 208 optionally contains a fluid processing, monitoring or control unit 218, as may be necessary or desirable in a specific implementation of the process installation. Such unit 218 may be provided with a vent line 219, as necessary or desired in a specific application.

The liner 206 in such embodiment can be formed of a barrier film that is permeation-resistant to gases in the exterior ambient environment of the liner. For example, the liner may be formed of a polytetrafluoroethylene (PTFE) film, to prevent ingress of air or other ambient environment gas species from the gas in contact with the exterior surface of the liner. More generally, multilayer laminates and barrier films of the character disclosed in U.S. Patent Application Publication No. 2009/0212071 published Aug. 27, 2009 for "Material Storage and Dispensing Packages and Methods," may be employed to good advantage in specific embodiments of the invention.

The dispensing operation is carried out with flow of pressurizing gas from the source 212 through line 210 into the interior volume 204 of the liner-based package. In the interior volume, the pressurizing gas exerts pressure on the exterior surface of the liner 206, thereby serving to compress and collapse the liner so that fluid is forced into dispense line 208.

From the dispense line 208, the fluid enters filter 220, which serves to de-gas the fluid, remove fine particles from the liquid, or otherwise improve the character or quality of the liquid for subsequent use. The filter 220 includes a vent line 222 containing flow control valve 224 therein, for venting gas and/or liquid from the filter, as desired. The vented stream in line 222 may, for example, be a retentate stream produced by the filtration operation in filter 220.

The filtrate produced by the filtering in filter 220 is discharged into fluid feed line 226 containing flow control valves 228 and 234 therein, upstream and downstream, respectively, of the dispensing pump 232. Flow control valve 228 has associated therewith an automatic valve actuator 230, and flow control valve 234 has associated therewith an automatic valve actuator 236.

The dispensing pump 232 may be of any suitable type, including diaphragm pumps, piston pumps, peristaltic pumps, injector-type pumps, metered-dose pumps, etc. The choice of a specific pump will depend on the character the fluid being dispensed, the requirements of the downstream fluid-utilizing location or facility, the pressure drop in the flow circuitry with which the pump is associated, etc.

From the fluid feed line 226, the dispensed fluid is delivered to the tool 238 for utilization therein. The tool may be of any suitable type, including coating, etching, polishing, masking, deposition, volatilization, pyrolysis, packaging, mixing, abatement or other type tools.

The fluid dispensing and utilization operations may be carried out in a controlled manner in the process installation illustratively shown in FIG. 3, using the control system including central processor unit (CPU) 240. The CPU may be of any suitable type, such as a general-purpose programmable computer, a microprocessor, microcontroller, programmable logic controller, or the like.

In the illustrative process facility illustratively shown in FIG. 3, the CPU is operatively coupled with a pressure transducer 216, connected by a pressure sensing line 214 to the fluid dispense line 208. The pressure transducer may be of any suitable type, effective to detect the pressure of dispensed fluid in dispense line 208, and to responsively generate a signal corresponding to the sensed pressure. Such a response signal is transmitted from the transducer 216 in signal transmission line 248 to the CPU.

The CPU 240 in response to such sensed pressure signal from the transducer 216, may be arranged to responsively adjust components of the process facility, including: pressurized gas source 212, by means of a control signal transmitted in signal transmission line 246 to the source 212; fluid processing, monitoring or control unit 218, by means of a control signal transmitted in signal transmission line 260; valve actuator 230, by means of a control signal transmitted in signal transmission line 252; valve actuator 236, by means of a control signal transmitted in signal transmission line 256; and/or pump 232, by means of a control signal transmitted in signal transmission line 254. In such manner, the various controlled system components may be modulated in response to the dispense pressure sensed by transducer 216.

The CPU 240 in the FIG. 3 embodiment is arranged to communicate with an output device 244, which may for example include a display monitor 244, linked to the CPU by signal transmission line 242, or other output device or output capability or subsystem.

The CPU in one embodiment of the invention is configured and arranged to monitor the pressure of the dispensed fluid, as well as the pressure of the pressurizing gas. For monitoring the pressure of the pressurizing gas, the source 212 may have associated therewith a pressure transducer operatively coupled to signal transmission line 246, and arranged to transmit a signal to the CPU correlative of the pressure of the pressurizing gas in the source 212. It will therefore be appreciated that the signal transmission line 246 may be a bidirectional signal transmission line or a multi-line cable, capable of transmitting signals both to and from the CPU and the source 212.

The above-described embodiment of the invention reflects the discovery that when dispensing fluid from a flexible liner by imposition of pressure thereon, the progressive collapse of the liner at the approach to the fully collapsed position (at which fluid is exhausted from the liner) involves a frictional change of the liner in response to applied pressure. Specifically, it has been observed that as the liner is collapsed, near the end-of-dispense at the approach to a fully collapsed position, the liner friction increases for each incremental amount of additional liner collapse. As the friction increases, more energy from the pressurizing gas is consumed to collapse the liner, and the dispensed fluid pressure begins to fall off, initially at a lower rate of change, and then more steeply (rapidly) at the end of the dispensing operation, as the empty state of the liner is finally reached.

The fall-off of the dispensed fluid pressure at the aforementioned relatively lower rate of change, marks a transition that is readily discernible in a plot of pressure as a function of time for the dispensed fluid. The "slope droop" of the pressure curve thus provides an early indication that the vessel is approaching exhaustion, and such slope droop is followed by a steep slope, as the vessel progresses to an exhausted (empty or substantially empty) state.

Based on such pressure dispensing characteristic, the pump or other motive fluid driver that is coupled with the liner-based package for effecting flow of dispensed fluid through the flow circuitry, can be selected or otherwise set to provide a drive pressure that will enable dispensing throughout the full extent of the dispensing operation, i.e., from an initial full state of the liner, progressing to early slope droop pressure behavior, and finally to steep slope decline to an empty or near-empty state.

As an illustrative example, in a system of the general type shown in FIG. 3, delivering photoresist from a liner-based package to a semiconductor manufacturing tool, the pressure setpoint for the motive fluid driver may be 7 psig, and the motive fluid driver may be a metered dose pump arranged to pump the fluid in a succession of a discrete small volumes, or "shots," as part of a pumping cycle in which a suction step precedes each shot. As the end-of-dispense state approaches, the slope of pressure versus time for the dispensed shots begins to fall softly. At a pressure of 6 psig, there is greater than 50 mL of photoresist remaining in the liner. The decline from the (setpoint) pressure of 7 psig to 6 psig provides an early warning indication of the approach to empty. The pressure then rapidly declines to about 1.5 psig at the empty state at which no more pumping of liquid is possible. At such empty state, an extremely small amount of photoresist, well less than 10 mL in volume, e.g., 5 mL of photoresist, remains in the package, representing an overall utilization level of greater than 99.75% of the photoresist originally supplied in the package.

The empty detect system and methodology based on this end-of-dispense transition in dispensed fluid pressure thus provides sufficient indication of the onset of exhaustion of the fluid in the liner as to minimize, or, in some instances, to even eliminate the requirement of an external reservoir for transitional feed of supplemental fluid to the fluid-utilizing process. As a result, the hold-up inventory of supplemental fluid is correspondingly minimized or even eliminated, and the overall economics of the process are correspondingly improved.

FIGS. 4-8 are pressure-time graphs that illustrate the dispensing system behavior during fluid dispensing operation, for a liner-type package of the type described in connection with FIG. 3, in which the motive fluid driver was a shot-dispensing pump operating with alternating suction and positive fluid displacement steps in a repetitive cycle. Pressure profile, dispense shot variability, and final residual liquid were determined in four runs of the system, using deionized water as the test liquid. The dispense rate of the liquid was 5 mL dispensed over six seconds with a shot every 60 seconds (i.e., one 5 mL shot per minute). The tests were carried out to capture the profile of the liner-based package pressure decay near the empty state, and to log the dispense shot profile as well as to measure the residual chemical at final empty state. The pressurizing gas was clean dry air at a pressure of 7 psig.

Figure 4:
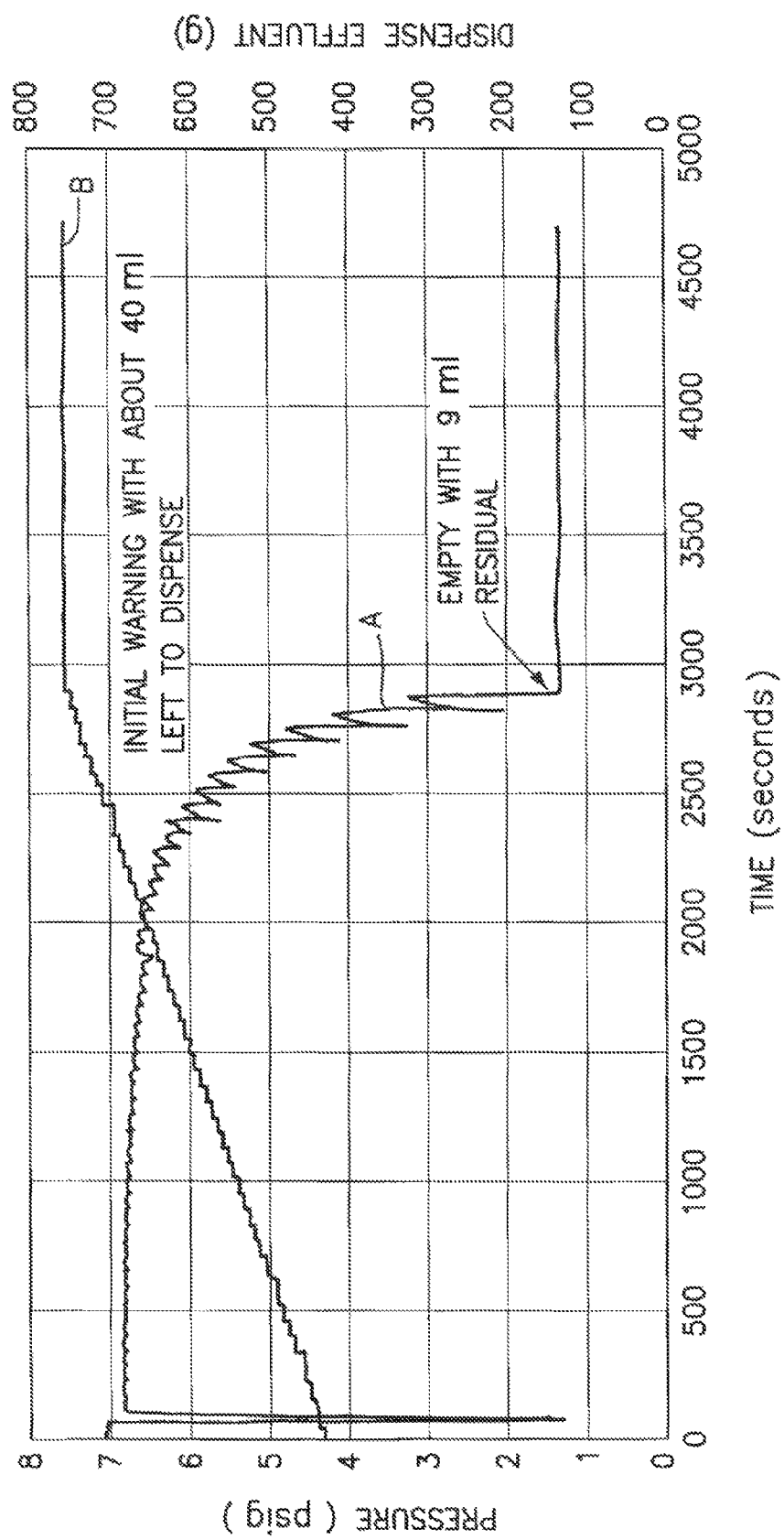
FIG. 4 is a graph of package pressure, in psig, and dispensed fluid weight, in grams, as a function of time, in seconds, for a liner-based fluid storage and dispensing package, during a dispensing operation involving the last 250 mL of liquid in the vessel.

FIG. 4 is a graph of package pressure, in psig, and dispensed fluid weight, in grams, as a function of time, in seconds, for the aforementioned liner-based fluid storage and dispensing package, showing the pressure behavior of the system during a dispensing operation involving the last 250 mL of liquid in the vessel. In this graph, curve A is the package pressure, and curve B is the cumulative weight, in grams, of the dispensed fluid, as determined by weighing of such dispensed fluid. As shown by the graph, an early warning of approach to exhaustion occurred in the vicinity of 2400 seconds, when about 40 mL of water remained for dispensing. The empty state was reached at about 2850 seconds, with 9 mL of residual liquid in the liner.

Figure 5:
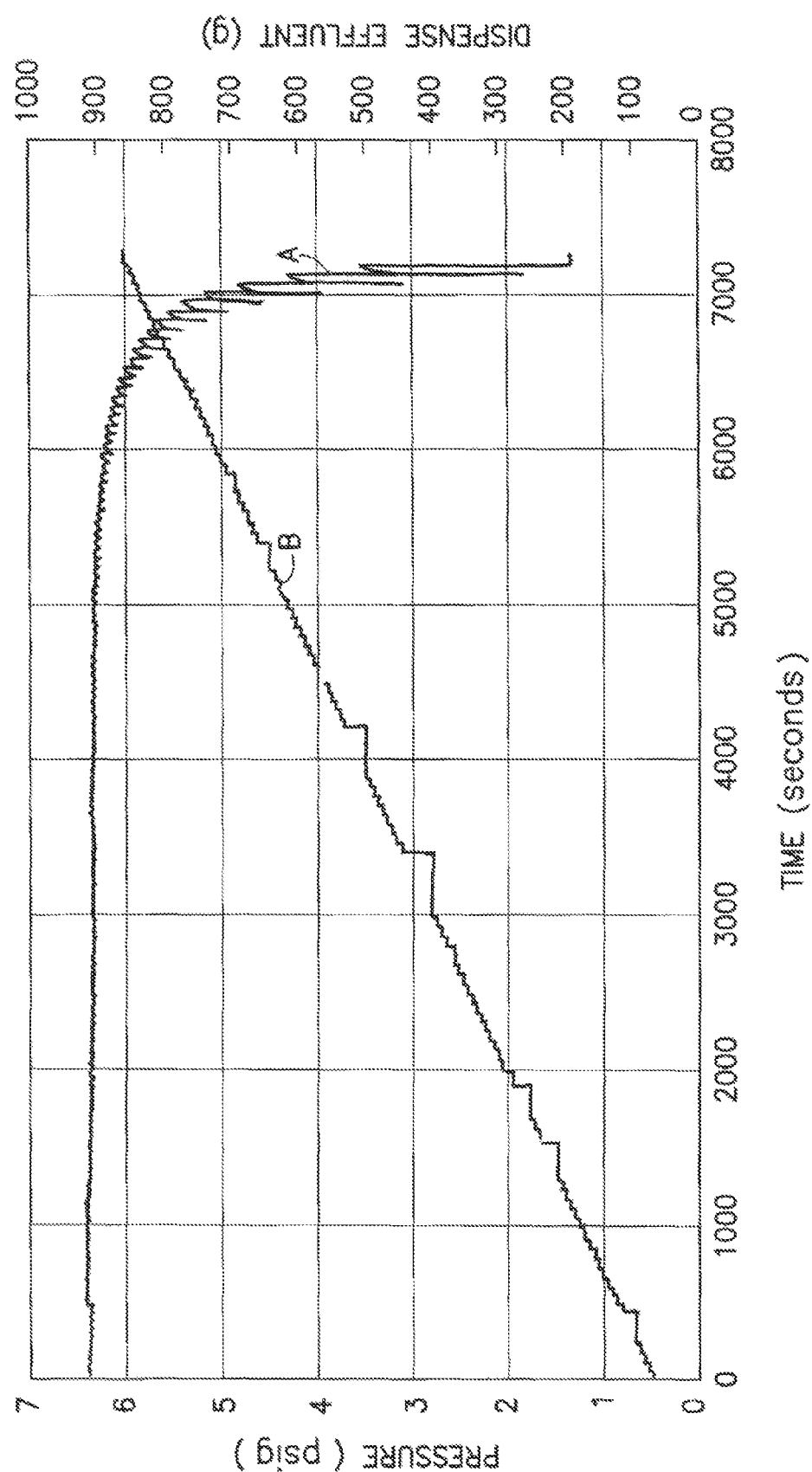
FIG. 5 is a graph of package pressure, in psig, and dispensed fluid weight, in grams, as a function of time, in seconds, for a liner-based fluid storage and dispensing package, during a dispensing operation involving the last 550 mL of liquid in the vessel.

FIG. 5 is a graph of package pressure, in psig, and dispensed fluid weight, in grams, as a function of time, in seconds, for the aforementioned liner-based fluid storage and dispensing package, showing the pressure behavior of the system during dispensing operation involving the last 550 mL of liquid in the vessel. In this graph, curve A is the package pressure, and curve B is the cumulative weight, in grams, of the dispensed fluid, as determined by weighing of such dispensed fluid. As shown in such graph, the slope droop indicative of the onset of exhaustion occurred in the vicinity of 6600 seconds of dispensing time. Complete exhaustion of the liner occurred at about 7250 seconds of dispensing time.

Figure 6:
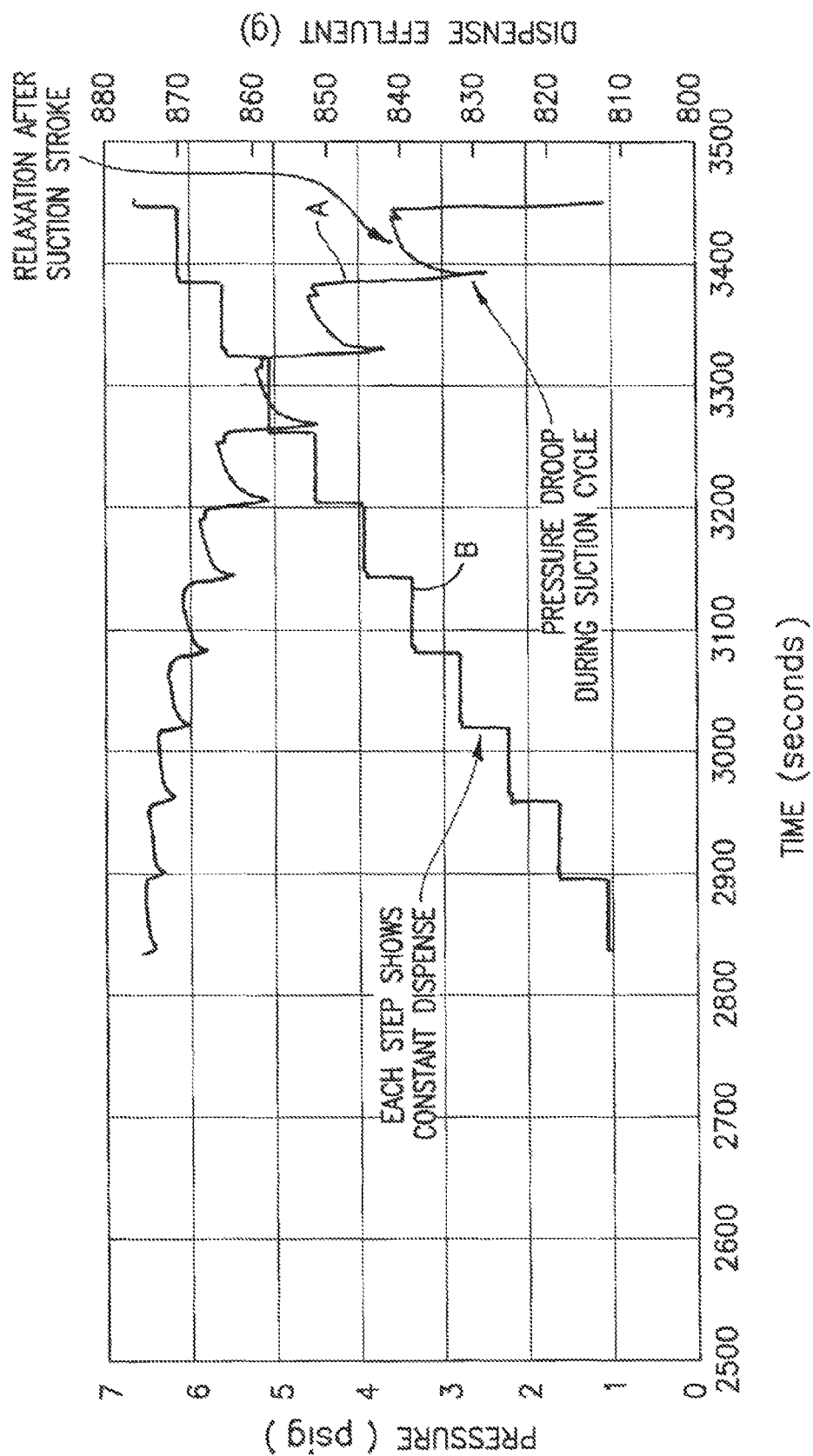
FIG. 6 is a graph of package pressure, in psig, and dispensed fluid weight, in grams, as a function of time, in seconds, for a liner-based fluid storage and dispensing package from which liquid is dispensed in a series of successive "shots" by the action of a cyclic suction pump, during a dispensing operation involving the last 50 mL of liquid in the vessel.

FIG. 6 is a graph of package pressure, in psig, and dispensed fluid weight, in grams, as a function of time, in seconds, for a liner-based fluid storage and dispensing package from which the liquid is dispensed in a series of successive "shots" by the action of the cyclic suction pump, showing the pressure behavior of the system during a dispensing operation, involving the last 50 mL of liquid. In this graph, curve A is the package pressure, and curve B is the cumulative weight, in grams, of the dispensed fluid, as determined by weighing of such dispensed fluid. The stepped profile of curve B is readily apparent, and the identity of the step size along the curve reflects the constant volume portions of fluid dispensed in the successive shot-dispensing segments of the pump cycle. The profile of curve A reflects pressure drop during the suction cycle, and relaxation after the suction stroke.

Figure 7:
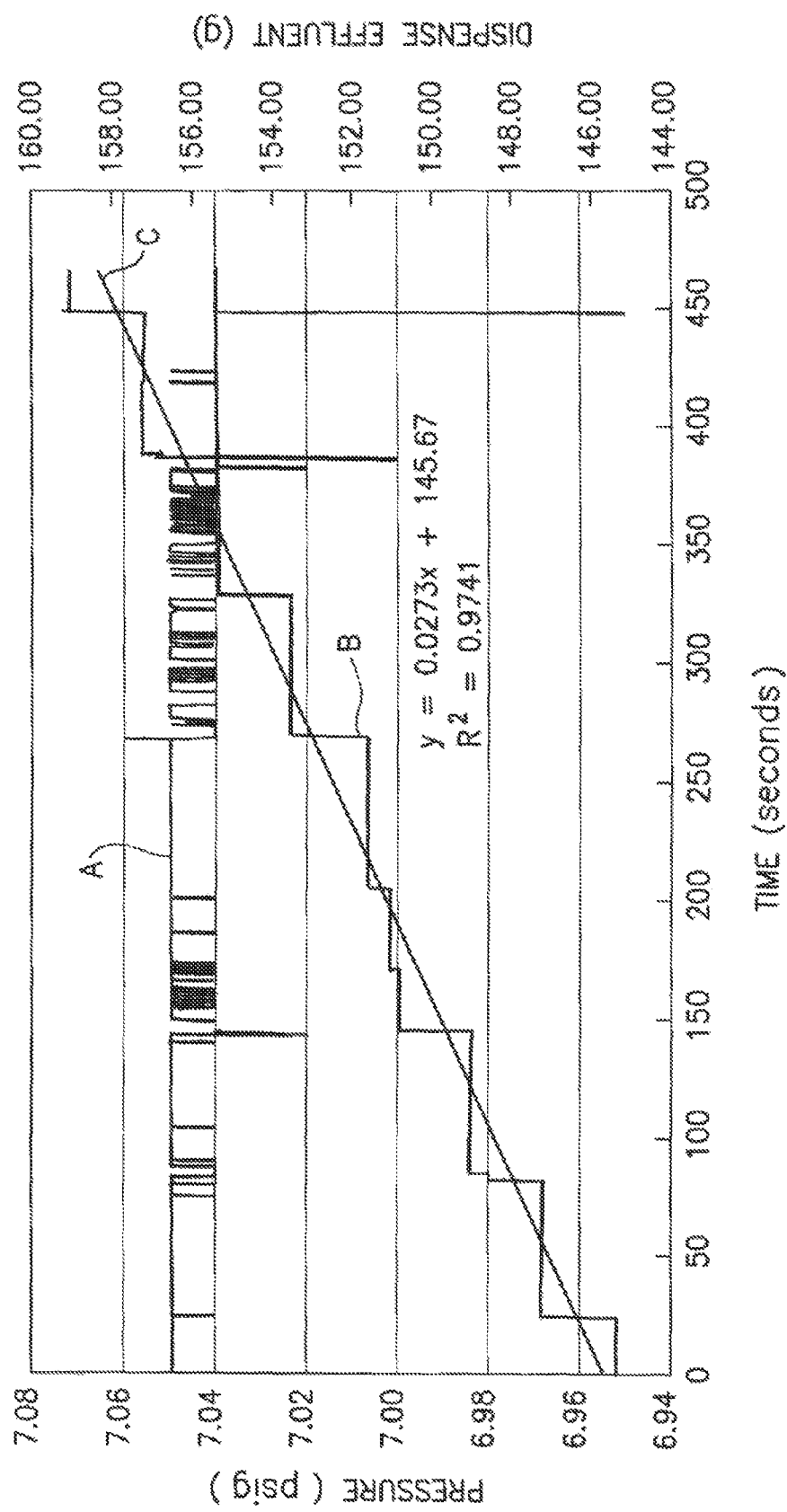
FIG. 7 is a graph of package pressure, in psig, and dispensed fluid weight, in grams, as a function of time, in seconds, for a liner-based fluid storage and dispensing package from which liquid is dispensed in a series of successive "shots" by the action of a cyclic suction pump, showing the data for the last seven dispense shots from the fluid storage and dispensing package, as well as the linear equation fitting the data.

FIG. 7 is a graph of package pressure, in psig (curve A), and dispensed fluid weight, in grams (curve B), as a function of time, in seconds, for the liner-based fluid storage and dispensing package from which the liquid is dispensed in a series of successive "shots," each containing 1.42 g of the liquid, by the action of the cyclic suction pump. The graph shows the data for the last seven dispense shots from the fluid storage and dispensing package during the dispensing operation, as well as the linear equation fitting the data. Curve C is the line fitted to the data of curve B, of the equation y=0.0237 x+145.67.

Figure 8:
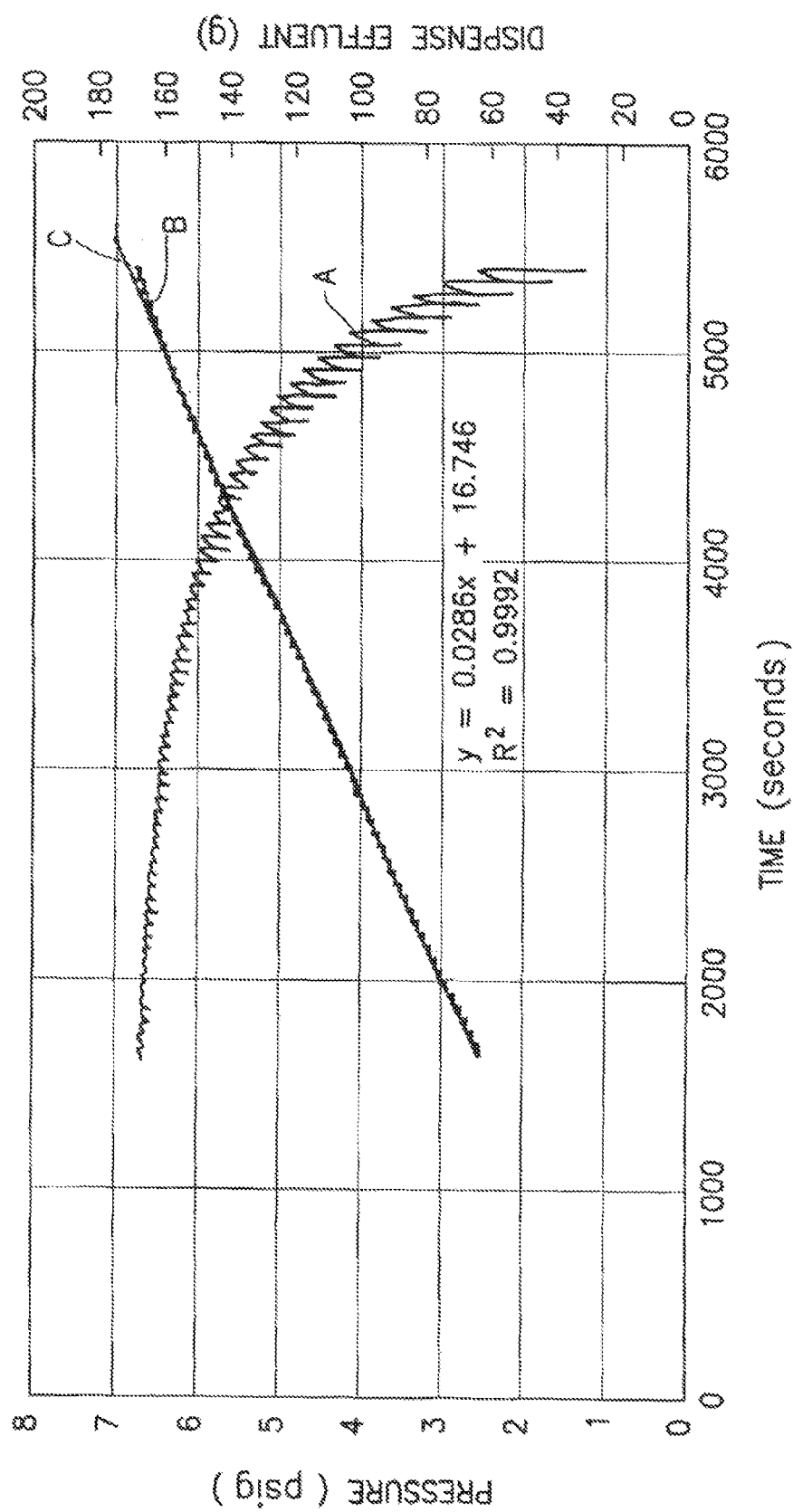
FIG. 8 is a graph of package pressure, in psig, and dispense fluid pressure, psig, as a function of time, in seconds, for a liner-based fluid storage and dispensing package from which liquid is dispensed in a series of successive "shots" by the action of a cyclic suction pump, showing the data for the last four dispense shots from the fluid storage and dispensing package, as well as the linear equation fitting the data.

FIG. 8 is a graph of package pressure, in psig, and dispensed fluid weight, in grams, as a function of time, in seconds, for the liner-based fluid storage and dispensing package from which the liquid is dispensed in a series of successive "shots" by the action of the cyclic suction pump, showing the data for the last four dispense shots from the fluid storage and dispensing package during dispensing operation, as well as the linear equation fitting the data. In this graph, curve A is the package pressure, and curve B is the cumulative weight, in grams, of the dispensed fluid, as determined by weighing of such dispensed fluid. Curve C is the line fitted to the data of curve B, of the equation y=0.0286 x+16.746. The graph shows the dispense profile droop of the package pressure curve during the last four shots of liquid dispensing, reflecting and onset of the depletion of the liquid inventory of the liner, at about 4200 seconds of dispensing time.

It will be apparent from the foregoing that the pressure slope droop that is evidenced by the pressure curve as a function of dispensing time for the fluid being dispensed, as the rate of change of pressure as a function of time begins to significantly increase, provides an empty detect capability of sufficiently early character to permit switch-in of a fresh package of fluid for subsequent dispensing, or otherwise of providing a transitional source of fluid between deployment of successive packages that is considerably smaller than would be required utilizing the "first bubble" empty detect methodology of the prior art.

In one embodiment of the invention, the liner-based package may be arranged in the manner shown in FIG. 3, with a pressure monitor such as a transducer arranged to detect the pressure of fluid in the liner, operatively coupled with a control system configured to initiate appropriate action. For example, the control system may be arranged to output to an alarm indicative of the onset of exhaustion of the dispensed fluid, so that change-out of the fluid supply package can be affected in a timely manner, ensuring continuity of operations. Alternatively, the control system may be arranged to begin initial preparation for switching the fluid dispensing from a first package to a second, fresh package, so that a "sharp" switch-over can thereafter take place when the first fluid supply package is exhausted. As a still further alternative, the control system may be constructed and arranged to terminate the fluid-utilizing process in a manner closely coordinated with the available inventory of remaining fluid in the liner-based package.

It will be apparent that the empty detect system of the invention may be implemented in a wide variety of specific forms, and with variation of the specific actions taken in response to the detection of the onset of liner exhaustion.

It is further apparent that the invention may be practiced in variant forms utilizing the pre-connect verification coupling, as well as the empty detect system, in connection with a liner-based fluid storage and dispensing system that is connected to a downstream fluid-utilizing process in the dispensing operation of the contained fluid.

In another aspect, the invention contemplates a method of supplying a fluid from a collapsible liner subjected to pressure to effect dispensing of the fluid, such method including monitoring pressure of the dispensed fluid as a function of time, and determining pressure slope droop of the pressure-time function as indicative of a predetermined approach to exhaustion of fluid from the liner, and at the predetermined approach to exhaustion of fluid from the liner, imposing a pressure spike on the liner to effect further dispensing of fluid from the liner.

In a further variation such methodology, fluid dispensed from the liner subsequent to imposition of the pressure spike thereon is flowed to a reservoir for transitional supply of fluid during exhaustion of fluid from the liner, to ensure continuity of dispensing of fluid to the downstream fluid-utilizing apparatus or other location of end use.

Another aspect of the invention relates to a dispense head connector of a type that is used to couple with a cap of a fluid storage and dispensing vessel. In accordance with the invention, the connector is of an ergonomically enhanced character, facilitating its use without the difficulties encountered in the use of the prior art connector. The invention relates to an ergonomic handle with "push off" features by means of which the connector is readily installed on and removed from a liner-based fluid storage and dispensing package.

The ergonomic connector is shown in FIGS. 9-17 in an illustrative embodiment thereof.

Figure 9:
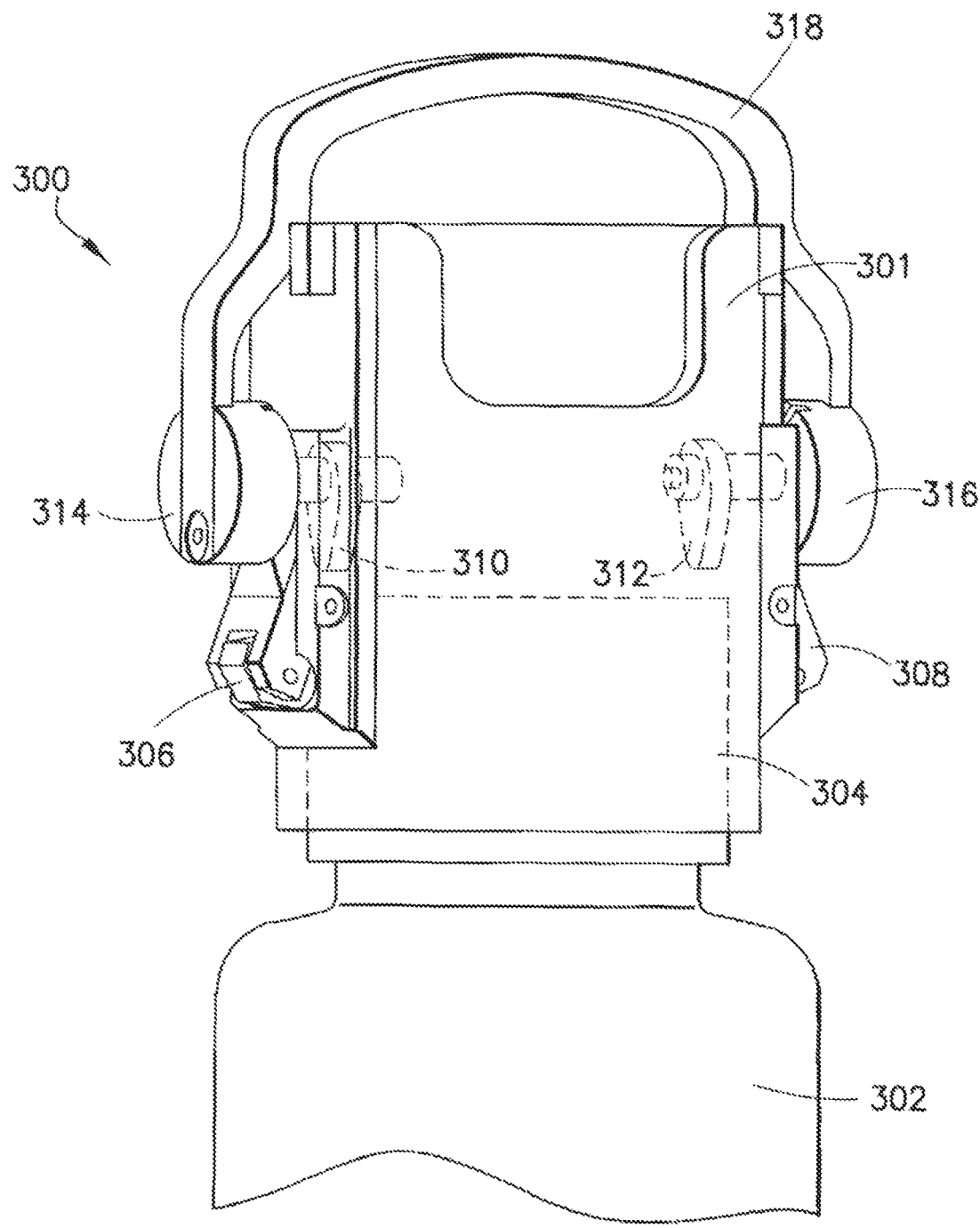
FIG. 9 is a front elevation view of an ergonomic connector engaged with a bag in bottle (BIB) fluid storage and dispensing package.

Referring now to FIG. 9, there is shown the connector 300 as engaged with a bag in bottle (BIB) vessel 302 including a thin film liner disposed in the interior of the rigid overpack and adapted for holding liquid, e.g., a high purity liquid for semiconductor manufacturing applications. The connector 300 includes a main body portion 301 having mounted thereon a pivot clamp assembly including pivot clamps 306 and 308, which lockingly engage the cap 304 on the vessel. The pivot clamp cams 314 and 316 are coupled with the pivot clamps to allow engagement and disengagement of the clamps depending on the position of the handle 318, which is connected to the pivot clamp cams 314 and 316 as illustrated.

The pivot clamp cams 314 and 316 each are mounted on associated axles on which also are mounted the push off cams 310 and 312, respectively.

The ergonomic handle and push off features include several key parts. The handle 318 is a finger grooved handle that is easily grasped by a user to secure a firm grip on the connector when it is removed. The pivot clamp cams are a primary feature and are used as a rotary cam assembly, which activate the pivot clamps when the pivot clamp cams are rotated upwardly by corresponding movement of the handle. The pivot clamp cams during such rotation ramp up and press the pivot clamps inwardly, which creates a moment about the pivot clamp axis, causing the pivot clamps to be opened/unlocked from the cap 304.

Another primary feature of the pivot clamp cams is a torque spring (not shown in FIG. 9), which ensures that the handle will fall down, and allow the pivot clamps to lock before pressurization of the interior volume of vessel 302 to apply exterior pressure on the liner therein. By biasing the handle to a down position, the locking of the pivot clamps is assured, with corresponding assurance of the leak-tightness of the vessel assembly for subsequent dispensing operation.

The pivot clamp cams 314 and 316 as discussed above are coupled with the push off cams 310 and 312, such arrangement allowing the push off cams to push off the top of the cap 304 when the handle 318 is rotated to an up position. A gradual change in the cam profile enables a smooth disengagement of the connector 301 from the package. The torque spring also ensures that the push off cam is not in an open position. When the push off cam is in a closed position, the connector cannot be placed on the vessel 302, because the push off cam would interfere with the cap 304.

The axle at each side of the connector passes through both the pivot clamp cam and the push off cam at such side of the connector, and act as a bearing on which both cams can rotate.

The connector body features protrusions on its side surfaces, which act as stops to stop the handle in a vertical position, and prevent it from interfering with any fittings. The connector body also houses the torque spring.

Figure 10:
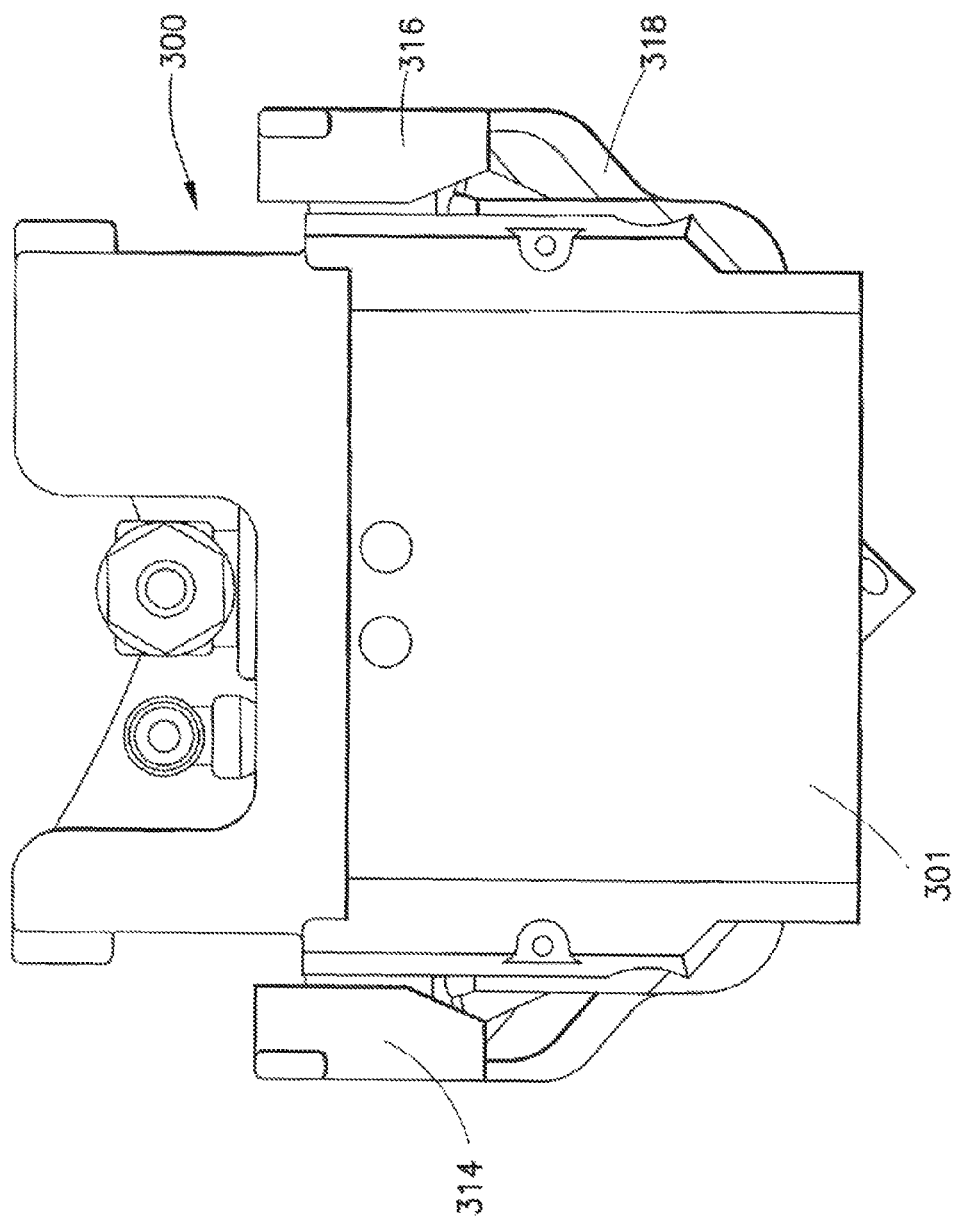
FIGS. 10-17 show various views of the connector shown in FIG. 9 and its component parts.
Figure 11:
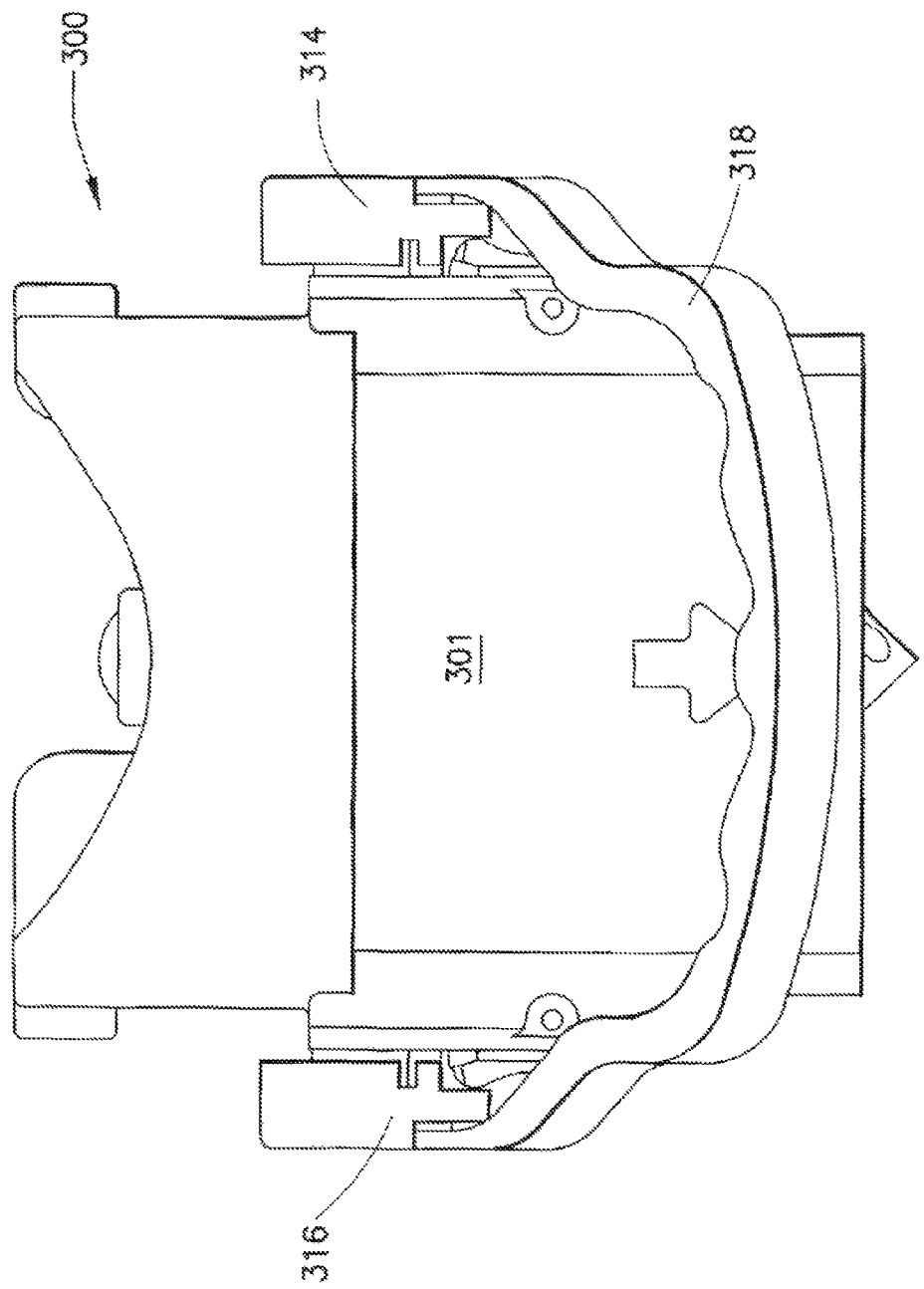
Figure 12:
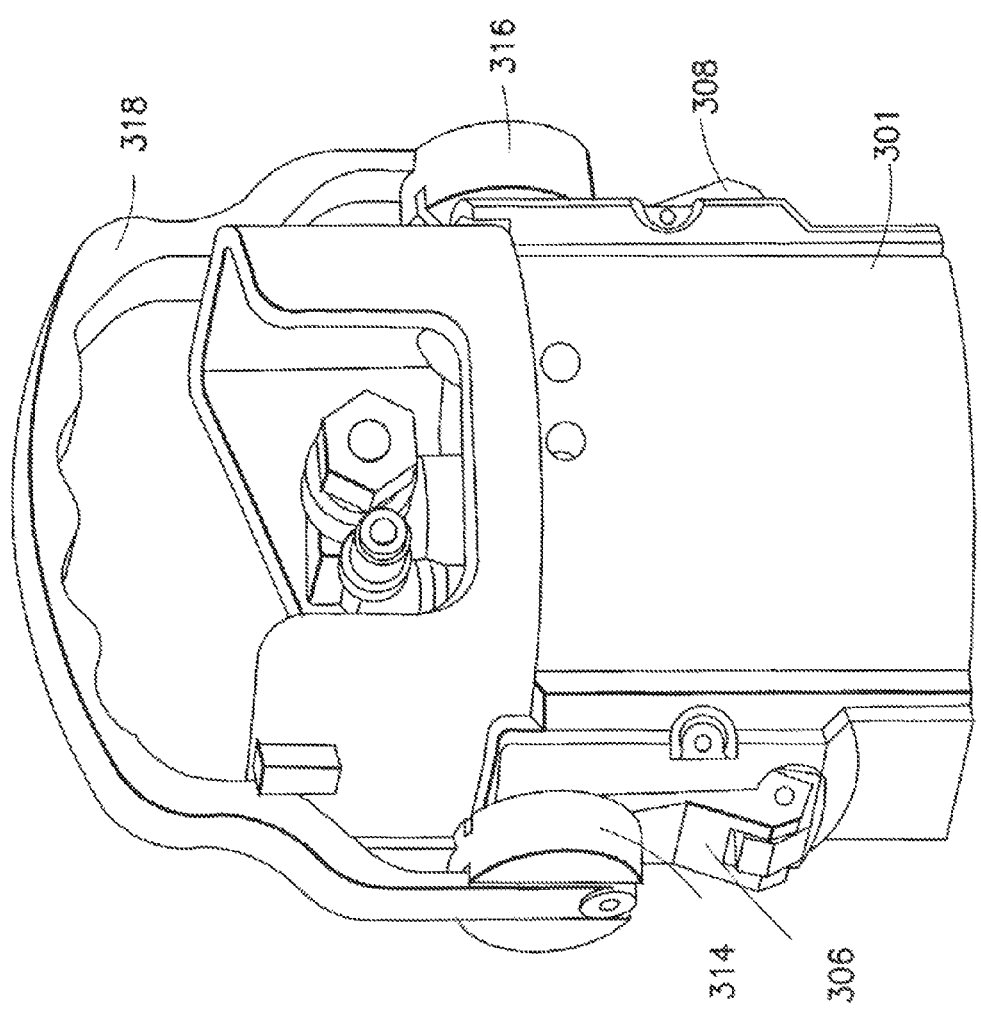
Figure 13:
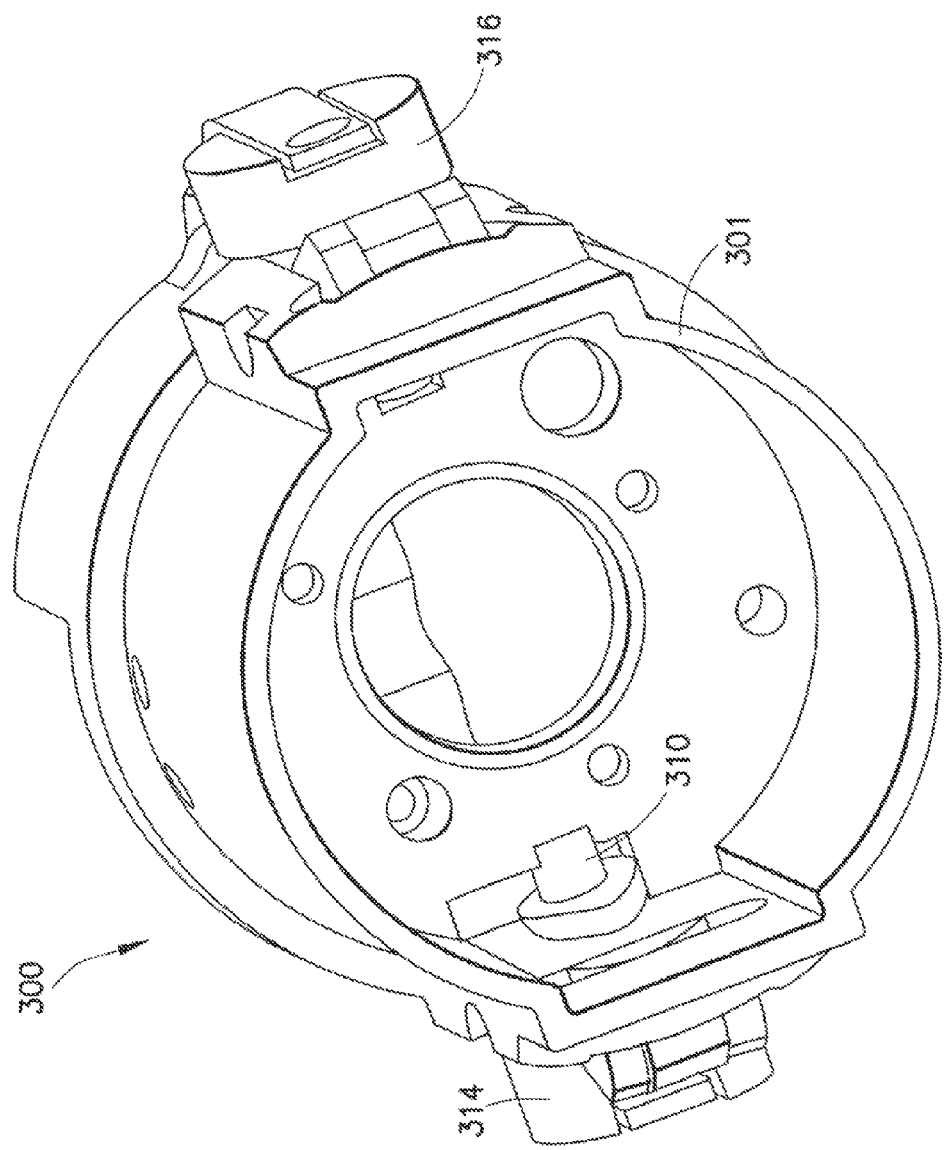
Figure 14:
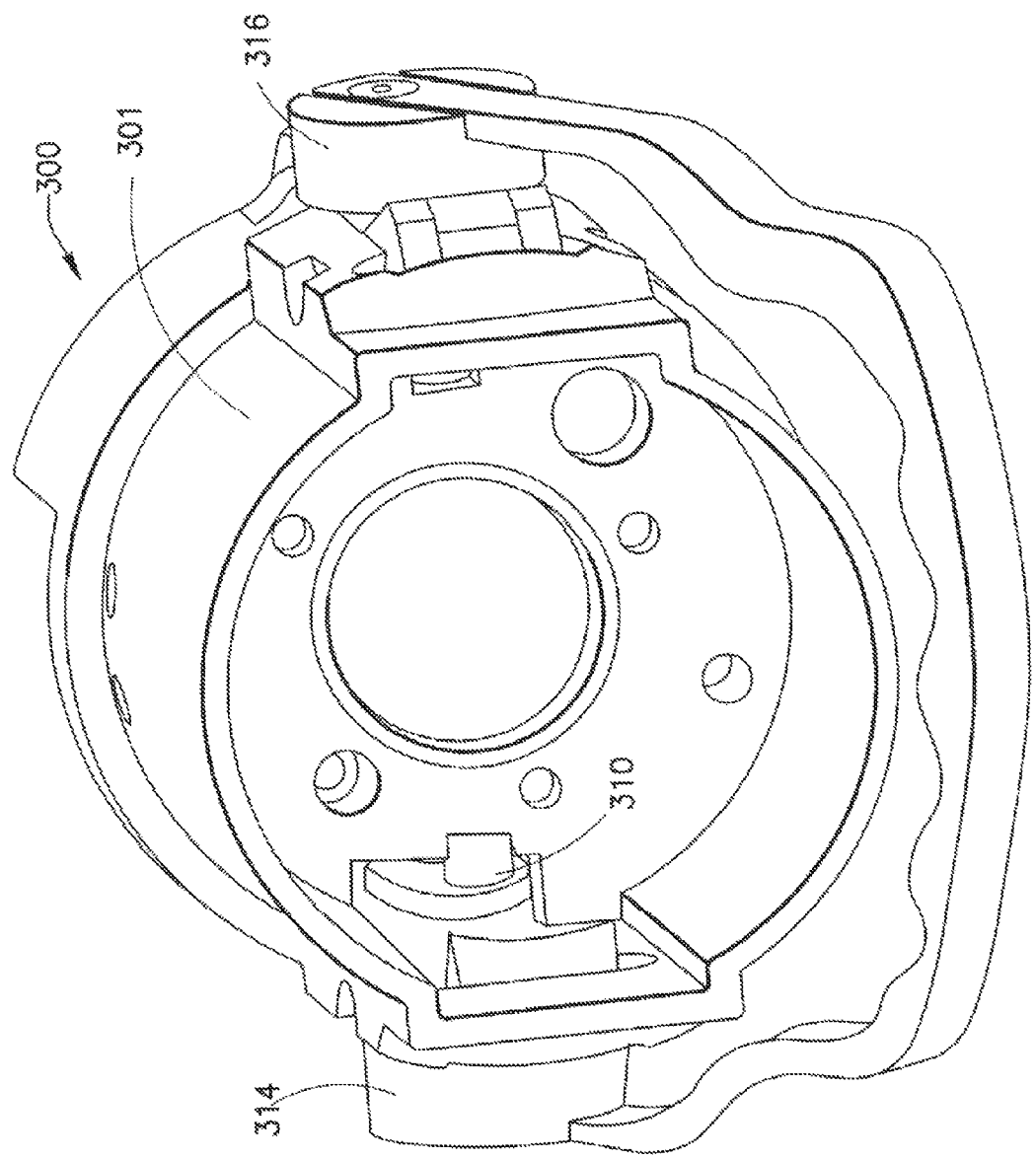
Figure 15:
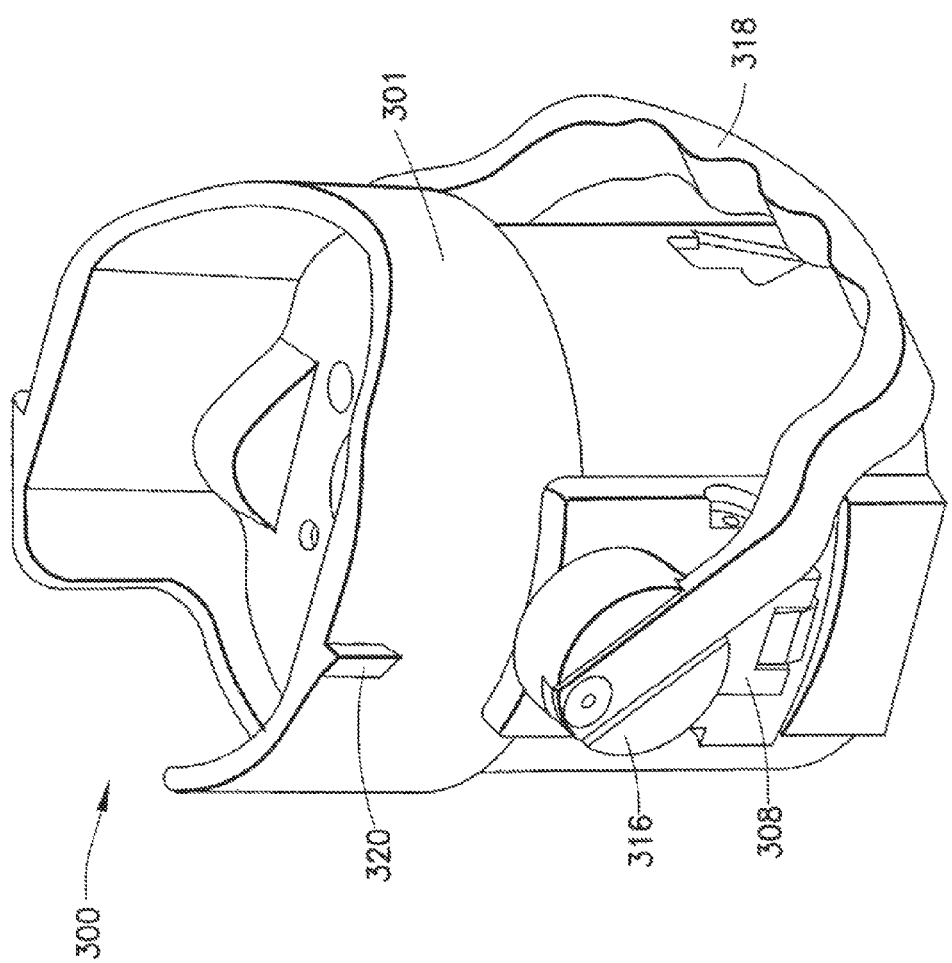
Figure 16:
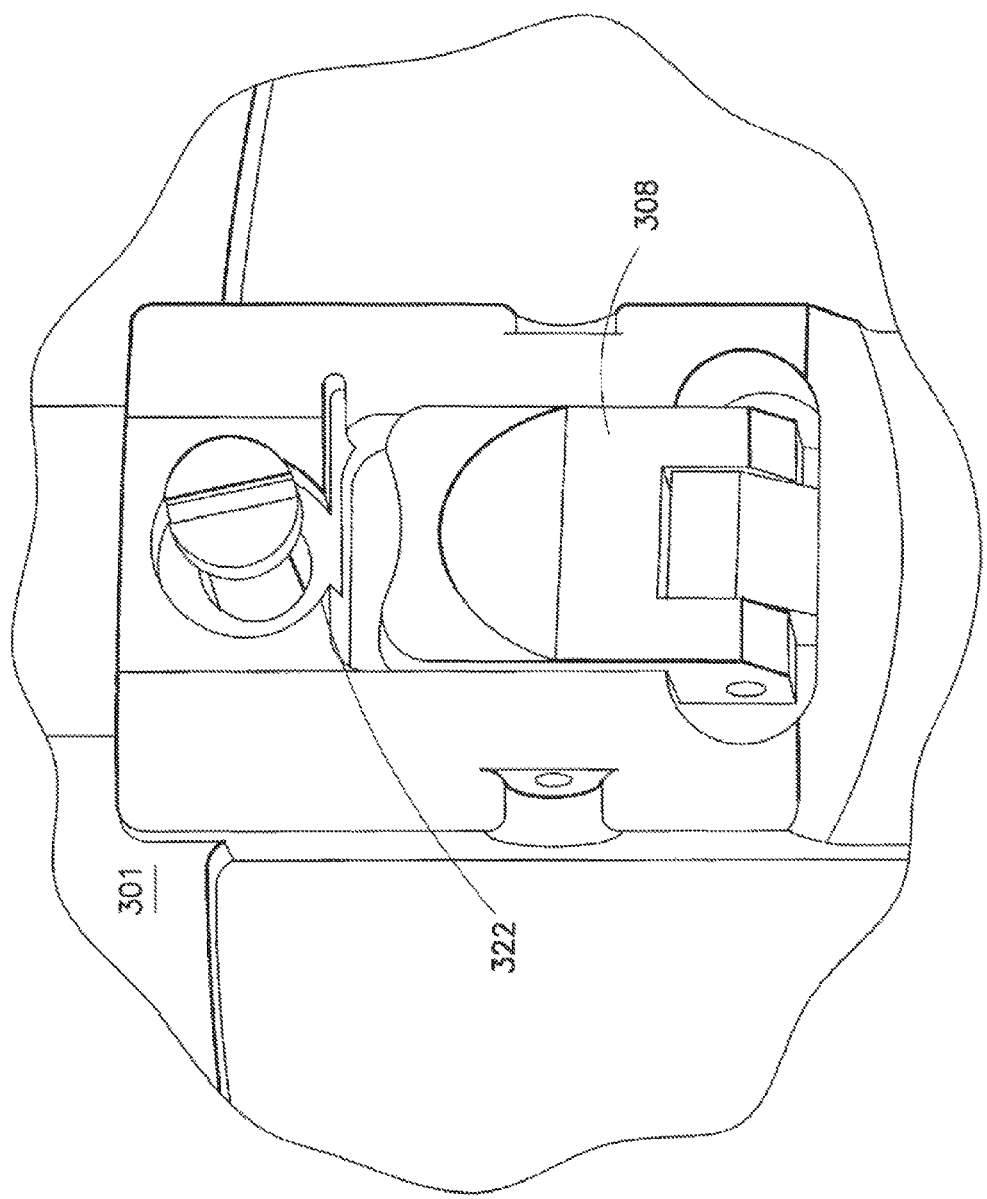
Figure 17:
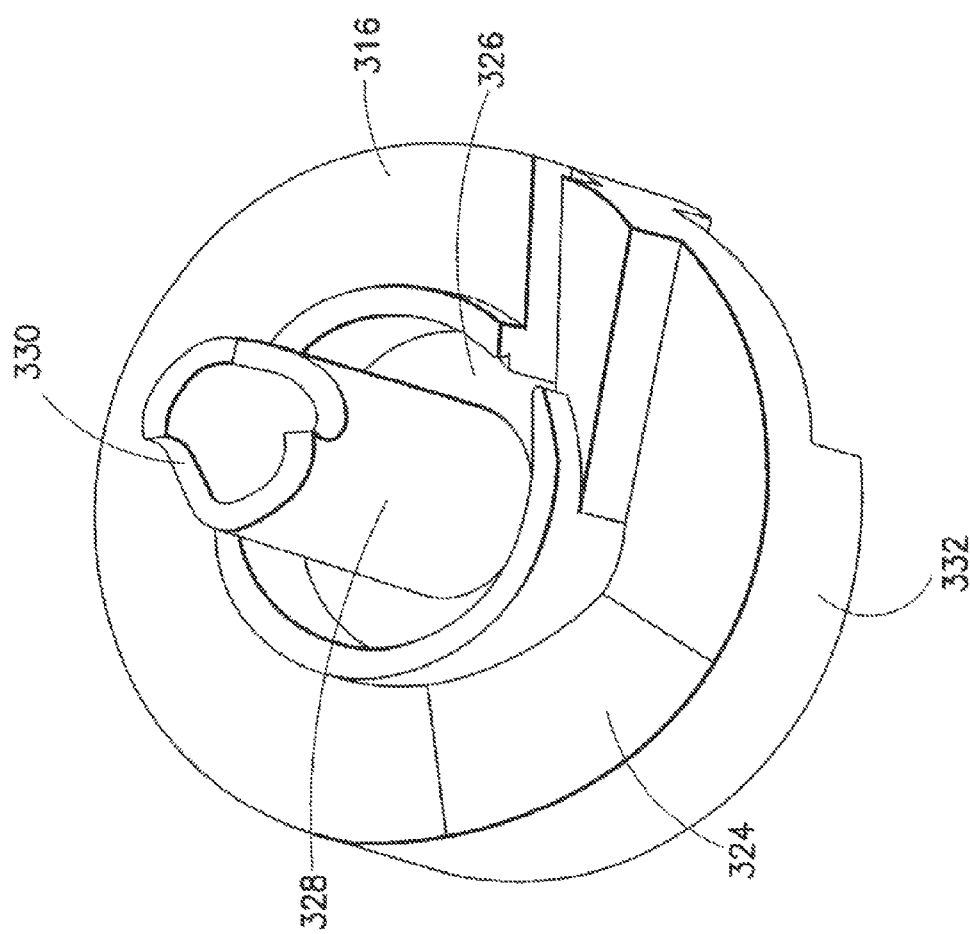

FIG. 10 shows the connector 300 in a front elevation view, with the handle 318 in a down position. FIG. 11 shows the connector 300 in a corresponding rear elevation view. FIG. 12 shows a front perspective view of the connector 300 with the handle 318 in an up/unlocked position. FIG. 13 is a bottom perspective view of the connector 300 showing the push off cam 310 coupled with pivot clamp cam 314. As illustrated, push off cam 310 has a groove therein to facilitate coupling of the connector with the cap of the vessel. FIG. 14 shows another bottom perspective view with the handle 318 in the down position, from which position the push off cam is able to rotate upwardly. FIG. 15 is a side perspective view of the connector 300 showing the handle stop 320 on the exterior surface of the connector body 301, which limits the travel of the handle 318 to a vertical position. FIG. 16 is a perspective view of a portion of the connector showing the details of the pivot clamp 308 and the associated torque spring cut out 322. FIG. 17 is a perspective view of the pivot clamp cam 316, showing the details of its structure as including a main disk-shaped body 332, a ramp surface 324 thereon, a cylindrical collar 328 with an inner surface 330 configured to interlock with the push off cam, and a torque spring cut out 326.

By the structure of the connector as shown in FIGS. 9-17, there is provided an easily installable and removable connector for engagement with the liner-based fluid storage and dispensing vessel 302.

A further aspect of the invention relates to a fitment seal and a liner-based fluid storage and dispensing package utilizing same.

Figure 21:
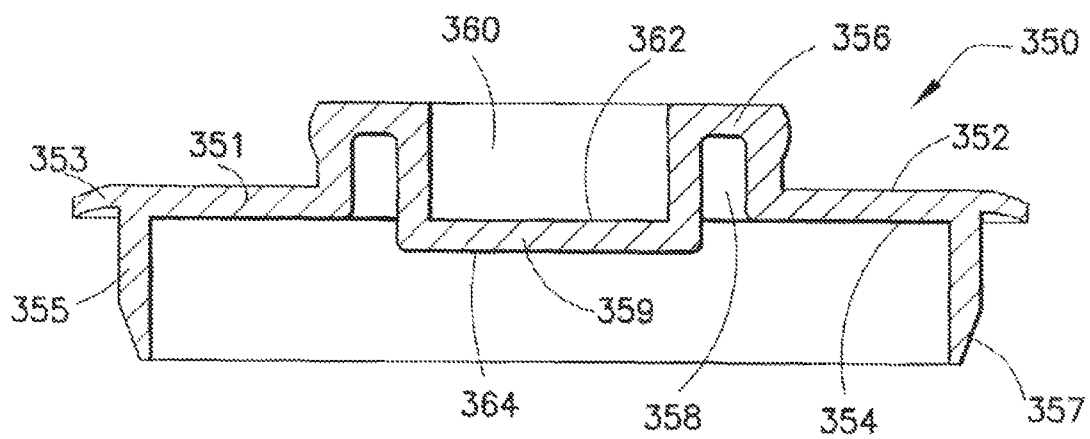
FIG. 21 is a cross-sectional view of the fitment seal of FIG. 20, taken along line A-A thereof.
Figure 22:
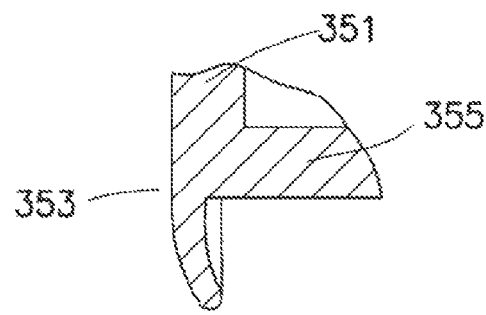
FIG. 22 is an enlarged view of the outer edge portion of the fitment seal as shown in FIG. 21.
Figure 23:
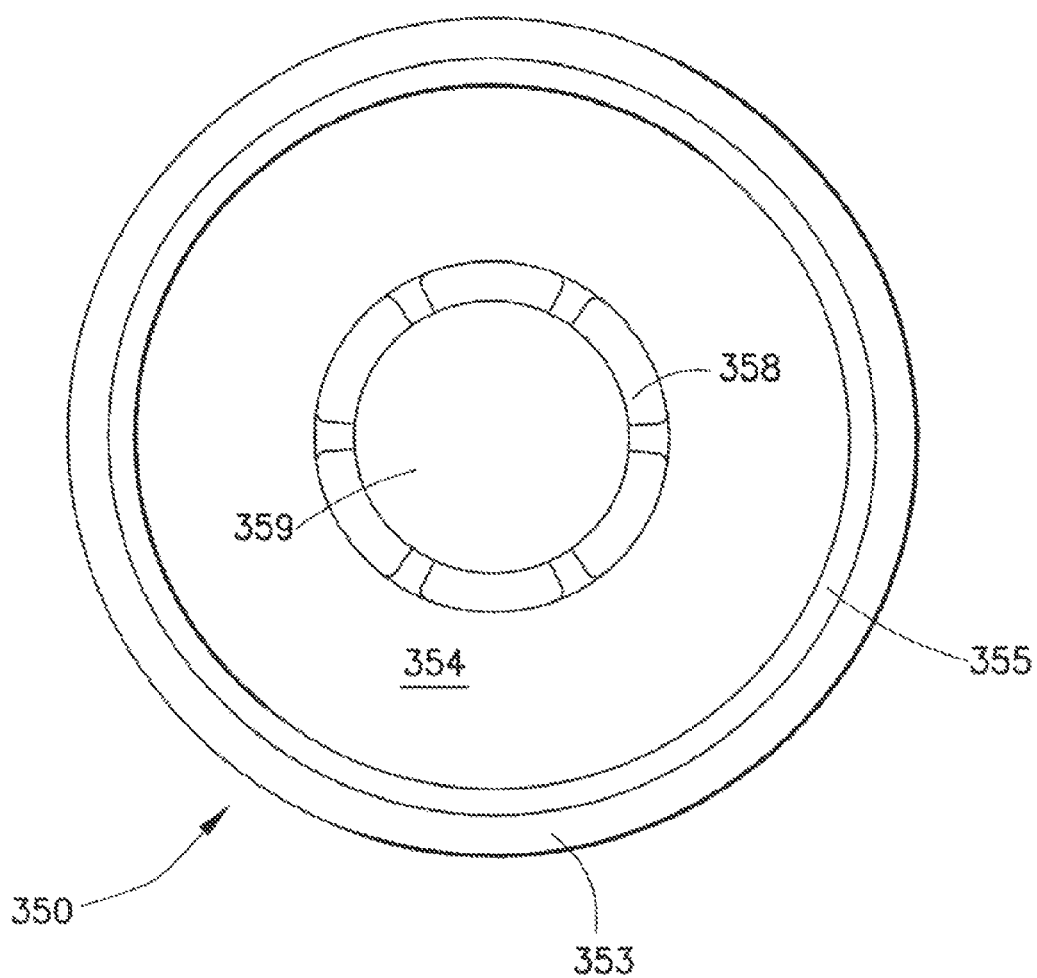
FIG. 23 is a bottom plan view of the fitment seal of FIGS. 18-19.

The fitment seal article is shown in FIGS. 18-23 in an illustrative embodiment thereof, with FIGS. 18-23 showing the fitment seal article and FIG. 23 showing such article as installed on the fitment of a liner in a liner-based fluid storage and dispensing package.

Figure 18:
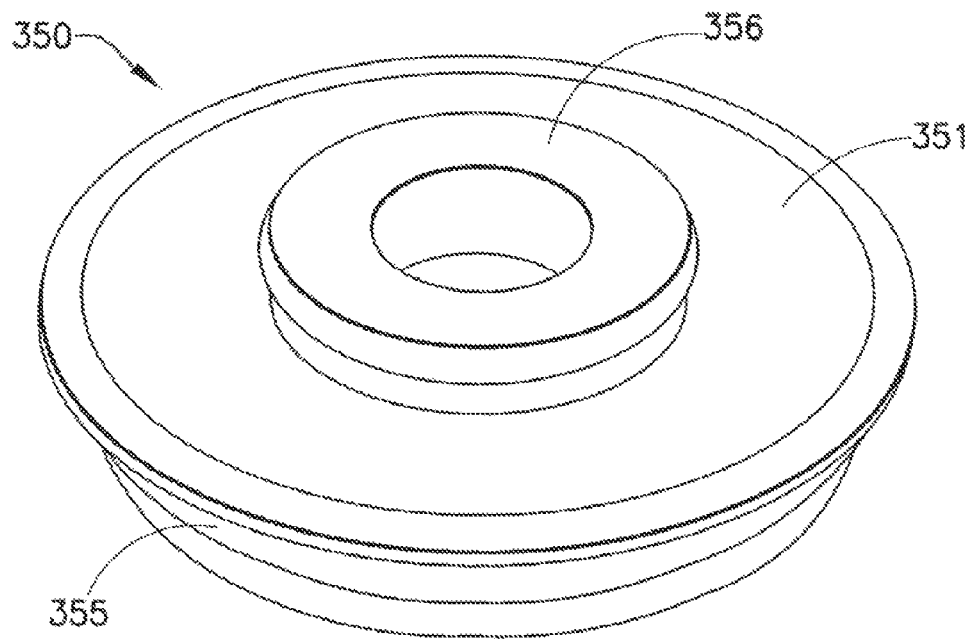
FIG. 18 is a perspective view of a fitment seal according to one embodiment of the invention, showing the details of the upper portion thereof.

FIG. 18 is a perspective view of a fitment seal 350 according to one embodiment of the invention, showing the details of the upper portion thereof. The fitment seal 350 has a main disk-shaped body 351, from which downwardly depends a cylindrical sealing wall 355. The main disk-shaped body 351 includes an annular boss 356 upwardly extending from the main body top surface.

Figure 19:
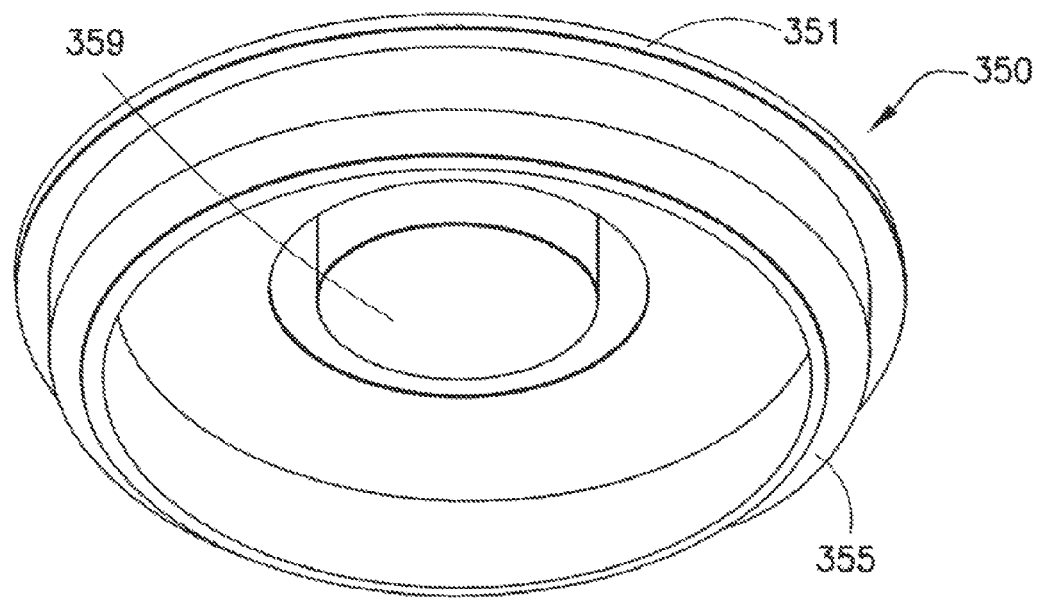
FIG. 19 is a perspective view of the fitment seal of FIG. 18, showing the details of the bottom portion thereof.

FIG. 19 is a perspective view of the fitment seal 350 of FIG. 18, showing the details of the bottom portion thereof. The fitment seal 350 includes the disk-shaped main body 351 and cylindrical sealing wall 355. A central floor portion 359 of the fitment seal is integrally formed with the main body 351 and forms a central well structure on the top surface of the seal as shown in FIG. 18 and a corresponding protrusion on the bottom surface of the seal as shown in FIG. 19.

Figure 20:
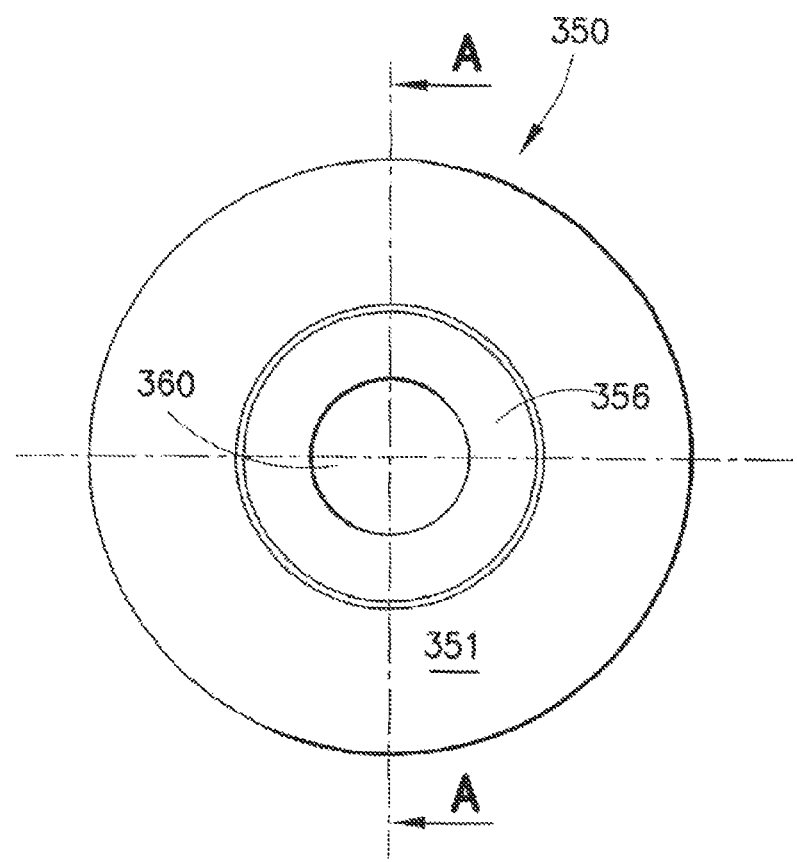
FIG. 20 is a top plan view of the fitment seal of FIGS. 18-19.

FIG. 20 is a top plan view of the fitment seal of FIGS. 18-19. As illustrated, the seal includes disk-shaped main body 351 and annular boss 356 circumscribing a central well 360.

FIG. 21 is a cross-sectional view of the fitment seal of FIG. 20, taken along line A-A thereof. The fitment seal 350 as shown includes the disk-shaped main body 351 terminating at an outer peripheral edge portion that is tapered, as shown in the detailed enlarged view of FIG. 22.

The main body 351 has a main top surface 352 and a main bottom surface 354. The cylindrical sealing wall 355 at its lower end portion has an inwardly tapered outer surface 357. The main body 351 includes a central well 360 that is circumscribed by the annular boss 356 protruding upwardly from the main top surface of the body. A central floor member 359 has a main top surface 362 in the well, and a corresponding main bottom surface 364 defining a protrusion on the bottom portion of the fitment surrounded by an annular groove 358.

FIG. 22 is an enlarged view of the outer edge portion of the fitment seal as shown in FIG. 21. The outer edge portion as shown includes a downwardly tapered edge profile of the top surface of the main body 351 and the cylindrical sealing wall 355 as illustrated is integrally formed with and downwardly depends from the main body 351.

FIG. 23 is a bottom plan view of the fitment seal 350 of FIGS. 18-19, showing the outer peripheral edge portion 353 of the main body and the downwardly depending cylindrical sealing wall 355, the central floor member 359, the main bottom surface 354 of the fitment seal, and the annular groove 358.

Figure 24:
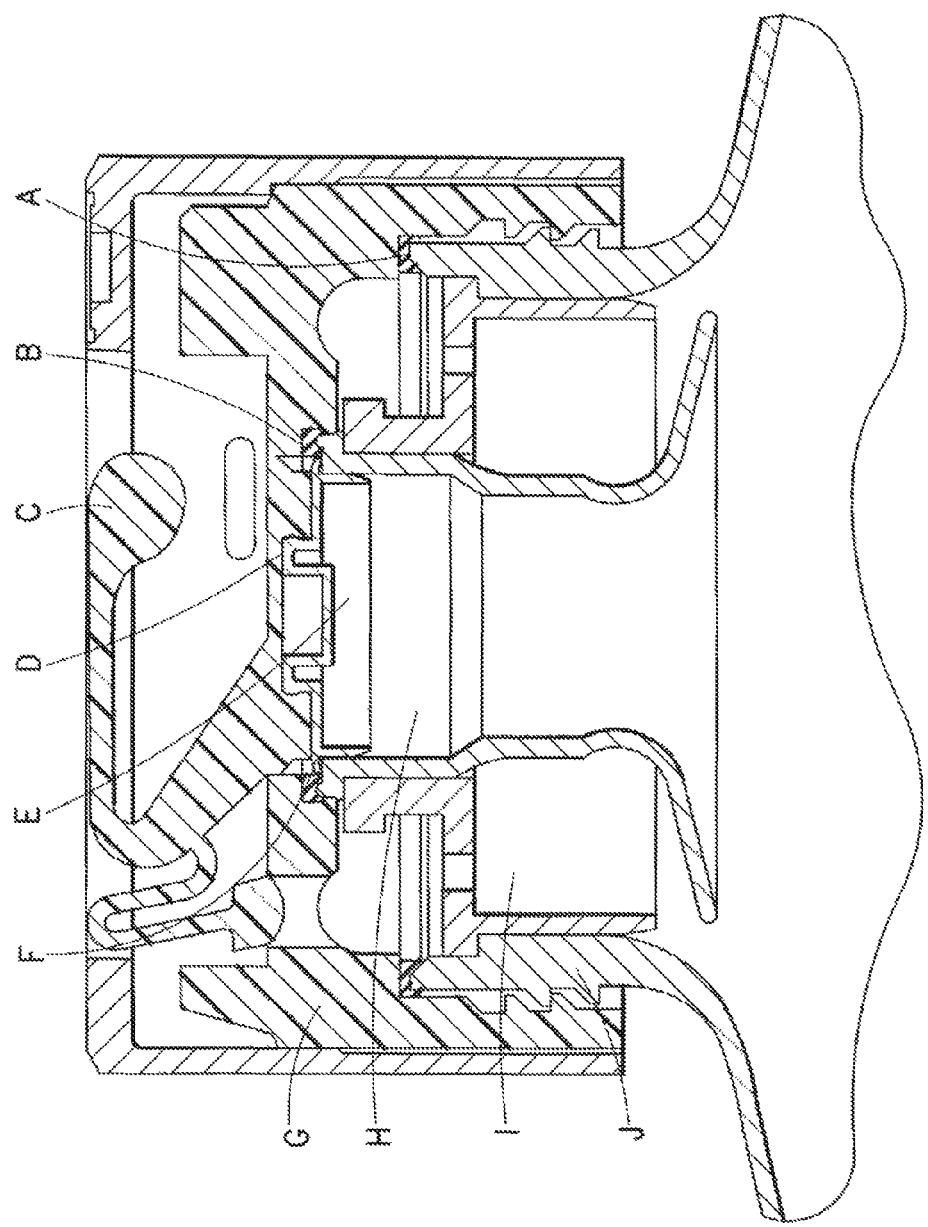
FIG. 24 is a partial cross-sectional elevation view of a fluid storage and dispensing vessel including the fitment of FIGS. 18-19 as positioned to seal a fitment of the vessel.

FIG. 24 is a partial cross-sectional elevation view of a fluid storage and dispensing vessel including the fitment seal of FIGS. 18-19 as positioned to seal a fitment of the vessel.

The fitment seal E is shown in FIG. 24 as reposed in the port opening of a fitment H, which in turn is coupled to a liner (not shown in FIG. 24), and a cap G is shown as engaged with an upper portion of the rigid overpack of the vessel, at complementary threadings of the respective structures.

The fitment seal arrangement of FIG. 24 provides an effective sealing of the fluid in the liner associated with the fitment H, to protect such fluid against contamination from the ambient environment of the fluid storage and dispensing package. The various seals in the illustrated structure include a secondary gas seal A between the rigid overpack and the cap G, and a secondary gas seal B between the fitment (opening to the liner) and the cap.

A tear tab grip handle C is present as illustrated, and the fitment seal E is constructed to provide a snap fit connection generally represented at D between the fitment seal and the tear tab. The fitment seal E provides a circular flange F at its outer peripheral portion for sealing of the fitment H. A retainer ring I holds and positions the fitment H with relation to the neck J of the rigid overpack vessel.

The fitment seal of the invention is formed of any suitable material of construction, such as a rubber, polymeric or other flexible resilient material, and is attached with the downwardly depending cylindrical wall of the seal being interiorly positioned in the fitment port opening to effectively seal the fluid contents of the liner when the cap is installed on the vessel. The outer vertically extending surface of the downwardly depending cylindrical wall of the seal make an interference fit with the internal surface of the fitment positioned in the neck of the vessel, providing an extended cylindrical region of sealing of the fitment.

The bottom portion of the downwardly extending cylindrical wall is tapered to ensure a ready insertion of the fitment seal into the fitment. The well structure of the central portion of the fitment seal allows the seal to bow or dome when the seal makes contact with the neck of the fitment, and to provide a strong sealing action on the fitment.

The outer peripheral flange portion of the fitment seal provides a wiper-like function to stop any particles that are produced above it from entering the fluid below, and also assists in supporting the outer edge of the seal to keep it from "rolling in" and losing seal integrity.

The cap as shown in FIG. 24 has interior protrusions that engage with the radially outwardly projecting flange at the mouth of the fitment H, and serve to support the outside edge of the fitment to keep it from enlarging and relieving sealing pressure on the fitment seal. The cap as mentioned has a tear tab feature directly above the fitment seal. The fitment seal advantageously is connected to this tear tab structure, so that when the tear tab is torn free, the fitment seal is pulled out of the fitment and remains associated with the tear tab.

The fitment seal shown in FIG. 24 has the following advantages over currently employed membrane seals: (i) the fitment seal is not punctured or broken, but rather is removed by being lifted out of the fitment in which it is reposed, so that the number of particles produced in removing the fitment seal is far smaller than is generated in puncturing of a breakseal membrane; (ii) the fitment seal has wiper-like structure projecting outwardly at the edge region of the seal and extending to the cap, to shieldingly protect the contained fluid from any particles produced by any action above the seal; (iii) since the seal is completely removed from the fitment, unlike the currently employed breakseal membrane that drags along the entire length of the probe as the probe is installed, the probe in the seal arrangement of the present invention can be installed without making contact with any surface and without pick-up of particles and carryover of same into the contained fluid; (iv) the fitment seal of the present invention is a separate and discrete part and the material of construction thereof can be varied to suit the specific fluid that is being contained in the fluid storage and dispensing package; (v) the fitment seal as attached to a tear tab can be easily reinserted to seal an empty or partially used fluid storage and dispensing package; (vi) the force required to insert the probe into the fluid in the vessel is very small, since the fitment seal of the invention is completely removed; (vii) the fitment seal of the invention can move up and down with respect to the fitment without affecting the sealing action of the fitment seal, i.e., the seal integrity is not affected by a relaxation of the vertical clamping force, in consequence of the extended vertical engagement of the seal's downwardly extending cylindrical wall with the inside surface of the fitment.

Another aspect of the invention relates to a cap adapted for engagement with a liner-based fluid storage and dispensing package, as a closure for the package.

FIG. 25 is a schematic perspective view of a cap 370 for a fluid storage and dispensing package, featuring anti-rotation structure on the side wall of the cap. The cap 370 as shown includes a main cap body 372 including a side wall 374 of cylindrical form, and a circular top wall 376. The side wall 374 features circumferentially spaced-apart cut-outs 380 extending upwardly from the bottom edge of the side wall 374 to an intermediate portion 378 of the side wall. These cut-outs in the embodiment shown are of generally rectangular shape, and at an upper end thereof are connected to generally downwardly depending anti-rotation finger elements 382. Each finger element 382 has an elongate strip portion 384 that is biased in the absence of force thereon to an outwardly flared position, and terminates at a lower end thereof in a radially inwardly extending lug element 386. The finger elements 382 may be formed integrally with the body of the cap, or they may be formed a separate elements that are subsequently secured to the body of the cap, in the cut-outs 380.

The cap 370 may be part of any suitable material of construction. In specific embodiments, the cap is suitably formed of a polymeric material, such as polyethylene, polypropylene, polytetrafluoroethylene, or other suitable material of construction.

FIG. 26 is a schematic view of a fluid storage and dispensing vessel 390 and associated cap structure matably engageable therewith. The vessel 390 as shown has a neck 392 in which has been formed a circumferentially extending band of the spaced-apart locking cavities 394. In this illustrated embodiment, the locking cavities 394 are of square shape, to cooperatively made with lugs 386. As shown, the cap body 372 is fabricated so that the finger elements 382 are biased outwardly, with the elongate strip portion 384 depending downwardly away from the cap body, out of engagement with the locking cavities 394.

FIG. 27 is a schematic view of a fluid storage and dispensing vessel and associated cap structure and connector body structure, showing the cooperative character thereof.

The fluid storage and dispensing vessel 390 as previously described is fabricated with a series of locking cavities 394 on the outer surface of its neck portion. The cap 372 is overfitted by the connector body 396, with the cylindrical wall of the connector body bearing on the finger elements of the cap, so that the lug 386 of each finger element lockingly engages a corresponding locking cavities 394 on the neck of the fluid storage and dispensing vessel 390.

Thus, when the dispense connector is engaged with the cap, the cylindrical side wall of the connector slides downwardly over the cap, and forces the finger elements 382 radially inwardly so that the lugs 36 cooperatively made with the locking cavities in the outer surface of the neck region of the vessel 390. By this arrangement, the cap is prevented from being unscrewed from the neck of the vessel, while the connector is engaged with the cap.

Figure 28:
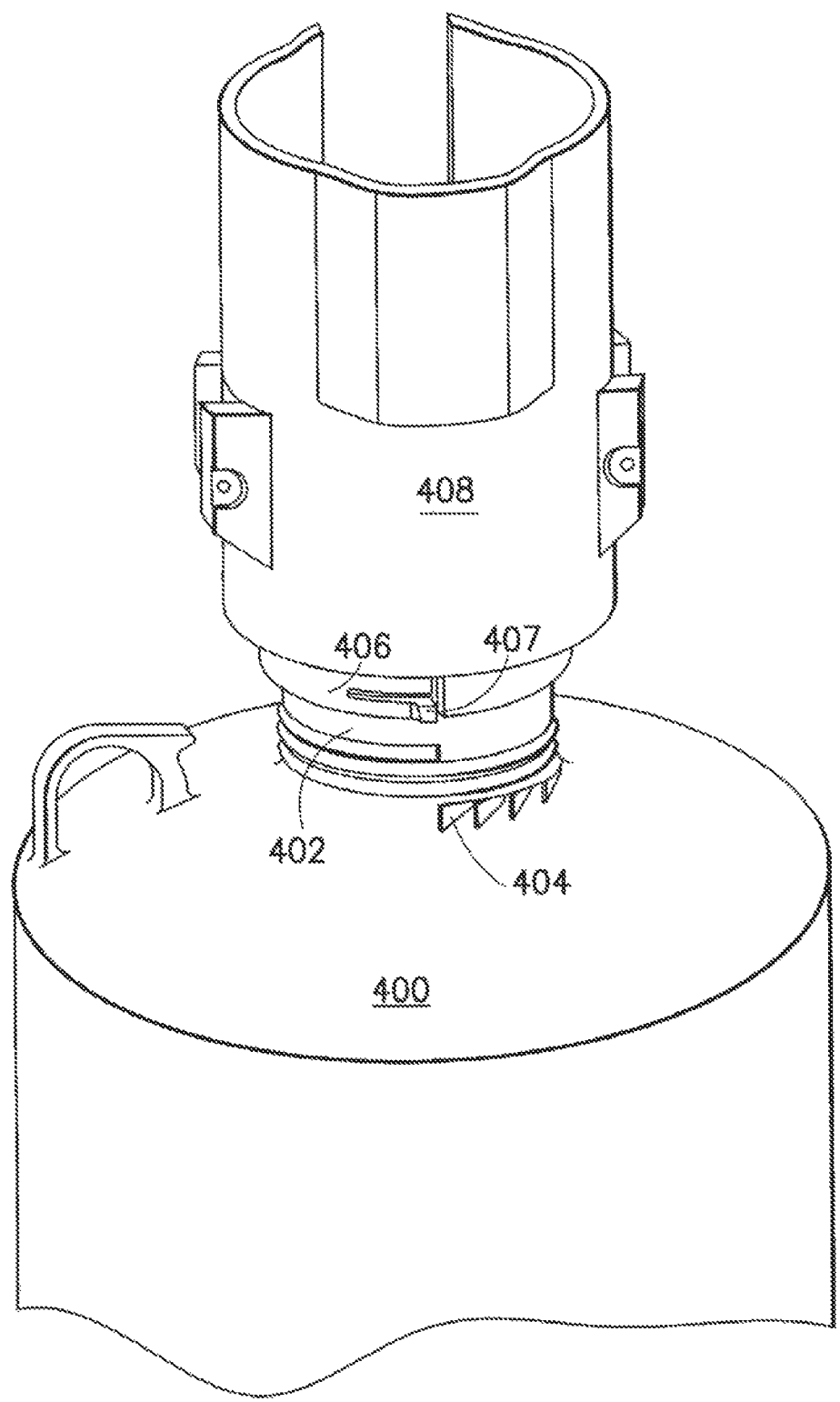
FIG. 28 is a perspective view of a fluid storage and dispensing package, featuring anti-rotation locking structure on the neck region of the vessel, with an associated cap and a connector.

Another anti-rotation structure for a cap adapted for engagement with a liner-based fluid storage and dispensing package, as a closure for the package, is shown in FIG. 28.

FIG. 28 is a perspective view of a fluid storage and dispensing package, featuring anti-rotation locking structure 404 on the neck region 402 of the vessel 400, with an associated cap 406 and a connector 408. As shown, the vessel neck region 402 features threading thereon, with which complementary threading on cap 406 is threadably engageable. On its exterior surface, the cap 406 has an outwardly extending tab 407, which is locked by the connector 408 when the connector is engaged with the cap. The connector body in such engagement functions to bend the tabs inwardly, to thereby activate the locking structure. After such activation, when the cap is rotated after the connector has been engaged therewith, the tabs will be blocked by a tooth of the ratchet structure 404, thereby preventing the cap from being removed from the vessel.

When the connector is removed from the cap, the tab element(s) on the cap will spring back to their outwardly biased position, out of position for engagement with the ratchet structure 404.

The tabs 407 on the cap thus are fabricated so that they are normally biased to an outwardly extended position, out of engagement with the ratchet structure 404. It is only when the tabs are compressed to a radially inward position that they become available for locking engagement with the ratchet structure 404.

Figure 29:
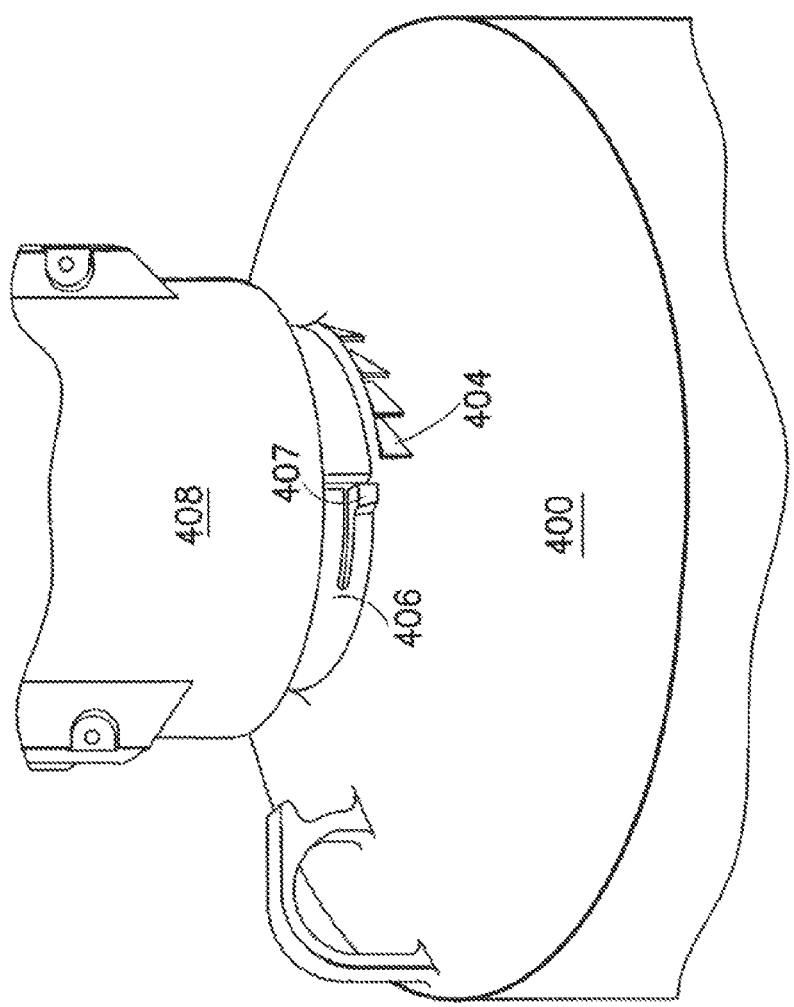
FIG. 29 is a perspective view of the fluid storage and dispensing vessel and associated cap and connector structure of FIG. 28, showing the details thereof.

FIG. 29 is a perspective view of the fluid storage and dispensing vessel and associated cap and connector structure of FIG. 28, showing the details thereof. The various parts and features in FIG. 29 are correspondingly numbered to those of FIG. 28. In the position shown in FIG. 29, the tab 407 on the cap 406 has been translated by connector 408 to a position at which rotation of the cap is blocked by the ratchet structure 404.

Figure 30:
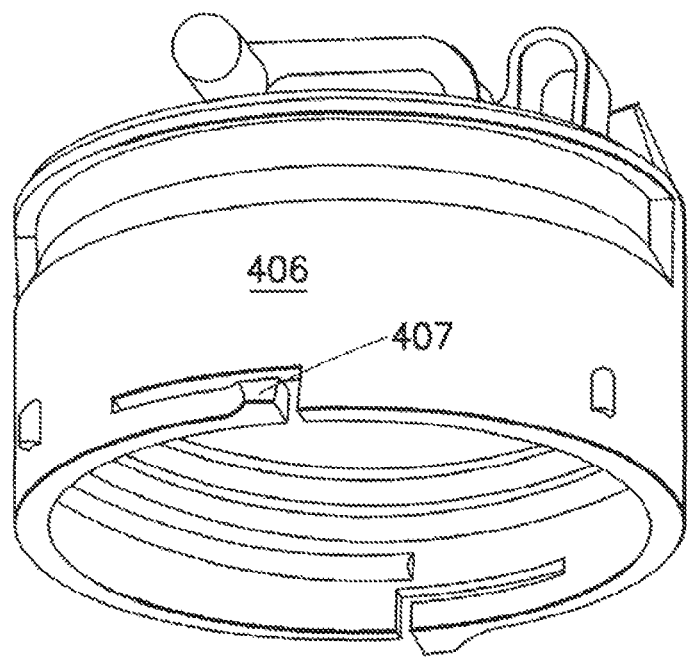
FIG. 30 is a perspective view of a cap of the fluid storage and dispensing vessel of FIG. 28.

FIG. 30 is a perspective view of a cap 406 of the fluid storage and dispensing vessel of FIG. 28, showing the tab 407 in its normal outwardly biased position.

Figure 31:
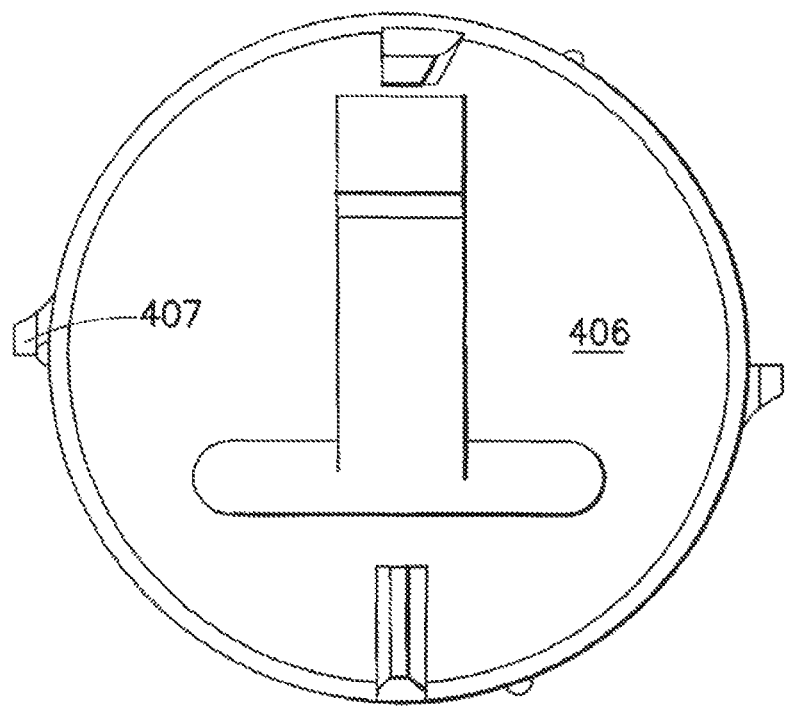
FIG. 31 is a top plan view of the cap of FIG. 30.

FIG. 31 is a top plan view of the cap 406 of FIG. 30, showing the tab 407 in its normal outwardly biased position.

Figure 32:
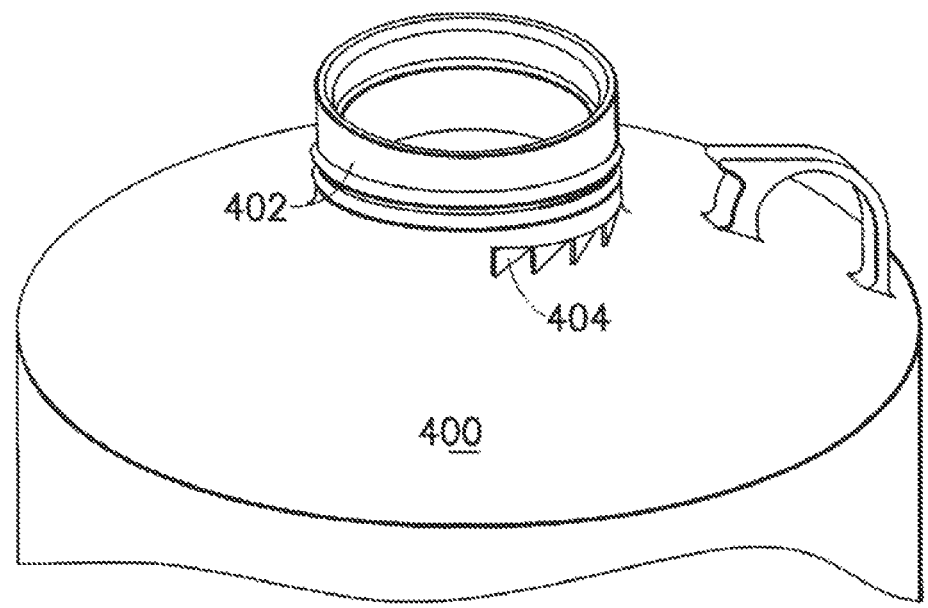
FIG. 32 is a perspective close-up view of the fluid storage and dispensing vessel of FIG. 28, showing the details of the anti-rotation locking structure on the neck region of the vessel.

FIG. 32 is a perspective close-up view of the fluid storage and dispensing vessel 400 of FIG. 28, showing the details of the anti-rotation locking structure 404 on the neck region 402 of the vessel. The neck region 402 may be provided as shown with threading that is complementary to the threading on an inner surface of the cap, whereby the cap may be engaged with the neck of the vessel.

By the structure shown in FIGS. 28-32, a simple arrangement is provided for preventing the cap from being removed from the vessel, while the connector is attached to the cap.

Another anti-rotation structure for a cap adapted for engagement with a liner-based fluid storage and dispensing package, as a closure for the package, is shown in FIGS. 33-36. In this embodiment, they locking structure includes a projection on the vessel neck region that fits into a cut-out on the lower part of the cap when the cap is screwed into final position on the vessel. The locking structure in this embodiment is independent of whether the connector is installed on the cap or not. The cap can be unlocked in either by squeezing the cap on opposite sides thereof, 90° from the locking structure, to deform the cross-sectional shape of the cap to an oval or ovoid form, or by using a suitable removal tool.

As another variation, the locking structure may be designed such that it can be torn off by pulling on a tab. The tab would be covered when the connector is installed, thereby requiring removal of the connector from the cap, before the cap itself can be removed.

Figure 33:
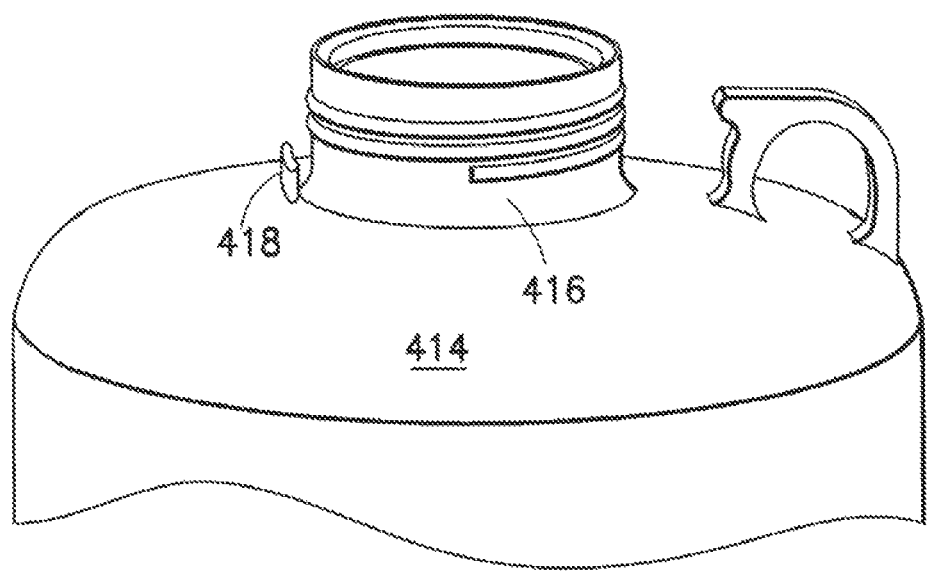
FIG. 33 is a perspective view of a fluid storage and dispensing vessel, featuring anti-rotation locking structure on the neck region of the vessel.

FIG. 33 is a perspective view of a fluid storage and dispensing vessel 414, featuring anti-rotation locking structure 418 on the neck region 416 of the vessel. The vessel 414 itself may be formed of any suitable material of construction, and then a preferred embodiment, the vessel is formed of a polymer such as polyethylene, polypropylene, or polytetrafluoroethylene. The anti-rotation locking structure 418 is constituted by a vertically upstanding post provided on the shoulder of the vessel 414, at the neck region of the vessel. The neck of the vessel may, as previously described, be provided with suitable threading or other matable engagement structure, to accommodate coupling with the cap, in use of the vessel.

Figure 34:
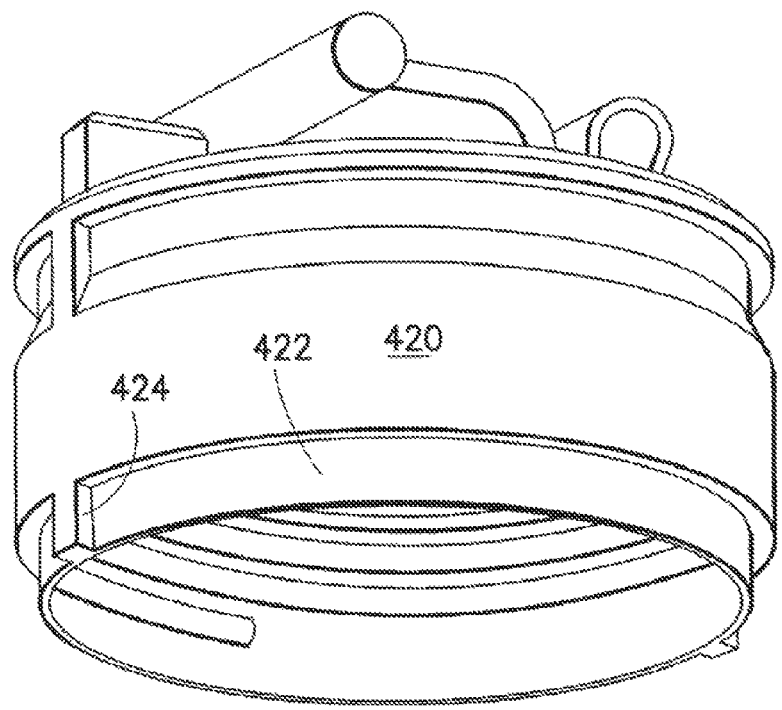
FIG. 34 is a perspective view of a cap engageable with the anti-rotation locking structure on the neck region of the vessel of FIG. 33.

FIG. 34 is a perspective view of a cap 420 engageable with the anti-rotation locking structure on the neck region of the vessel of FIG. 33. The cap features a lower end portion having a lesser wall thickness than the side wall portion of the cap above such lower end portion, between circumferentially spaced-apart full thickness spar elements 424, thereby defining a series of the circumferentially spaced-apart channels 422.

Figure 35:
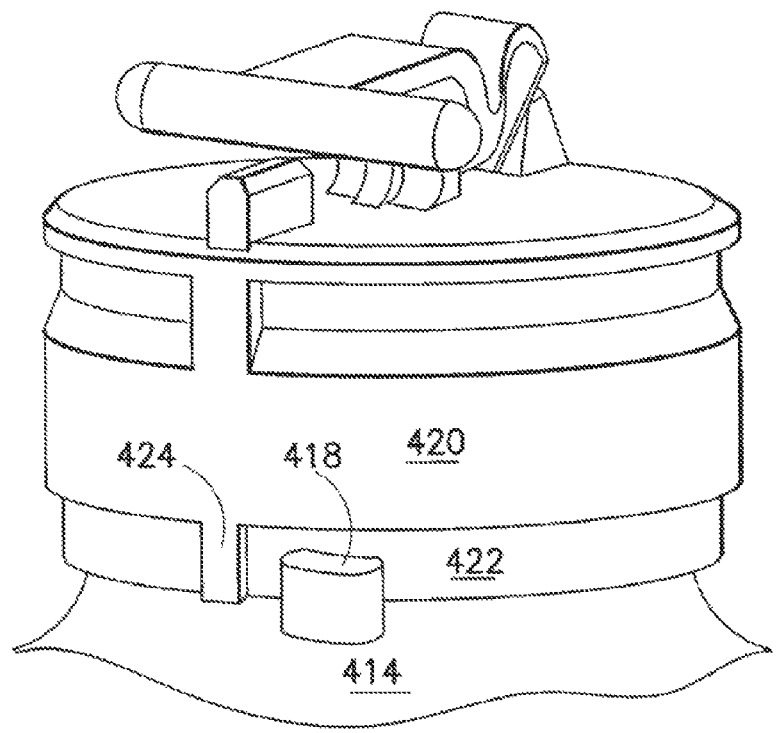
FIG. 35 is a perspective view of the cap of FIG. 34, as engaged with the locking structure on the neck region of the fluid storage and dispensing vessel of FIG. 33.

FIG. 35 is a perspective view of the cap 420 of FIG. 34, as engaged with the locking structure 418 on the neck region of the fluid storage and dispensing vessel 414 of FIG. 33. As shown, the spar element 424 blocks the rotational movement of the cap 422 to the presence of the post locking structure 418 in the channel 422 of the cap.

Figure 36:
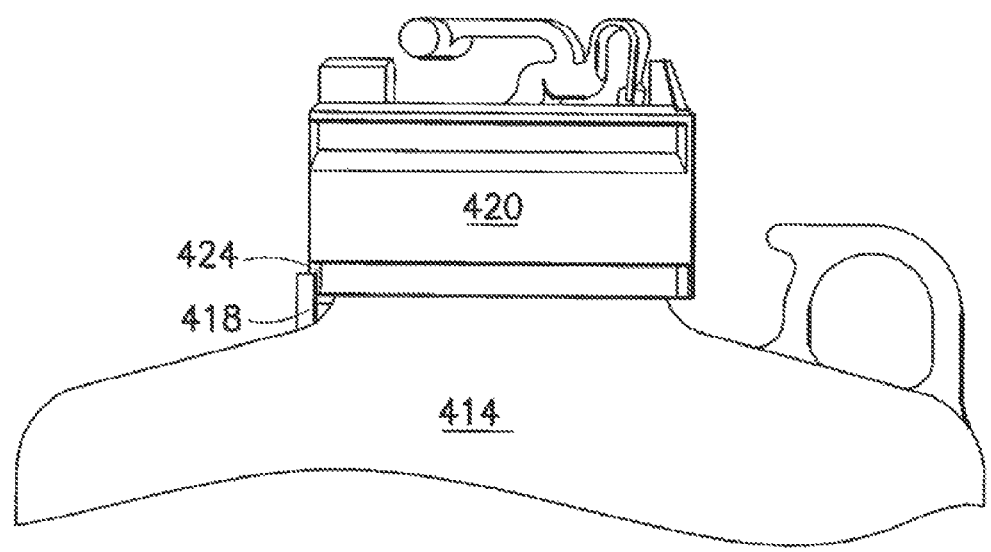
FIG. 36 is an elevation view of the cap of FIG. 34, as engaged with the locking structure on the neck region of the fluid storage and dispensing vessel of FIG. 33.

FIG. 36 is an elevation view of the cap 420 of FIG. 34, as engaged with the post locking structure 418 on the neck region of the fluid storage and dispensing vessel of FIG. 33.

By such arrangement, the cap 420 is readily engaged with the neck of the vessel 414, and secured in a locked position, as a safeguard against removal thereof from the vessel.

Figure 37:
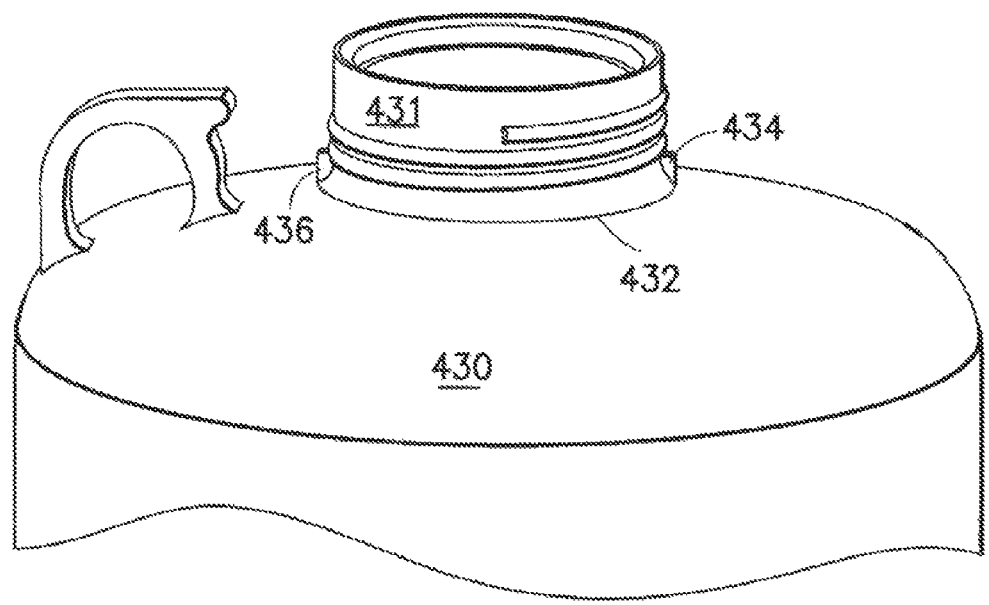
FIG. 37 is a perspective view of a fluid storage and dispensing vessel, featuring anti-rotation locking structure on the neck region of the vessel.
Figure 38:
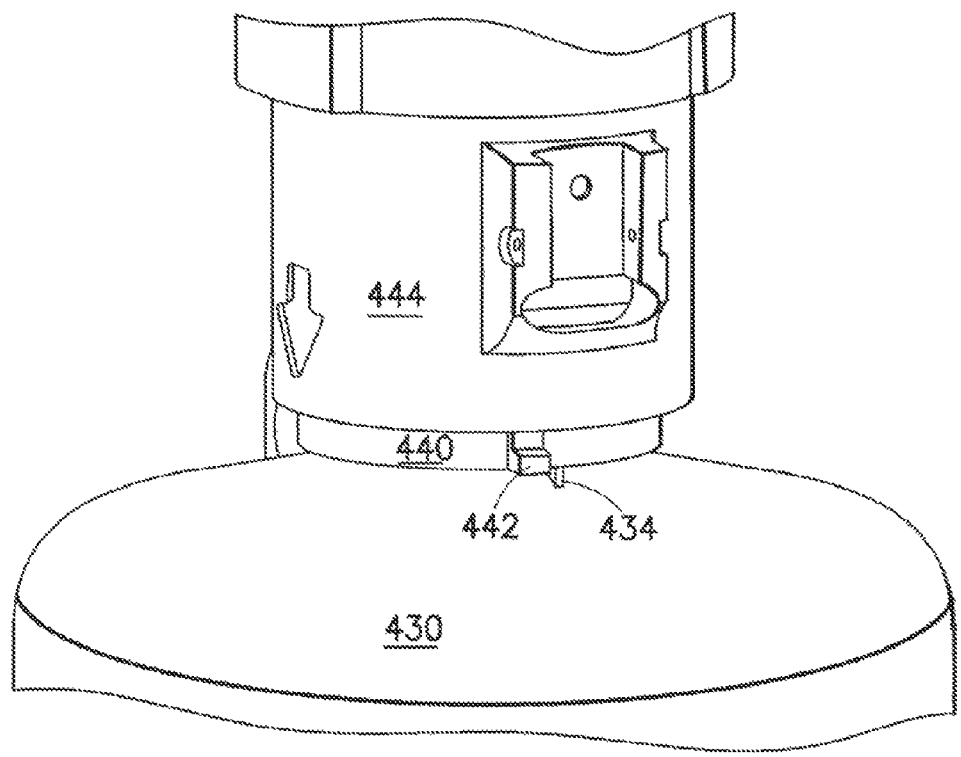
FIG. 38 is a perspective view of a cap engaged with the anti-rotation locking structure on the neck region of the vessel of FIG. 37, with the cap being overfitted by a connector.
Figure 39:
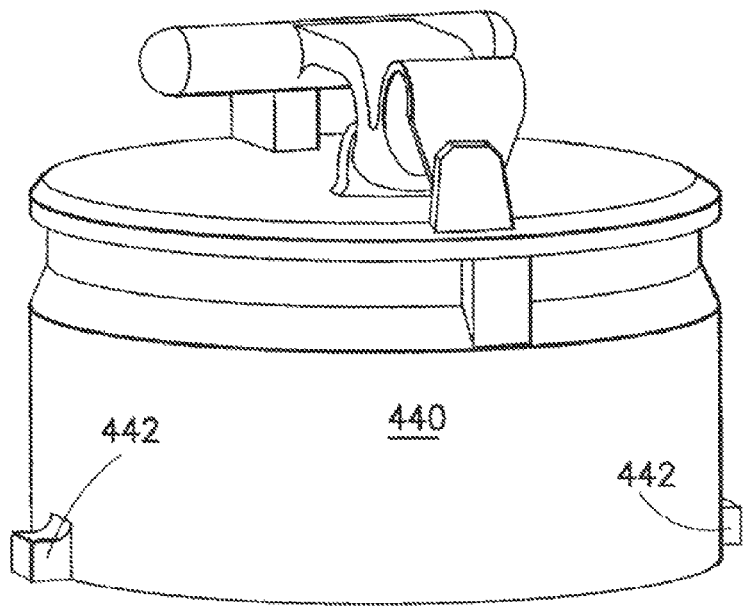
FIG. 39 is a perspective view of the cap of FIG. 38, showing the details of the locking structure of the cap.

Another anti-rotation structure for a cap adapted for engagement with a liner-based fluid storage and dispensing package, as a closure for the package, is shown in FIGS. 37-39. In this embodiment, the locking structure includes vertical tab projections on the vessel neck region that block protrusions on the lower part of the cap when the cap is screwed into final position on the vessel.

FIG. 37 is a perspective view of a fluid storage and dispensing vessel 430, featuring anti-rotation locking tabs 434 and 436 on the neck region 432 of the vessel. The neck in 431 of the vessel may be provided with threading or other engagement structure for a coupling of the cap thereto. The tabs 434 and 436 extend upwardly from the vessel surface, as shown.

FIG. 38 is a perspective view of a cap 440 coupled to the neck of vessel 430, with protrusion 442 of the cap being engaged with the anti-rotation locking tab 434 on the neck region of the vessel. The cap in this embodiment is overlaid by the connector 444.

FIG. 39 is a perspective view of the cap 440 of FIG. 38, showing the locking protrusions 442 circumferentially spaced-apart from one another at the lower edge portion of the cap.

In another aspect of the invention, the currently employed breakseal is replaced by two seals, i.e., a non-wetted gas seal and a readily removable liquid seal. The gas seal is constituted by a circular ring that is positioned between the cap and the top of the fitment of the liner. This seal maintains pressure, as applied between the rigid overpack and the liner, from seeping into the center area of the cap where it otherwise could escape by egress from the connector probe entry opening. Gas pressure is required to squeeze the liner in order to effectuate compression of the liner to force the contained fluid out through the probe dispensing assembly.

The liquid seal is a simple plug that keeps the liquid from escaping the liner at the fitment. This plug is readily removed by either one of the following techniques.

In a first structural arrangement, the liquid seal is attached to the bottom of a tear tab on the cap. The liquid seal is removed when a weakened circular area in the top center of the cap is pulled and torn free. The probe assembly then can be installed directly into the vessel without removing the cap and without breaking through a seal. A separate plug with an O-ring seal is provided to close the pressurization hole in the cap. This plug preferably is attached to the tear tab, by means of a small strap or other connection structure, such the plug is readily removed when the tear tab is removed. This provision of a plug to seal the pressurization hole enables the pressurization hole to be completely molded with good sealing surfaces.

In a second arrangement, the liquid seal is attached to the bottom of a small plug located in the center of the cap. The liquid seal is removed when the plug is unscrewed from the cap. The probe assembly can then be installed. Additionally, removal of the plug uncovers the hole for access by the probe. Since the pressurization hole is covered and gasketed by the unscrewable center plug, the pressurization hole can be molded completely with good sealing surfaces.

By these arrangements, the probe of the dispensing assembly may be installed without breakage or tearing of a seal. This illuminates the requirement of high puncture forces required in current practice to puncture the breakseal, and avoids the creation of particles that could otherwise enter the high purity fluid in the liner. Additionally, the pressurization holes in the cap in both of the foregoing arrangements are able to be molded smoothly and resultantly to be effectively sealed without leaking.

In a further embodiment, the cap is formed of polyethylene coated with a coating of polytetrafluoroethylene to achieve the liquid seal. In another modification, an additional flat gasket is pinched between the inside bottom surface of the cap and the top of the gas seal gasket to effect the liquid seal.

Additional sealing arrangements in specific embodiments include the use of the plug with two O-rings to seal the inside diameter of the fitment of the liner, to create the liquid seal. A separate plug may be utilized in this arrangement, to seal the pressurization hole. As another alternative, a center plug formed of polytetrafluoroethylene is provided, which is screwed into the main cap. The plug creates a face seal on the top of the fitment of the liner, to create the liquid seal. A separate plug may be provided to seal the pressurization hole. As yet another variation, a solid polytetrafluoroethylene center plug may be provided, with an additional wedging mechanism to force the center plug against the top of the fitment to hold it in place. The polytetrafluoroethylene plug effects a face seal with the top of the fitment of the liner to create the liquid seal. As in the other arrangements, a separate plug may be provided to seal the pressurization hole.

Additional embodiments of the invention are shown in FIGS. 40-43, showing various handle-actuated connector removal arrangements of liner-based fluid storage and dispensing packages having connectors attached thereto, wherein the connector handles are manually operable to effect disengagement of the connectors from the respective fluid storage and dispensing packages.

Figure 40:
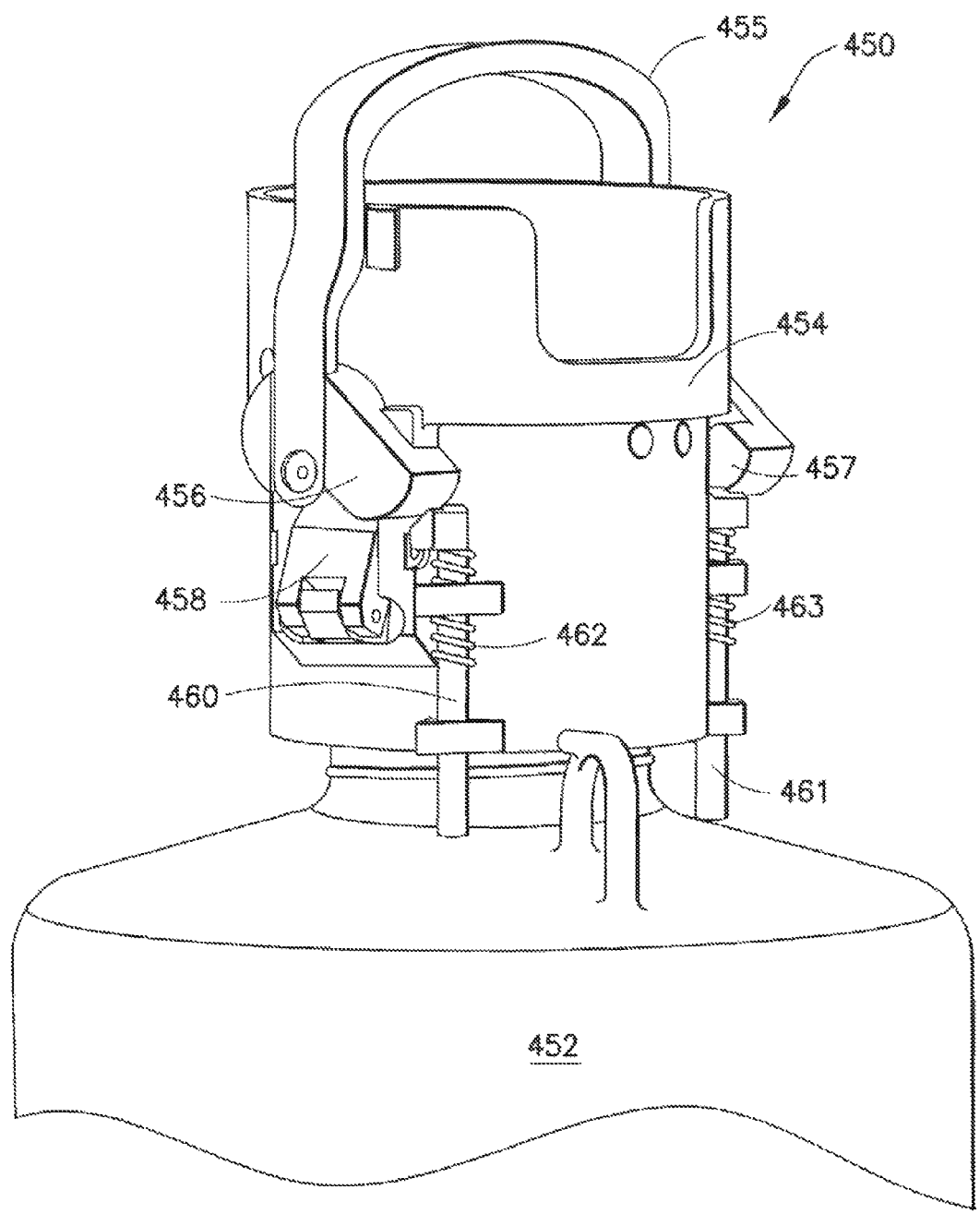
FIGS. 40-43 are views of various arrangements of liner-based fluid storage and dispensing packages having connectors attached thereto, and arranged with connector handles that are manually operable to effect disengagement of the connectors from the fluid storage and dispensing package.

FIG. 40 is a perspective view of a portion of a fluid storage and dispensing system 450 including a fluid storage and dispensing vessel 452 to which is secured a dispense connector 454. The dispense connector 454 utilizes a single post 460, 461 at each of the respective sides of the connector. Handle 455 is secured to the housing of the connector, and is coupled at its respective ends to radial cams 456, 457. As the handle 455 is rotated, the radial cams 406, 407 push the pivot clamps 458 inwardly (pivot clamp 458 being shown, and the system being symmetrically constructed with an additional pivot clamp on the side of the connector 454 opposite the sign shown in FIG. 40). With continued rotation of the handle, the radial cam at each end of the handle pushes on a respective post 460, 461. Each of such posts is spring-loaded, with spring 462 on post 460 and a spring 463 on post 461. The spring-loading of each post ensures that the handle moves back into position after use. The posts serve to transfer torque from the handle to exert a downward force on the fluid storage and dispensing vessel 452. The springs on the respective posts, together with torque springs, ensure that the handle is returned to its original orientation.

Figure 41:
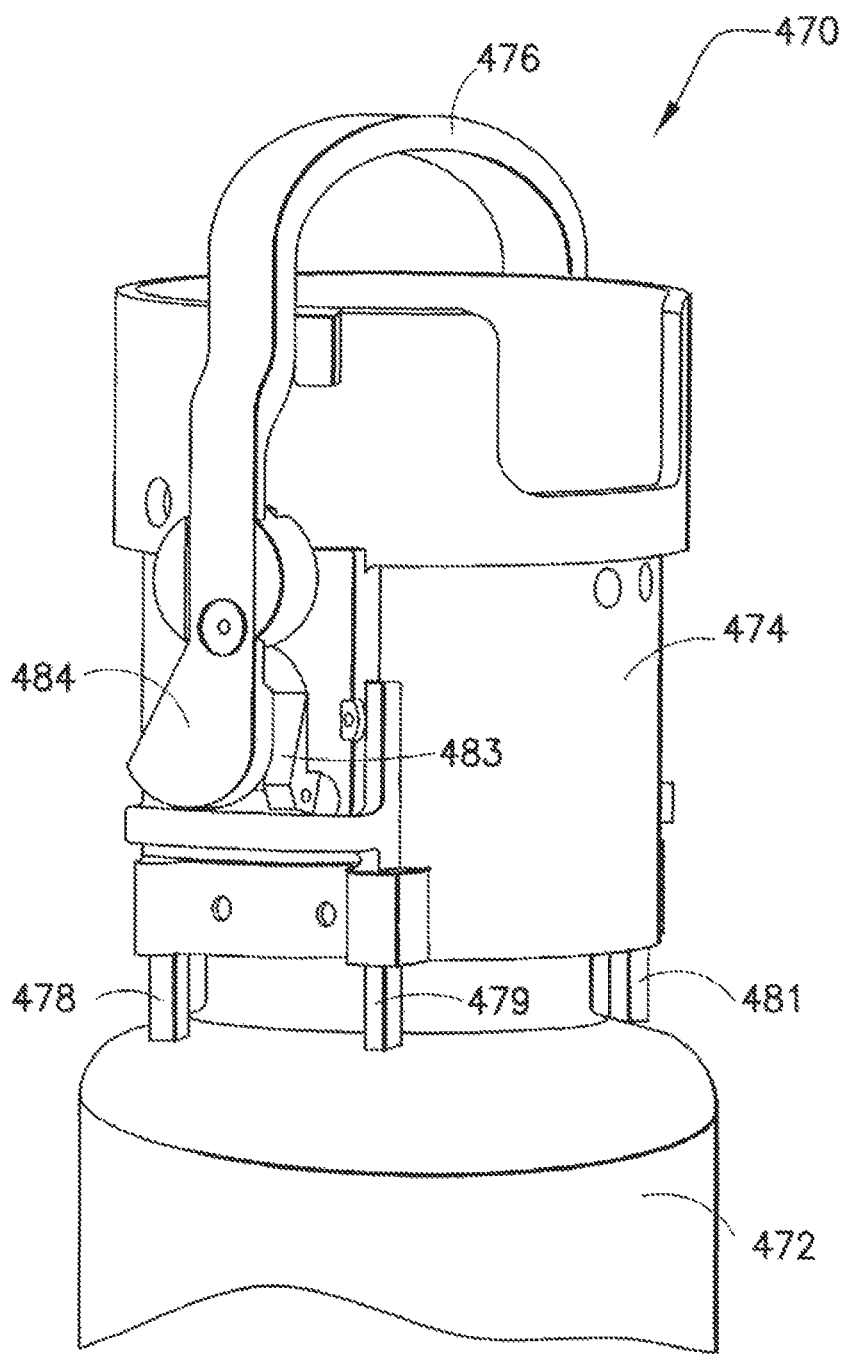

FIG. 41 is a perspective view of another fluid storage and dispensing system in which a connector 474 is coupled to a fluid storage and dispensing vessel 472. This embodiment utilizes two posts on each side of the connector. The two posts 478, 479 are shown at the left side of the system as depicted in FIG. 41, with one of the posts (post 481) being shown on the right side of the system as depicted in the drawing.

The handle 476 is secured to the housing of the connector, with respective ends being coupled to cams 484 that are used to transfer the torque of the handle into a vertical force. As the double post piece part moves downwardly under the action of the cams 484, a profile on the inner side of such part ramps up to press on the pivot clamps 483 in a linear motion. Linear springs on each post, together with torque springs, return the handle to its original orientation subsequent to manual translation thereof.

Figure 42:
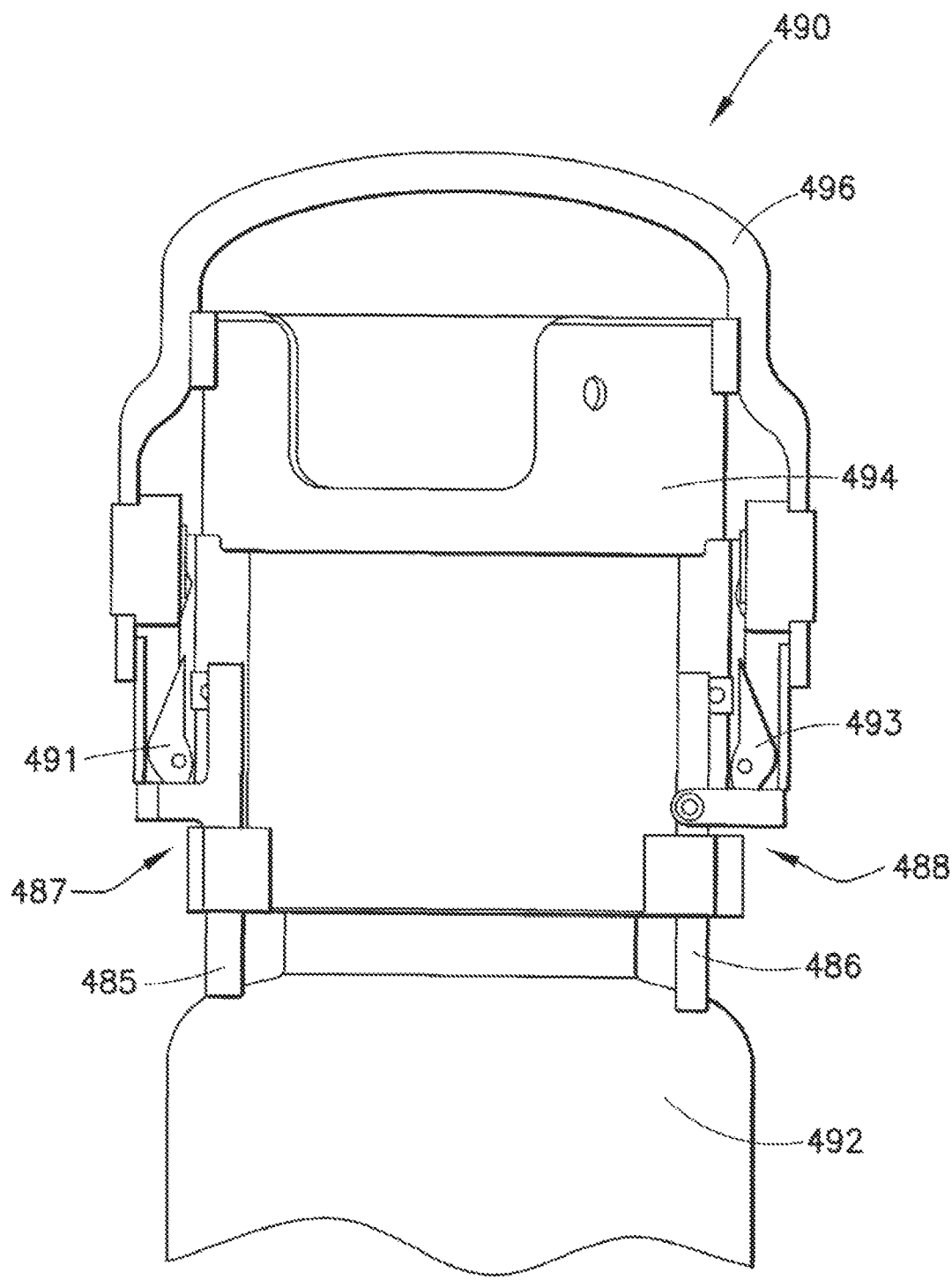

FIG. 42 is an elevation view of a fluid storage and dispensing system 490 according to another embodiment, in which a linkage arrangement is employed to convert the torque up the handle 496 into a vertical force. The linkage centers the force on the double post part 487, 488 associated with posts 485, 486, and allow a single torque spring to be used to return the handle and double post part to a closed position. This arrangement also utilizes a linear cam to open the respective pivot clamps 491, 493, and a double post to "push off" the fluid storage and dispensing vessel 492.

Figure 43:
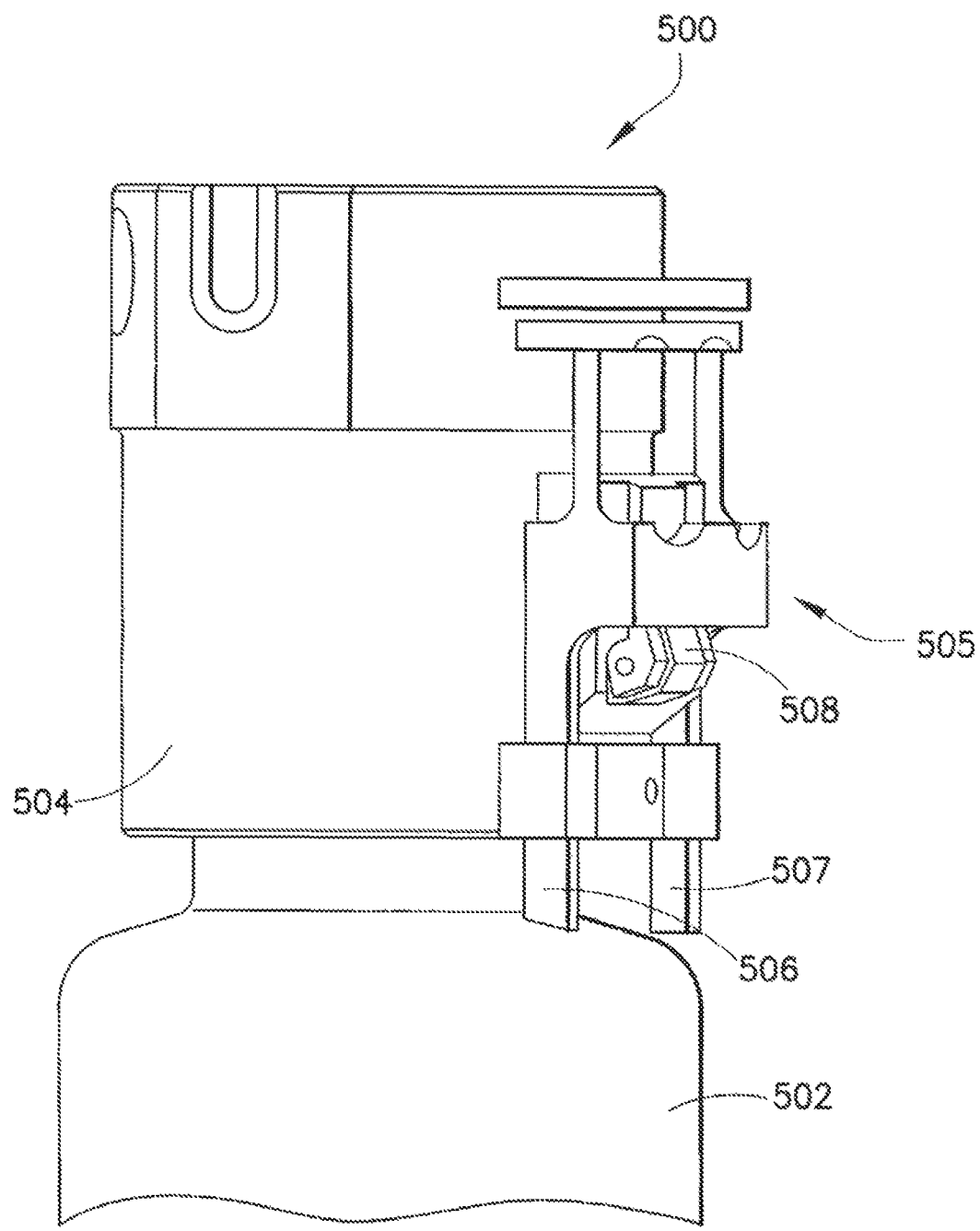

FIG. 43 is an elevation view of a fluid storage and dispensing system according to another embodiment of the invention. The system 500 includes a fluid storage and dispensing vessel 502, to which is coupled a connector 504 having on each of opposite sides thereof a side platform 505 associated with a corresponding pivot clamp 508. The side platform in each instance includes a double post 506, 507 (the side platform opposite that shown on the right hand side of FIG. 43 being symmetrically constructed and arranged).

To release the connector 504 from the fluid storage and dispensing vessel 502, a user would secure both hands on respective sides of the connector body, with the palms in contact with the respective side platforms 505, and gripping the connector body for support. The user that applies pressure to the respective side platforms 505 in a squeezing action. The respective posts activate the pivot clamps 508 with a linear cam, and the four posts then push off the vessel 502.

The invention also contemplates in another aspect a cap/code ring assembly with locking tabs and a fluid storage and dispensing vessel matably engageable with such assembly, where in the vessel features locking teeth and a mis-connection interference feature.

Figure 44:
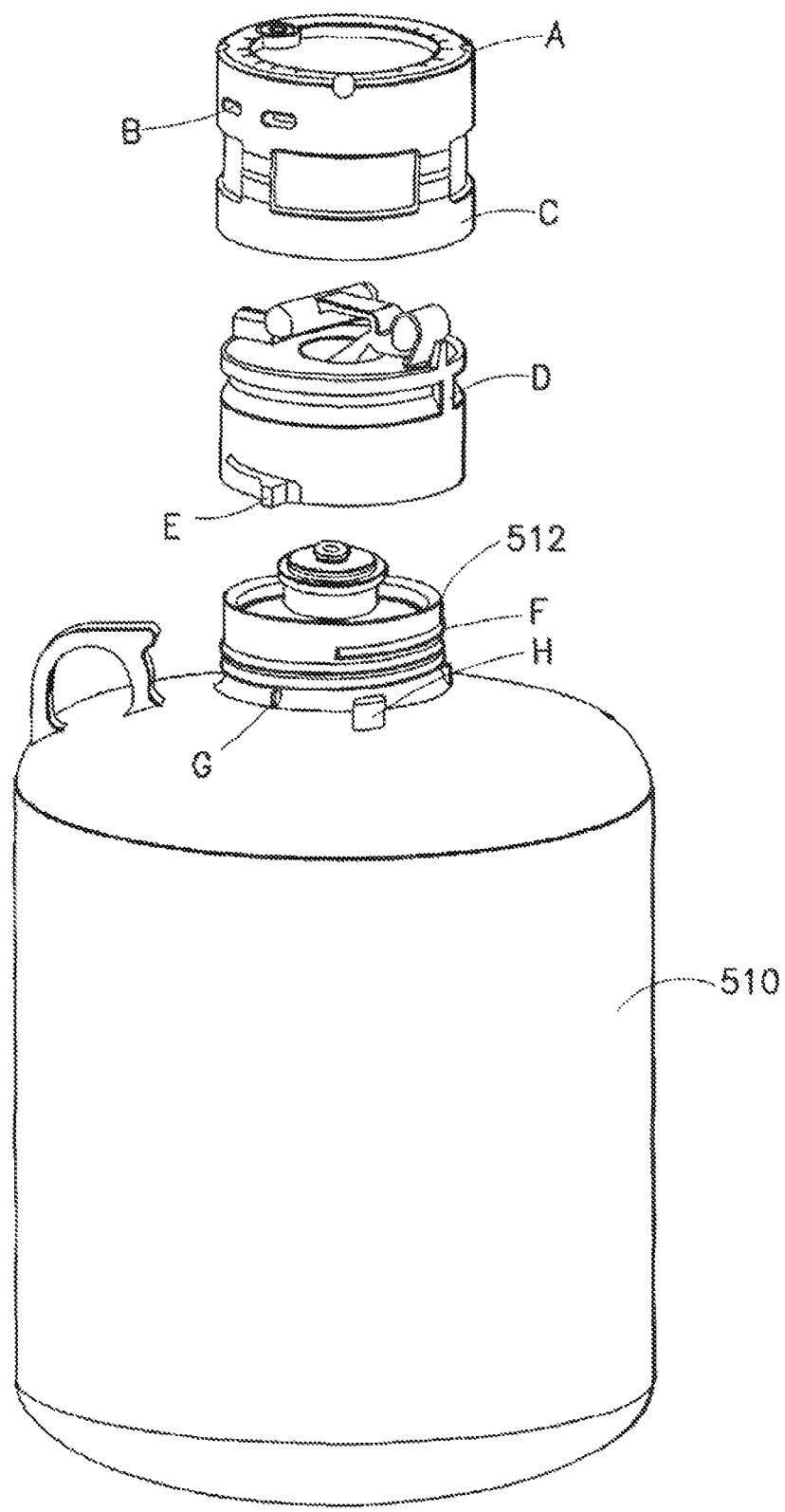
FIG. 44 is an exploded perspective view of a fluid storage and dispensing package featuring keycode structure and a mis-connection interference structure to prevent engagement of the fluid storage and dispensing package with an incorrect cap.

FIG. 44 is an exploded perspective view of such a fluid storage and dispensing package, featuring keycode structure and a mis-connection interference structure to prevent engagement of the fluid storage and dispensing package with an incorrect dispensing connector.

As shown in FIG. 44, a fluid storage and dispensing a vessel 510 is provided with a neck 512 having threading F on the exterior surface thereof, for cooperative engagement with threading on an interior surface of the cap D. The vessel 510 features an array of locking teeth G on its upper surface in the vicinity of the neck 512, and an interference feature H on such upper surface in the vicinity of the neck 512 for preventing mis-connection of a dispensing connector to the vessel.

The cap D features locking tabs E on a lower portion of the cap. The cap is provided with two or more horizontal locking tabs, circumferentially spaced apart from one another. These locking tabs slip over the locking teeth on the vessel neck when the cap is being screwed on, but grab or "bite" into the locking teeth when attempt is made to unscrew the cap. The cap preferably is made of a flexible material of construction, such as for example polyethylene, polypropylene, polytetrafluoroethylene, or the like.

The locking tabs on the cap are pushed in or activated by a ring extension C of the upper code ring A. In consequence of the flexible nature of the plastic cap/code ring assembly, the cap's locking structure can be forced over the threads and locking teeth of the vessel 510 when the cap is screwed on the neck of the vessel. When the cap subsequently is unscrewed, the locking tabs and teeth on the vessel begin to one another due to the angles of their respective mating faces. The interference of these two features locks the cap to the vessel.

The cap can be removed when necessary by first removing the code ring and its attached lower tab activation ring, code ring extension C. An instrument such as a screwdriver can be inserted into slots B in the code ring A, and the code ring then can be prided off. Once the code ring is removed, the locking tabs can be moved away from the locking teeth on the vessel, following which the cap is easily unscrewed. Since the code ring then is no longer attached to the cap, it cannot be reused on another vessel.

The mis-connection interference feature H is located on the top surface of the vessel 510 and projects upwardly from such surface. This interference feature is located so that a smart probe assembly will not be contacted when the probe assembly is installed, but the interference feature will otherwise interfere with an incorrect connector during attempted installation thereof.

The features of the fluid storage and dispensing assembly of FIG. 44 permit the cap and vessel to the assembled in a ready manner, but prevents them from being disassembled by normal means. The illustrated arrangement permits removal of the cap by a common tool, viz., a flat blade screwdriver, and the process of removal renders the cap unsuitable for further use. The vessel connector interference feature prevents an incorrect connector from being installed on the vessel.

Figure 45:
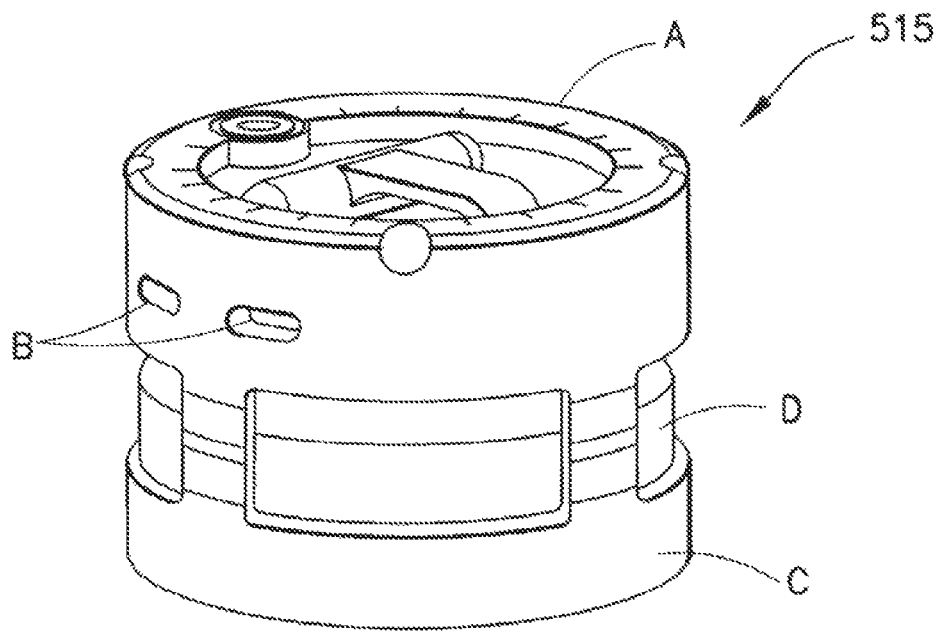
FIG. 45 is a perspective view of the cap and code ring assembly of the fluid storage and dispensing package shown in FIG. 44.

FIG. 45 is a perspective view of the cap and code ring assembly 515 of the fluid storage and dispensing package shown in FIG. 44. The assembly includes the code ring A coupled with the cap D, and with the code ring extension C circumscribing the cap D.

Figure 46:
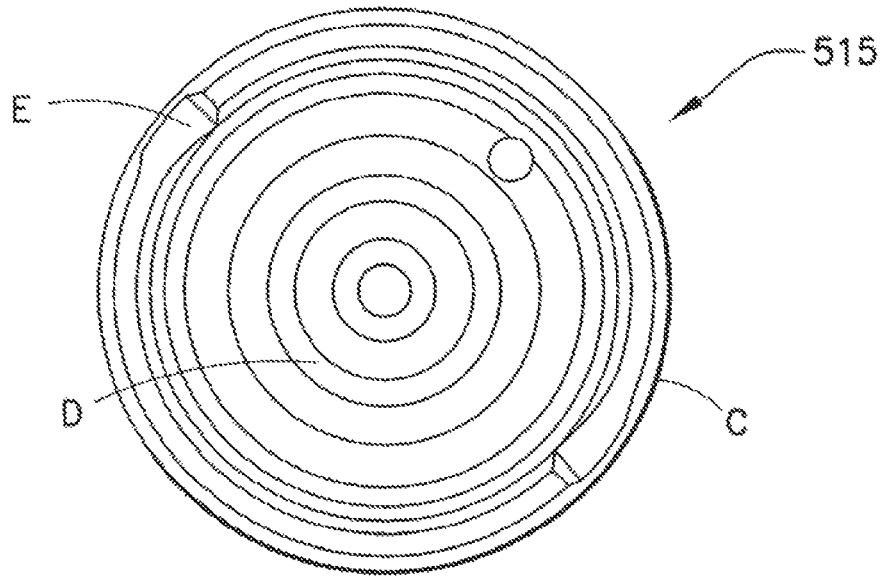
FIG. 46 is a bottom plan view of the cap and code ring assembly of the fluid storage and dispensing package shown and FIG. 44.

FIG. 46 is a bottom plan view of the cap and code ring assembly 515 of the fluid storage and dispensing package shown and FIG. 44. This view shows the locking tabs being pushed in by the code ring extension C, with the cap D positioned in the cap/code ring assembly.

By the arrangement shown in FIGS. 44-46, the cap is removable from the vessel when necessary, while avoiding the possibility of deleterious reuse of the cap and the keycoding structure ensures that coupling of a correct dispensing connector is achieved and that mis-connection of an inappropriate dispensing connector is avoided.

Other aspects of the invention relating to deformation, destruction or removal of threads, for the purpose of preventing reuse of caps, or their removal from a fluid vessel variously involve: screw-on caps with toothed locks that cut or tear the area above the threads, as well as arrangements in which attempted removal of the cap results in ripping or destruction of threads; two-piece caps that thread on the neck of the vessel with a detent stop, whereby the threads peel off under high torque when the cap is removed; screw-on caps with anti-rotation features that prevent the cap from being unscrewed, such as arrangements in which the cap has a tear area above the thread that is activated by unscrewing, in which the remaining threaded area can be removed by pulling a vertical tear tab; two-piece threading; tear-off threading; helical threadings that unscrew themselves; formed threading that undergoes deformation when the cap is removed; and threading on the cap which is additionally formed over large features on the vessel neck at a chemical supplier facility, whereby the cap threading is destroyed when the cap is removed from the vessel.

Additional aspects of the invention relating to cap modification to prevent removal and/or reuse of the cap include the following: provision of caps with clips that require a tool to press them into position, wherein the cap when the clip is pressed into position is able to be installed or removed in a ready manner; provision of pins holding the cap in place, with a removal tool being adapted to which the pins out of the position securing the cap; provision of a screw-on cap with pressed-in pins to prevent unscrewing of the cap, wherein the pins can only be removed with a special tool in order to unscrew the cap; provision of a screw-on cap with anti-rotation lock, wherein the code ring must be removed to unlock the cap, and wherein the like includes pins that must be pulled up or tabs that must be squeezed together to release the lock; provision of a screw-on cap with an anti-rotation lock, in which the code ring must be removed to unlock the cap, wherein the anti-rotation lock is a ratchet type, with teeth on the cap and teeth on the vessel, whereby high torque is required to remove the cap, using a special tool; use of a code ring torque tool having grab features are "torque on" only, i.e., the tool grab features will not grab when attempting to unscrew the cap, so that a code ring must be removed to remove the cap; provision of a second ring on the cap to attach the cap to the vessel, wherein the ring breaks off when the cap is removed; provision of a snap-on cap with a tear tab to remove the cap, wherein the cap will not lock on once the tear tab is removed; provision of a tear ring that snaps over, wherein the snap is at the tear ring; provision of a snap-on cap that requires a special tool to cut it off the vessel; provision of a shrink cap or wrap, which is heat activated or went-to-dry activated; provision of a non-threaded cap that is formed over features on the vessel neck at the chemical supplier facility, wherein interference between the vessel features and the cap retains the cap in position, so that the cap is removable only with a tool or otherwise by prying it off, and removal of the cap rips off the formed areas of the cap, so that part of the cap remains on the vessel and can be removed with a special tool or vertical tear tab; provision of a cap constructed and arranged so that cap removal alters the code ring so that the cap will not work with the dispense probe again; provision of a code ring that is cut by the installation of the dispense probe, so that the code ring falls off when the dispense probe is removed; provision of a magnetic structure that is broken off when the dispense probe is removed; fabrication of the vessel with a feature that mates with the recess in the cap, so that when the cap is removed, the vessel feature breaks off and becomes lodged in the cap recess, and the cap then cannot be used with a new vessel; fabrication of a cap with break-off tabs that hold the cap in position on the vessel and slide down complementary grooves in the vessel when installed, and break off when the cap is removed; fabrication of a cap with a built-in dye release mechanism operating to release dye when the cap is removed; fabrication of the cap with a security-type tag that breaks upon removal of the cap, so that empty vessels during broken tags will evidence misuse; and provision of radio-frequency identification (RFID) integrated circuit chips in both the vessel and the cap, in conjunction with monitoring software that prevents an operator from switching caps.

FIGS. 47-56 show additional dispensing assembly probe connector embodiments of the invention, having an improved ergonomic character to facilitate removal of the probe connector from the fluid storage and dispensing package. Currently employed probe assemblies can require the application of 20-30+ pounds of force to effect removal of the probe assembly from the container. The ergonomics of the removal operation are uncomfortable and awkward for the operator, requiring the container to be held in one hand while simultaneously the other hand must pinch together the locking clamps and lift the probe assembly from the container. The unlatching of the clamps is made more difficult by the fact that the locks do not disengage until the locking clamps have been fully depressed. An operator can often struggle unsuccessfully to remove a probe assembly only to find that the locking clamps have not been fully depressed. The probe assemblies of FIGS. 47-56 are designed to minimize such difficulties, and provide an ergonomically improved probe assembly removal.

Figure 47:
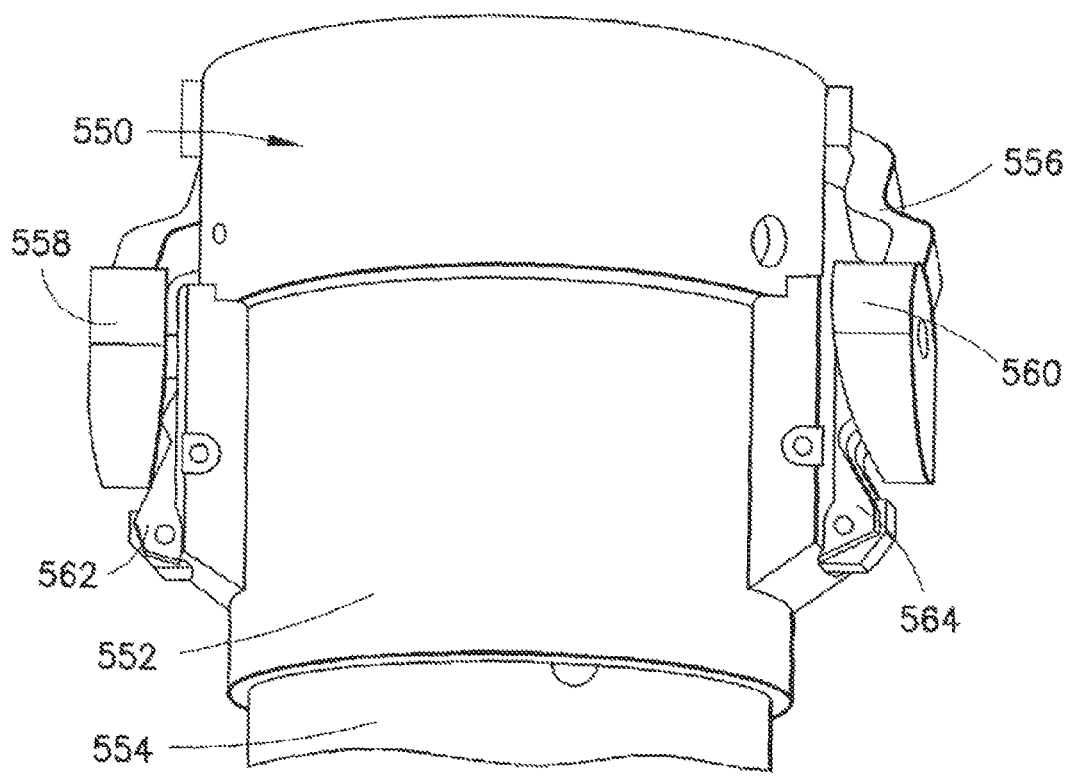
FIG. 47 is a perspective view of a connector of a dispensing assembly, according to another embodiment of the invention.

FIG. 47 is a perspective view of a connector 550 of a dispensing assembly, according to another embodiment of the invention. The connector 550 includes a connector body 552 to which is coupled an ergonomically shaped handle 556 interconnected with cams 558 and 560. The cams 558 and 560 in turn coact with pivot clamps 562 and 564, to open the pivot clamps for removal of the connector from the cap 554 when the handle is in a vertically upright position, and to maintain the pivot clamps in a closed condition when the handle is in its down position, such as is shown in FIG. 47.

In this embodiment, the handle is biased by a return spring (not shown) in the connector body, to a handle down position. The handle serves two functions, holding the latches open when the handle is in the up position, and providing an ergonomically enhanced handle for manual gripping and application of force to separate the connector from the package with which it is associated.

The handle has two attached cam surfaces close to its pivot axis. As the handle is rotated from its starting position, angled downwardly adjacent to the housing of the connector, to a vertical position, the cams deactivate the pivot clamps that hold the connector to the cap of the package. As long as the handle is in a vertical position, the pivot clamps are held open. When the handle is in a vertical position, it can be manually pulled upwardly to separate the connector from the cap and associated container. When the handle, in the vertical position, is released, torsional springs attached to the cams return the handle to its starting position and reactivate the pivot clamps. By this arrangement, the operator is allowed to concentrate fully on separating the connector from the package, without wasting effort on opening the pivot clamps while exerting pulling action on the connector to separate it from the package.

Each of the cams in this embodiment has a cam profile with a rotation center at the handle pivot, in which the contact surface profile of the pivot clamp is matched to that of the handle. A torsional spring interconnects the housing of the connector and the handle, and may be of any suitable type that effectively biases the handle to the desired down position. In this embodiment, the handle cams and pivot clamps are always in contact with one another.

Figure 48:
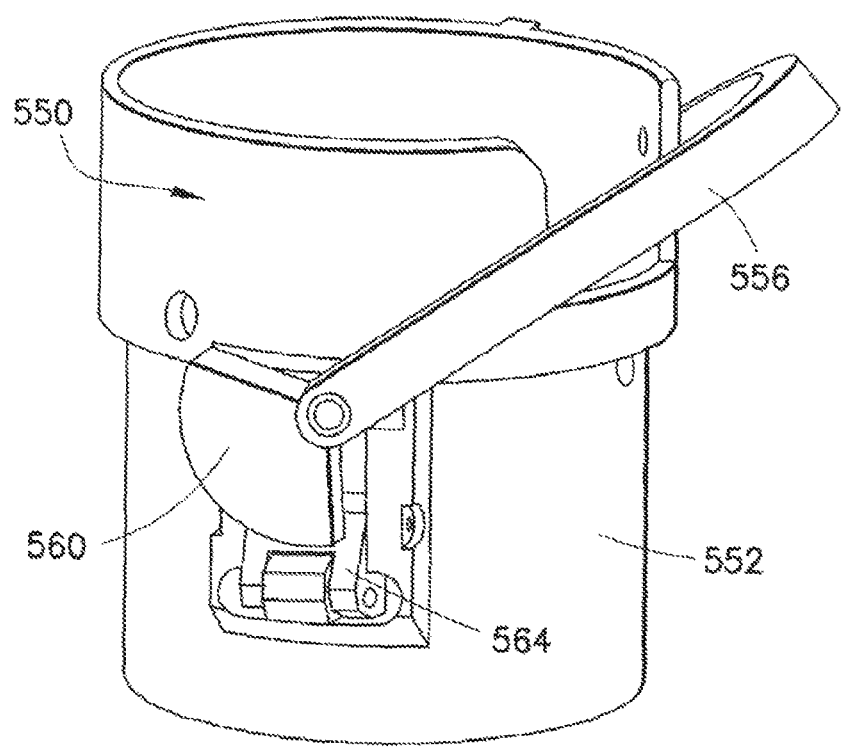
FIG. 48 is another perspective view of the connector of FIG. 47.

FIG. 48 is another perspective view of the connector of FIG. 47, wherein the same parts are correspondingly numbered with respect to those of FIG. 47, showing the features and details of the handle, connector and pivot clamp elements.

In a modification of the dispensing assembly connector shown in FIGS. 47 and 48, a small wheel or ball may be provided between the cams and pivot clamps to reduce friction, such as by providing complementary tracks in the cams and pivot clamps, containing ball bearings in the tracks to minimize friction. Alternatively, wear-reducing coatings may be applied to the cams and pivot clamps, at their bearing surfaces, for the same purpose. Such provisions system in ensuring that the return spring effectively returns the handle to its starting position.

Figure 49:
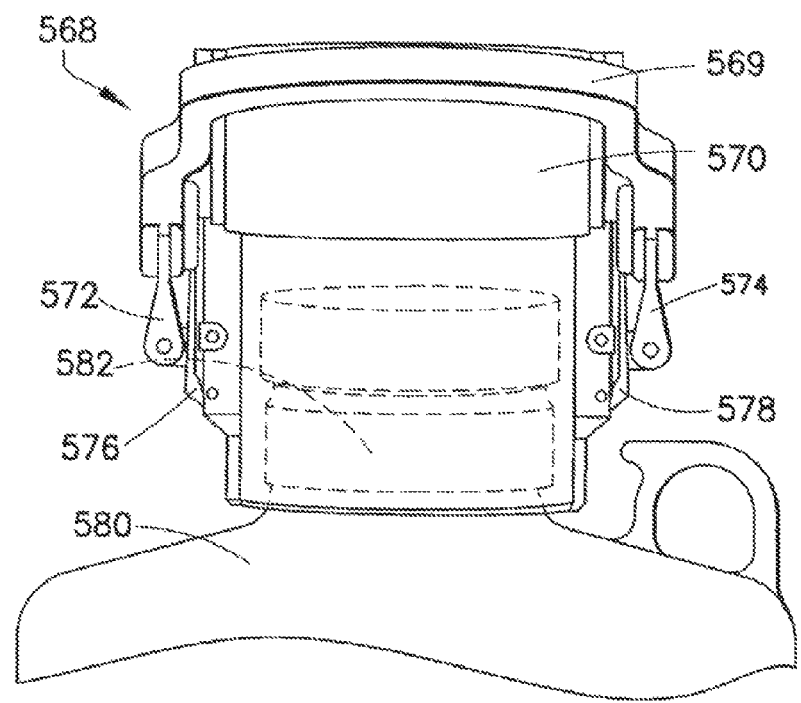
FIG. 49 is a front elevation view of a connector of a dispensing assembly, according to yet another embodiment of the invention.

FIG. 49 is a front elevation view of a connector 568 of a dispensing assembly, according to yet another embodiment of the invention. In this embodiment, an ergonomically enhanced handle 569 is mounted on a connector body 570 so that the handle is pivotally movable in relation to the connector body. The handle is connected with linkages 572 and 574 to the pivot clamps 576 and 578. The connector body 570 is mounted on cap 582 coupled in turn to vessel 580.

The handle in the FIG. 49 arrangement is associated with a return spring (not shown) and push off features. The handle in this arrangement serves the functions of opening the latches, providing an ergonomically enhanced member for manual gripping and application of force to separate the connector from the container, and a riding the linkages that activate the connector push off features. As the handle is pivotally translated up or delay, the linkages drive the pivot clamps to an open position as well as transmitting force and movement to the push off features.

Thus, as the handle is rotated from a horizontal starting position to a vertically upstanding position, the linkages attached to the handle rotate the vertical latch linkages to release the pivot clamps. Push off features in the top of the latch linkages make contact with the cap 582. As the vertical latch linkages continue to rotate, they push the cap, with the container attached, out of the connector body.

This arrangement reduces the force of separation by breaking the static friction of the O-ring seals, moving the connector upward and reducing the distance it must be pulled before it is free of O-ring drag. The pivot clamp unlocking feature of this arrangement allows the operator to concentrate fully on separating the connector assembly from the container, without effort in opening the pivot clamps. The handle facilitates the ready application of the necessary separation force. When released, the handle will rotate through an arc of 40-60° to a "locked on" position, by action of a torsional spring.

Figure 50:
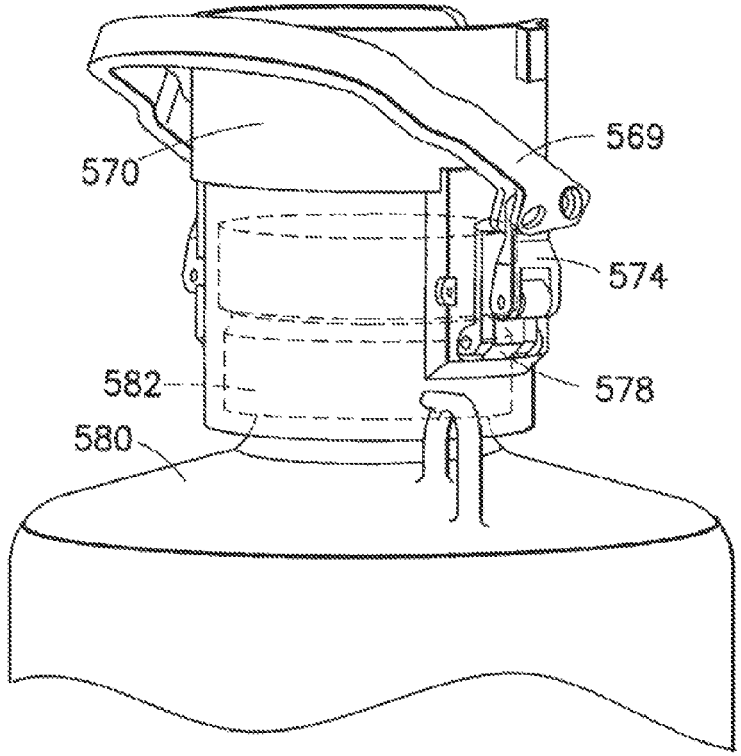
FIG. 50 is a perspective view of the connector of FIG. 49.

FIG. 50 is a perspective view of the connector of FIG. 49, wherein all parts elements are correspondingly numbered.

Figure 51:
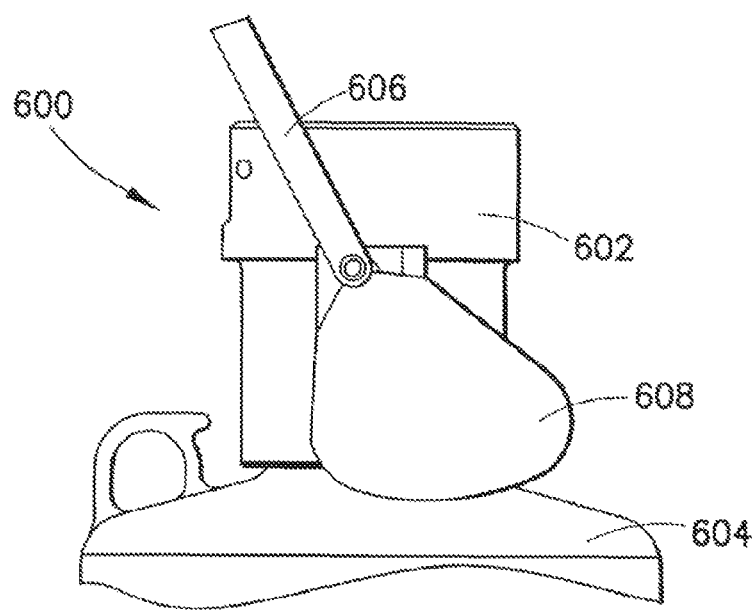
FIG. 51 is a side elevation view of a connector of a dispensing assembly, according to yet another embodiment of the invention, in a first position of the handle.

FIG. 51 is a side elevation view of a connector 600 of a dispensing assembly, according to yet another embodiment of the invention, in a first position of the handle 606. The handle 606 is mounted on connector body 602 and coupled with large secondary cams 608 that are interconnected with clamp activated cams of the type shown in FIGS. 47 and 48. The secondary cams make contact with the top of the container and assist in separating the connector assembly from the container as the handle is rotated to a vertical position.

The addition of the large secondary push off the cams in this embodiment reduce the force of separation by breaking the static friction of the O-ring seals between the connector and the cap, and translating the connector upwardly, thereby reducing the distance that it must be pulled before it is free of O-ring drag. The connector is the unlocked from the cap when the handle is rotated to the vertical position, and a torsional spring in the handle returns the handle to the lowered starting position when the handle is released. The large secondary push off cams thus provide a push off action against the container 604, and asked to push the container out of the connector.

Figure 52:
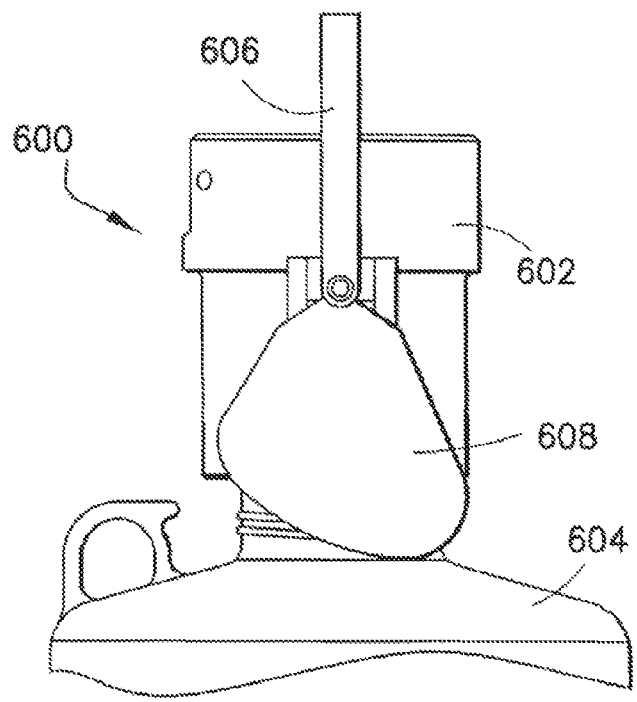
FIG. 52 is a side elevation view of the connector of FIG. 51, in a second position of the handle.

FIG. 52 is a side elevation view of the connector 600 of FIG. 51, in a second, vertical position of the handle. In this position, the push off cam 608 bears against the top surface of the container 604, to provide the push off action for disengagement of the connector from the cap and associated container.

Figure 53:
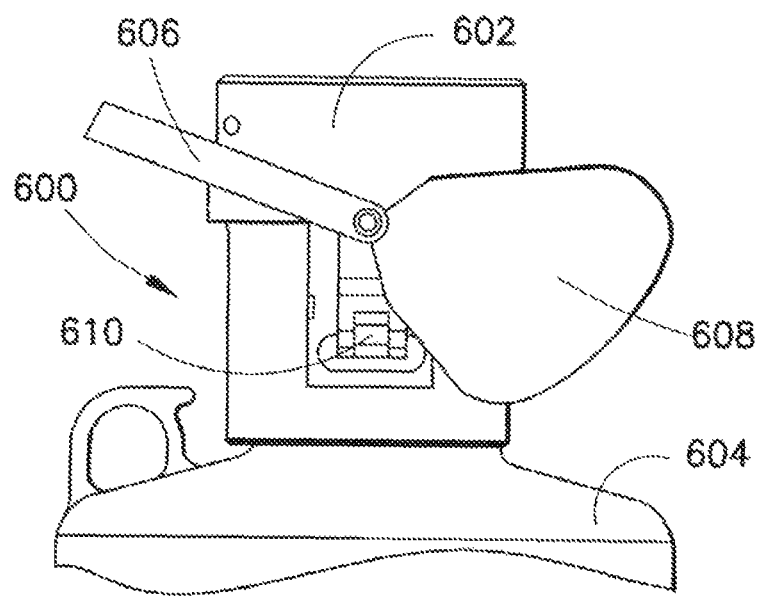
FIG. 53 is a side elevation view of the connector of FIG. 51, in a third position of the handle.

FIG. 53 is a side elevation view of the connector 600 of FIG. 51, in a third position of the handle 606. In this position, the pivot clamp 610 is shown. Thus, movement of the handle upwardly to a vertical position effects disengagement of the pivot clamps from the cap, by action of the primary cams, while the secondary cams engage the surface of the container and provide the push off/disengagement action.

Figure 54:
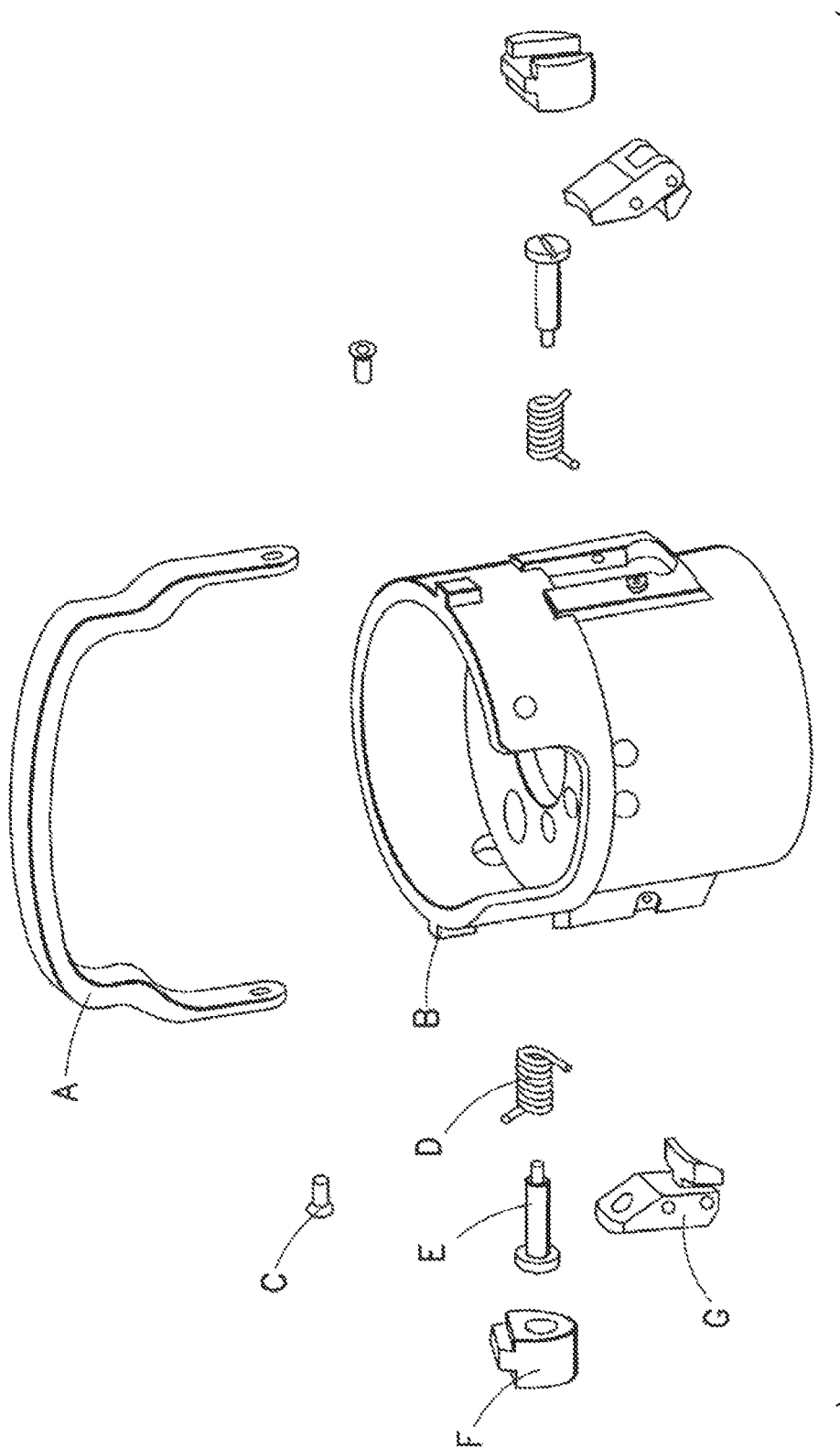
FIG. 54 is a simplified spatial view of a portion of a dispense connector according to a further embodiment of the invention.

FIG. 54 is an exploded view of a portion of a dispense connector according to a further embodiment of the invention. The dispense connector in this embodiment includes a handle A that is mounted on connector housing B and is attached to cam F by fastener C. The handle is biased to a down engaged position by "handle return" torsion spring D. Pivot bolt E interconnects the handle A and the cam F. The pivot clamps G are provided at each of the sides of the connector housing B, and serve to latch and unlatch the connector from the cap on the fluid storage and dispensing container.

Figure 55:
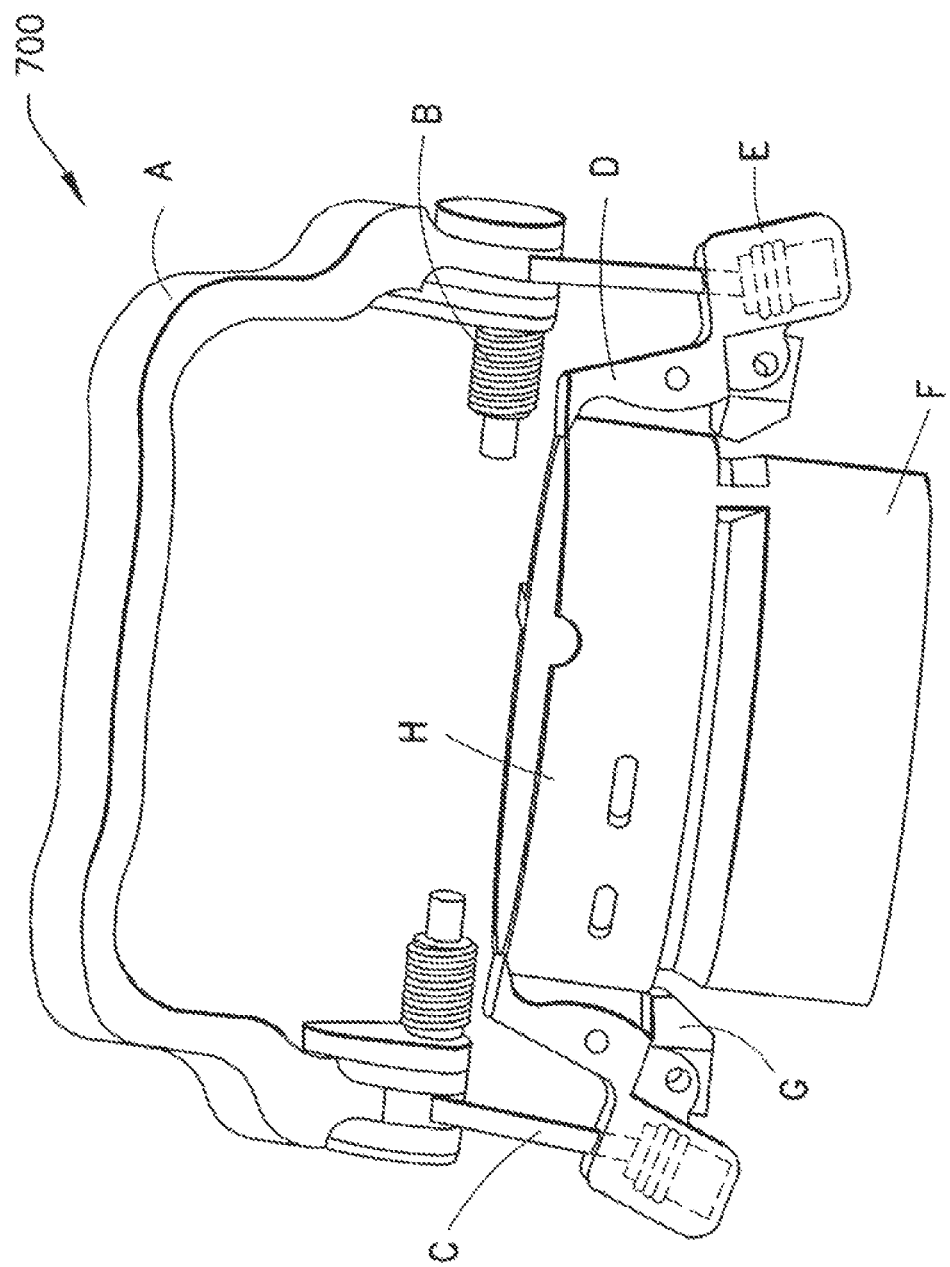
FIG. 55 is an exploded view of a connector of a dispensing assembly according to yet a further embodiment of the invention.

FIG. 55 is a simplified spatial view of a connector 700 of a dispensing assembly according to yet a further embodiment of the invention. The connector 700 includes a handle A too which is coupled a "handle return" torsional spring B and a main drive linkage C. Each main drive linkage C is connected to a push off feature D by means of vertical latch linkage E. The push off feature D and vertical latch linkage E are connected to the lock arms G, which engaged the cap F having a coding ring H secured thereto.

Figure 56:
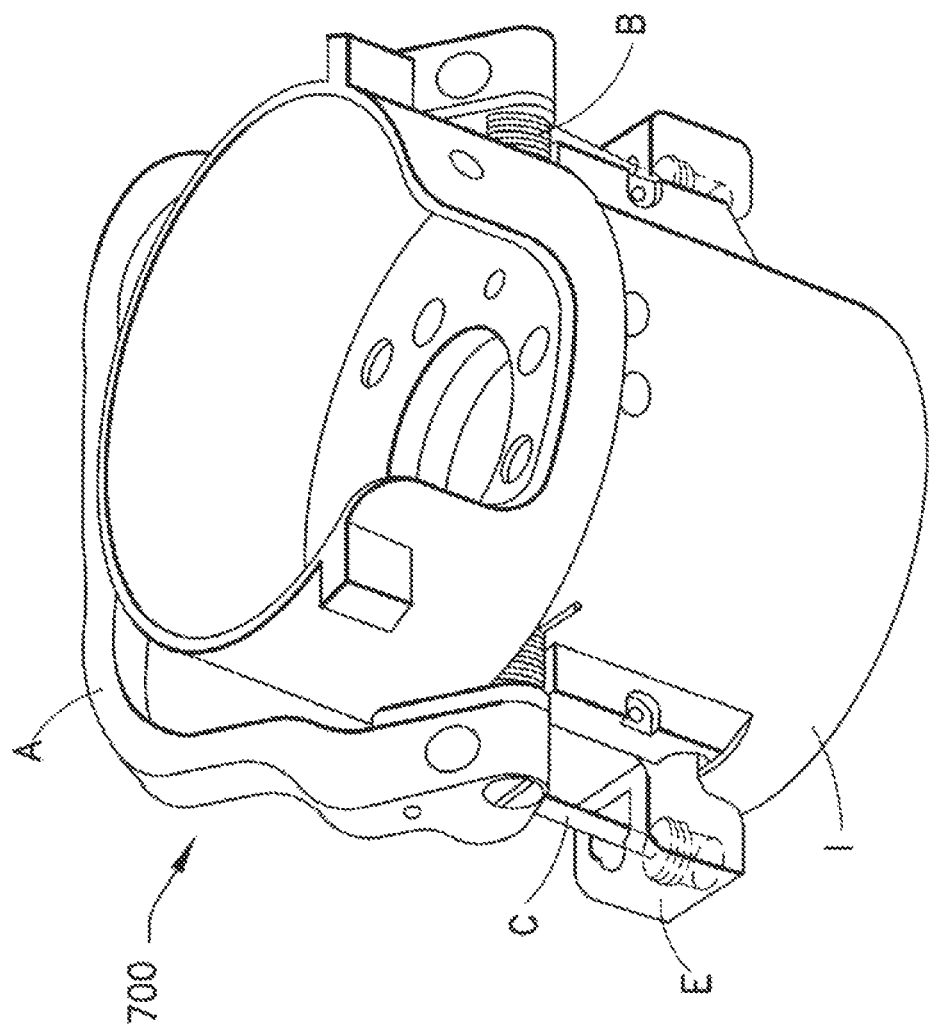
FIG. 56 is an assembled perspective view of the connector of FIG. 55.

FIG. 56 is an assembled perspective view of the connector of FIG. 55, with a connector body I (not shown in FIG. 55) being illustrated, and with all other parts and components of FIG. 56 being numbered correspondingly with respect to the same features of the connector of FIG. 55.

The features and advantages of the present invention are more fully shown by reference to the following non-limiting examples.

Example 1

A test was run to determine the efficacy of a pressure transducer for empty detect monitoring in pressure-mediated dispensing of fluid from a liner-based fluid storage and dispensing system of a general type as described in connection with FIG. 3 hereof, to determine the suitability of a specific liner-based fluid storage and dispensing package for dispensing photoresist as part of a dispense train including a downstream dispenser having a process filter upstream thereof. As used in such context, the term "downstream dispenser" refers to process equipment that is associated with a fluid-utilizing tool to supply fluid to the tool in a predetermined amount or at a predetermined rate. The downstream dispenser made for example include a final dispense pump, e.g., a compressible tube pump, or a flow-metering device, injector, ejector, compressor, the lower, spray head, nozzle, etc.

The dispensing operation in this application must supply the required photoresist flow through the process filter and into the downstream dispenser, while maintaining a positive downstream dispenser suction pressure and a consistent dispense profile at end-of-dispense (EOD), and chemical utilization desirably on the order of 99.75%. The liner utilized in the fluid storage and dispensing system was 4 L in volume, and the greater than 99.75% utilization of chemical required a residual amount of chemical in the liner that is less than 10 mL.

A Mykrolis Impact PCM filter (0.02 µm) was utilized in the test. The dispense recipe was: 1 mL dispense over 1.5 seconds, 15 second dispense pump suction stroke duration, and a dispense shot cycle recipe sequence repeated once per minute. The drive pressure exerted on the liner to effect pressure dispensing was for example about 7 psig.

The test viscosities selected for the test were 1, 3, 10, 20 and 30 centipoise, with two repetitions of each viscosity being tested. Propylene glycol was blended to the required viscosities, as the test liquid. During the last 500 mL of the dispense, three system pressures, along with the dispense profile mass or recorded. The dispensing pressure was set at 10 psig, as mentioned, with the test being terminated when the dispense to liquid pressure was 1.3 psig. Such dispensing pressure and termination pressure can be varied, and the dispensing operation could for example employ a dispense pressure of 10 psig and a termination pressure of 4.3 psig.

After each test, the residual chemical was measured by a liner removal and liquid squeeze out and measurement. The test was designed to go to a pressure below that which would be used in a coating tool, such that decay in the dispense profile mass can be identified, and actual utilization prior to the onset of dispense profile decay determined.

It was also an objective of this test to allow sufficient drive pressure to prevent negative downstream dispenser suction pressure, which was expected to lead to dissolved gas liberation and micro-bubbling, with dispense profile decay. Based on the photoresist viscosity, filter selection and flow circuitry in the dispense train, it was expected that the drive pressure and empty detect pressure would be selected for optimum dispense profile and utilization. By mapping three system pressures, it was expected that the optimum location for the empty detect pressure transducer would be identified.

The test apparatus, in addition to the 4 L liner-based package, included dispensing flow circuitry discharging to a 1500 g scale. In the flow circuitry were disposed an Entegris PFA petcock, an Entegris model 4210 0-30 psig Pdcr, a 200 mL reservoir 45 mm in diameter, coupled with a vent/drain line containing an SMC LVH20L-507 manual PFA valve, the aforementioned Mykrolis Impact PCM filter (0.02 µm), an Iwaki Tube-Phragm PDS-105HB-EPW2 5 mL dispense pump, an Omega PX 303-050A5V 0-50 psia Pdcr, a Nupro 0.25 inch stainless steel AOV valve, and a CKD 0.25 inch PFA AOV valve, in series. The dispense line was a 0.25 inch PFA tube dispense tube, with a 0.125 inch PFA tube being deployed between the final valve and 1500 g scale.

After mixing to the test condition viscosity, the viscosity was measured before pouring the test liquid into the liner and after the test as dispense effluent. The testing began at the 30 centipoise nominal viscosity, the most taxing on the system, and after two test repetitions the procedure was continued with the other viscosities after reblending. The procedure was the same in all runs, as including the following steps set out for the first repetition at 30 centipoise.

Using a propylene glycol viscosity graph, it was determined that a 90% propylene glycol and 10% water solution will provide a viscosity of about 32 centipoise. 3600 mL of Sierra brand propylene glycol antifreeze was mixed with 400 mL of water, and the viscosity was measured by a Cole-Parmer spinning disk viscosimeter. The viscosity was measured at recorded at 23° C. as 25 centipoise. 400 mL of the solution were introduced by funnel to a 4 L liner. A smart cap was coupled with the liner and the liner then was connected to a dispense probe on the test apparatus. Pressurizing air at 10 psig was connected to the dispense probe for pressurizing of the liner. 3500 mL of liquid was simultaneously dispensed through the reservoir separator (which enabled separation and venting of gas from the liquid being dispensed, to achieve a zero or near-zero headspace condition), and the filter vent by the SMC LVH 20L-507 manual PFA valves, and the system control board was started. The last 500 mL of the dispense was logged. The test was terminated when the Entegris model 4210 pressure transducer reached 1.3 psig. The PFA petcock then was closed and the liner taken off line. The liner was removed and the contents were measured after the latter was cut and the remaining propylene glycol was removed, being weighed before and after squeegee removal. The 500 mL dispense effluent was measured for viscosity and recorded (28 centipoise at 23° C. was determined for the first run). A new liner then was filled with test fluid and the process was repeated.

Figure 57:
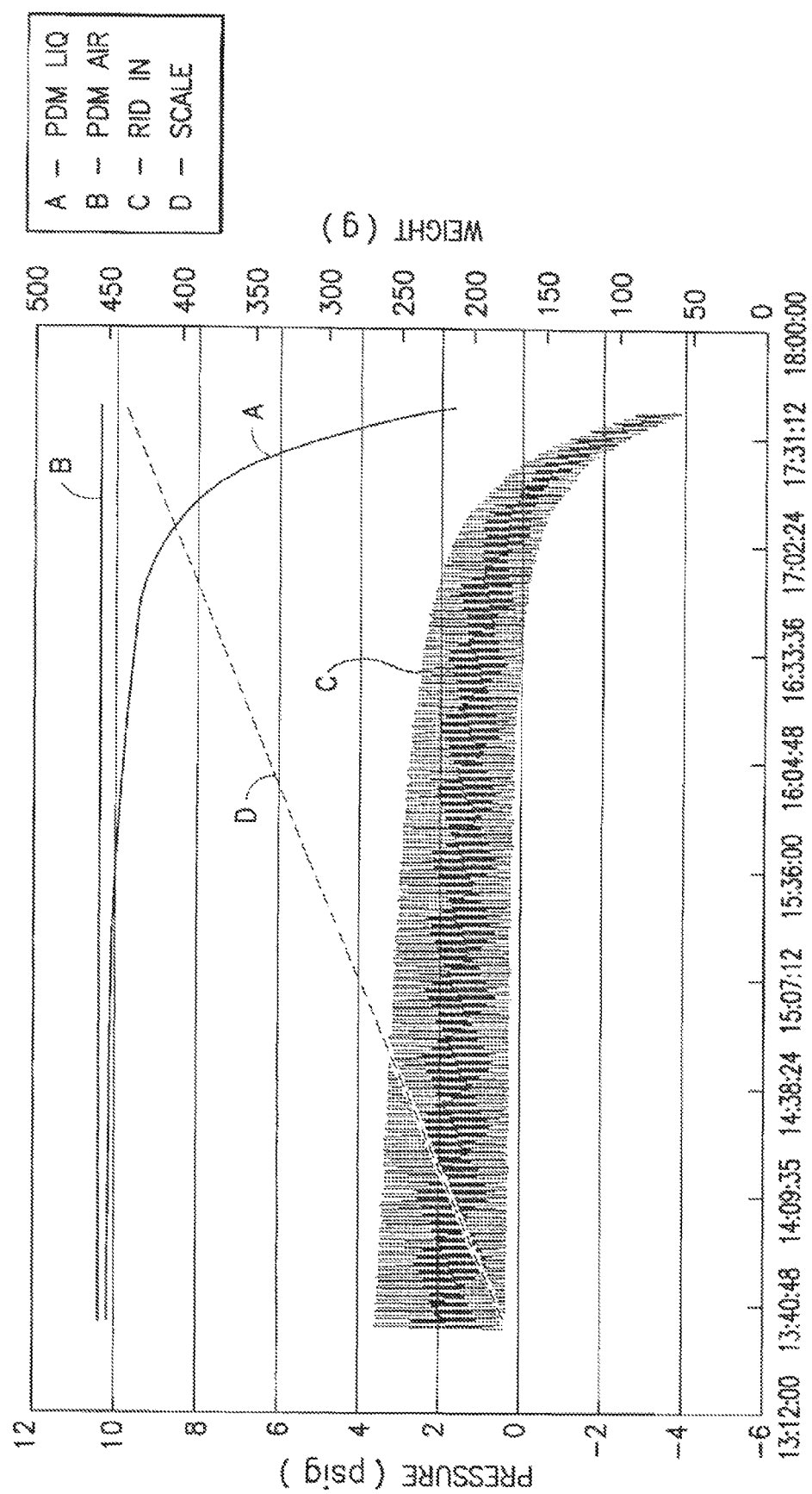
FIG. 57 is a graph of pressure, in psig, as a function of time (time of day), showing the pressure of the dispensed liquid (curve A), the pressure of the pressurizing gas (curve B), the inlet downstream dispenser pressure (curve C) and weight, in grams, of cumulative dispensed liquid measured at the scale (curve D), for representative Run 1 at viscosity of 25 centipoise/28 centipoise, during a time period of 13:12:00 to 18:00:00 for dispensing of an aqueous solution of propylene glycol from a 4 L liner under pressure dispensing conditions.

FIG. 57 is a graph of pressure, in psig, as a function of time (time of day), showing the pressure of the dispensed liquid (curve A), the pressure of the pressurizing gas (curve B), the inlet downstream dispenser pressure (curve C) and weight, in grams, of cumulative dispensed liquid measured at the scale (curve D), for representative Run 1 at viscosity of 25 centipoise/28 centipoise, during a time period of 13:12:00 to 18:00:00.

Figure 58:
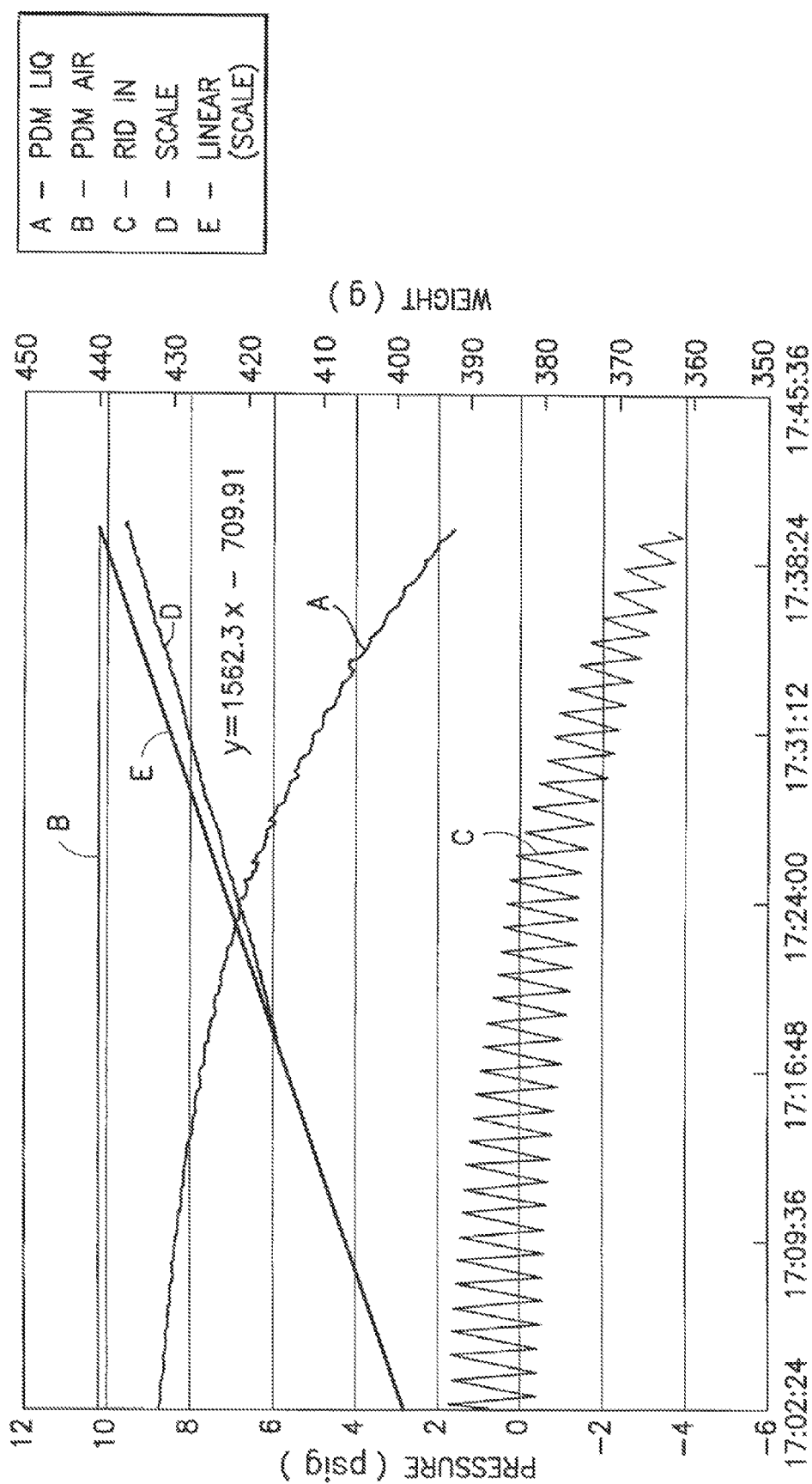
FIG. 58 is a graph of pressure, in psig, as a function of time (time of day), showing the pressure of the dispensed liquid (curve A), the pressure of the pressurizing gas (curve B), the inlet downstream dispenser pressure (curve C) and weight, in grams, of cumulative dispensed liquid measured at the scale (curve D), and the linear (scale) curve (curve E), for representative Run 1 at viscosity of 25 centipoise/28 centipoise, during a time period of 17:02:24 to 17:45:36 for dispensing of an aqueous solution of propylene glycol from a 4 L liner under pressure dispensing conditions.

FIG. 58 is a graph of pressure, in psig, as a function of time (time of day), showing the pressure of the dispensed liquid (curve A), the pressure of the pressurizing gas (curve B), the inlet downstream dispenser pressure (curve C) and weight, in grams, of cumulative dispensed liquid measured at the scale (curve D), and the linear (scale) curve (curve E), for representative Run 1 at viscosity of 25 centipoise/28 centipoise, during a time period of 17:02:24 to 17:45:36.

Clear evidence of dispense profile decay occurs a good 20 minutes before the 1.3 psig end-of-dispense (EOD). This amounts to 20 mL of photoresist and 20 300 mm wafers that would be affected as a result of dispense profile decay. The EOD zoom graph (FIG. 58) shows the downstream dispenser in pressure goes below atmospheric pressure during this EOD portion. The downstream dispenser in pressure decays to −4 psig at final empty. This is a clear indication that when dispensing 30 centipoise photoresist with this 0.02 µm Mykrolis filter with this downstream dispenser recipe, the drive pressure desirably is at least on the order of about 15 psig for optimum operation.

The downstream dispenser in pressure is much lower and susceptible to spikes as a result of the pressure decay across the filter, suggesting that the primary pressure transducer be positioned downstream of the filter, e.g., in the downstream dispenser itself.

The invention in another aspect relates to a connector for a material storage and dispensing package, such as a liner-based package, in which the connector has a safety locking device associated therewith.

If a material storage and dispensing vessel having a connector secured thereto is disassembled while the vessel contains a material at super-atmospheric pressure, the resulting release of pressure can result in pressure-mediated dispersion of vessel contents to the ambient environment of the vessel. For example, in the case of a liquid chemical reagent stored in a liner-based package at a pressure of 30 pounds per square inch (psi), the disassembly of the connector from an associated vessel can result in the chemical reagent being sprayed in all directions, posing a major hazard when the chemical reagent is toxic or otherwise deleterious in character.

The invention addresses this safety issue in one embodiment of the invention, by the provision of a connector having a safety-locking feature to prevent a user from disconnecting the connector from the associated vessel while the vessel is under pressure. A lock and/or pressure relief action therefore is provided to ensure that the connector is not blown off from a pressurized package by inadvertent opening or otherwise.

The invention in one embodiment provides a connector for a material storage and dispensing package. The connector includes a main body portion, including a handle mounted on the main body portion and pivotally translatable thereon, between an up position, and a down position. The connector is adapted to be coupled with a material storage and dispensing vessel for closure thereof, and includes a dispensing assembly for dispensing material from the vessel, and a pressure relief device operatively coupled with the handle and adapted when the handle is in the down position to prevent removal of the connector from the material storage and dispensing vessel. A stop element is operatively coupled with the pressure relief device to maintain the handle in the down position when the handle is pivotally translated to such down position. The stop element is selectively disengageable to cause the pressure relief device to vent the vessel to an ambient pressure, and to allow the handle to be pivotally translated upwardly, with the connector thereafter being disengageable from the vessel when the handle is in the up position, whereby disengagement of the connector from the vessel is enabled to occur at the ambient pressure.

In one embodiment of such connector, a pressure relief device is operatively coupled with the handle at each of opposite ends thereof. The handle at its opposite ends comprises axle portions coupled with the main body portion of the connector.

In another embodiment, the connector includes two stop elements, and each of the axle portions includes a cam surface engageable with a corresponding one of the stop elements. Each of the stop elements comprises a button that is spring-biased to a locking position preventing movement of the handle, and that is manually depressible to disengage the button from its locking position, and thereupon to enable movement of the handle.

The connector may take any of various suitable forms, including a connector featuring a pressurizing gas inlet assembly adapted for flow of pressurizing gas into a vessel when coupled with the connector. The pressure relief device can include a three-way valve, or other pressure relief device that is actuatable to vent the vessel associated with the connector in use, to thereupon allow the handle of the connector to be lifted to disengage the connector from the vessel.

The stop element in one embodiment includes a slide member that is manually translatable between a locking position engaged with the handle, and a release position. The stop element alternatively can include a cylinder that is selectively actuatable to cause extension of a protrusion element for engagement with the handle, and is de-actuatable to cause retraction of the protrusion element disengaging same from the handle. The protrusion element may be constructed and arranged to engage an axle portion of the handle, and the protrusion element may be translated by action of a biasing spring coupled with the protrusion element.

A further aspect of the invention relates to a material storage and dispensing package, comprising a material storage and dispensing vessel, and a connector as described above, coupled with the vessel for closure thereof.

The material storage and dispensing package may be of any appropriate type adapted to the end use for which it is to be employed. For example, the package may be of a bag-in-drum (BID), bag-in-bottle (BIB), or otherwise employ a liner for holding the material that is ultimately to be dispensed. The liner may hold, for example, a chemical regent such as a photoresist material, or other material that is adapted to be employed for manufacturing microelectronic device products. In such adaptation, the material storage and dispensing package can be coupled to a semiconductor manufacturing tool or facility, or other end-use equipment or process system that is consistent with the specific material dispensed from the package.

The package including the vessel and the connector may include a liner in the vessel, with the connector having a dispense port for coupling to flow circuitry or other transport structure for delivery of the dispensed material to a locus of use of same. The connector may also include a pressure-assist port for coupling to a source of pressurized gas, to exert pressure on the liner in the vessel for compaction thereof, so that the material-containing liner progressively is made smaller in volume as the liquid or other contained material is correspondingly dispensed from the package.

The invention therefore contemplates a method of storage and dispensing of material, in which the material is disposed in a vessel, and a connector is coupled with the vessel, to form a containment package, wherein the connector is of a type as described hereinabove, with a handle that is translatable between a first locking position in which pressure in the vessel is contained, and a second position in which the connector is removable from the vessel without difference in pressure between the vessel and ambient environment of the package. The method includes selectively depressurizing the vessel while the handle is in the first position, to enable the handle to be translated from the first locking position to the second position.

It will be apparent from the foregoing that the connector and the associated vessel can assume a variety of structures and forms.

In a specific embodiment, the connector includes a three-way valve that is connected to the interior volume of the vessel, as well as to a pressure source and a vent to the ambient environment of the package, e.g., the atmosphere. Such three-way valve is normally in an open state, to allow the vessel to be pressurized, for pressure-dispensing of material from the vessel. For example, such pressure-dispensing operation may include the imposition of pressure on the exterior surface of a liner in the vessel, to progressively compact the liner to force the contents thereof through the dispensing nozzle, with the dispensing nozzle being joined to external flow circuitry connected to a downstream facility adapted to utilize the dispensed material.

In such embodiment, the connector employs a button, which may for example be in the form of a switch, lever, or other manually actuatable element, or alternatively an automatically actuatable element, that is able to be pressed to shut the pressure off and vent the vessel to the atmosphere or other ambient environment of the vessel.

Such three-way valve safety feature may be integrated into a connector through the release lever, e.g., a translatable handle of the connector. The three-way valve can be located on the connector body, e.g., on a peripheral portion thereof. A notch can be provided in the release lever to allow the device to open when the release lever is in a down position. A user then would have to push the button in to actuate the vessel venting, in order to remove the connector from the vessel. The button functions to prevent pivotal rotation of the release lever, so that the connector cannot be removed from the vessel when the vessel is pressurized, except when the button is depressed.

In another embodiment, a three-way pressure relief device is employed to lock the release lever, by action of a slide member that engages the release lever in a locked position when the connector is engaged with a vessel and the release lever is translated to a down position. The slide then must be translated upwardly to disengage the slide from the release lever, so that the release lever can be pivotally rotated to permit disengagement of the connector from the vessel. The upward translation of the slide member then will actuate the pressure relief valve to vent the container and permit safe disengagement of the connector from the vessel.

In a further embodiment, a cylinder or linear actuator can be employed as a locking device for the connector. In one embodiment, the cylinder would be actuated to extend when a pressurized condition is present, and the cylinder would retract by spring biasing action, when the vessel is depressurized or at ambient pressure.

Such cylinder device can be integrated into the connector structure in a horizontal or alternatively in a vertical orientation. The cylinder device can be fabricated with a cylinder rod that is extensible, to extend horizontally into the side of the release lever or pivot clamp cam. The cylinder rod also can be positioned on the back portion of the connector, and arranged to extend so as to impart a downward force on the release lever, to hold it in position during pressurized conditions in the vessel. By such approach, the release lever can be locked in a closed position during a pressurized condition in the vessel, thereby preventing disengagement of the connector until pressure is discontinued and the vessel drops to a low pressure that will accommodate disengagement of the connector from the vessel without adverse occurrence.

Such safety-locking mechanisms are more fully described below with reference to FIGS. 59-67.

Figure 59:
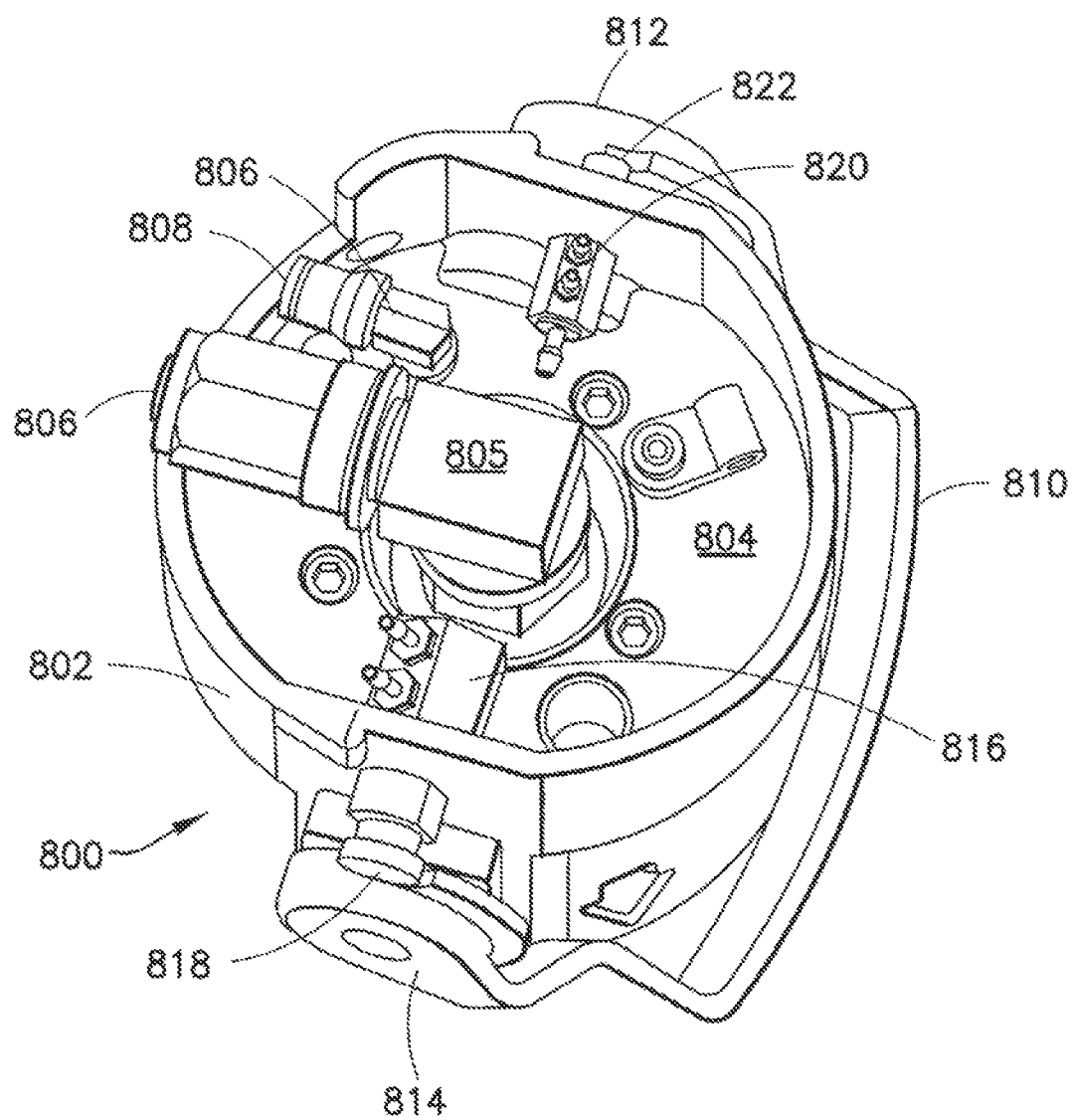
FIG. 59 is a perspective view of a connector according to a further embodiment of the invention.

FIG. 59 is a perspective view of a connector 800 according to one embodiment of the present invention. The connector 800 includes a main housing portion 802 having a top main surface 804 on which is disposed a dispensing fitting 805 defining an open end 806 as a dispensing port, to which can be coupled tubing or other flow circuitry, for conveyance of dispensed material to a downstream locus of use.

Also disposed on the top surface 804 of the connector is a pressurization conduit 807 having a pressurizing medium inlet port 808, for use in introducing pressurizing gas into the vessel when the connector 800 is coupled with a vessel containing material to be dispensed. The vessel may for example be of a bag-in-bottle (BIB) type, in which a pressurizing gas is introduced into the interior volume of the vessel, flowing into the region of the interior volume between the interior vessel wall and the exterior surface of the liner therein. By such action, the pressurizing gas exerts a compressive force on the liner, progressively compacting the liner so that the material therein is dispensed from the vessel under the applied pressure.

The connector 800 includes a release lever in the form of handle 810 which has respective axle portions 812 and 814 that are pivotally secured to the housing 802. This arrangement allows pivotal rotational movement of the handle 810 from the fully down position shown in the drawing, to a fully up position in which the handle is vertically oriented, extending upwardly above the main body portion 802.

In this embodiment, two three-way pressure relief devices 816 and 820 are mounted on the top surface 804 of the connector. The three-way pressure relief device 816 has associated therewith a depressible button 818, which when depressed permits venting of the container overpressure to the ambient environment of the container.

In like manner, the three-way pressure relief device 820 is operably coupled to depressible button 822, which when depressed permits venting of overpressure from the vessel in the same manner as described for three-way pressure relief device 816.

Figure 60:
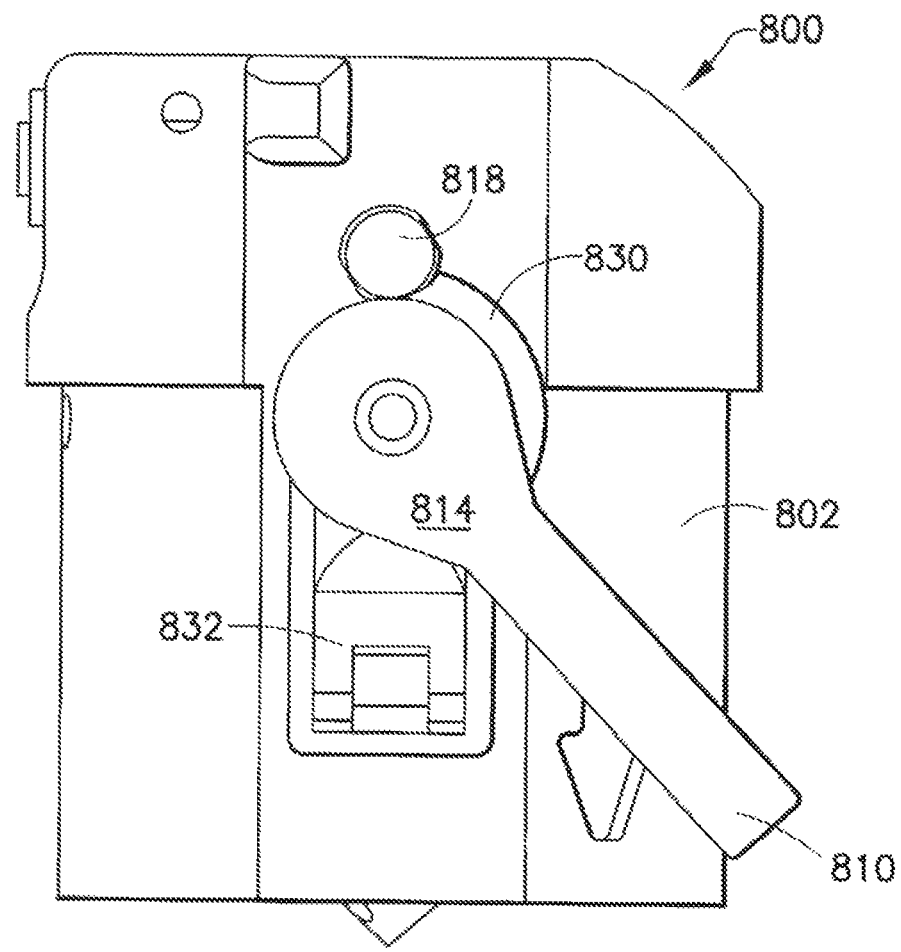
FIG. 60 is a side elevation view of the connector shown in FIG. 59.

FIG. 60 is a side elevation view of the connector 800 of FIG. 59, wherein all parts and features are correspondingly numbered.

Figure 61:
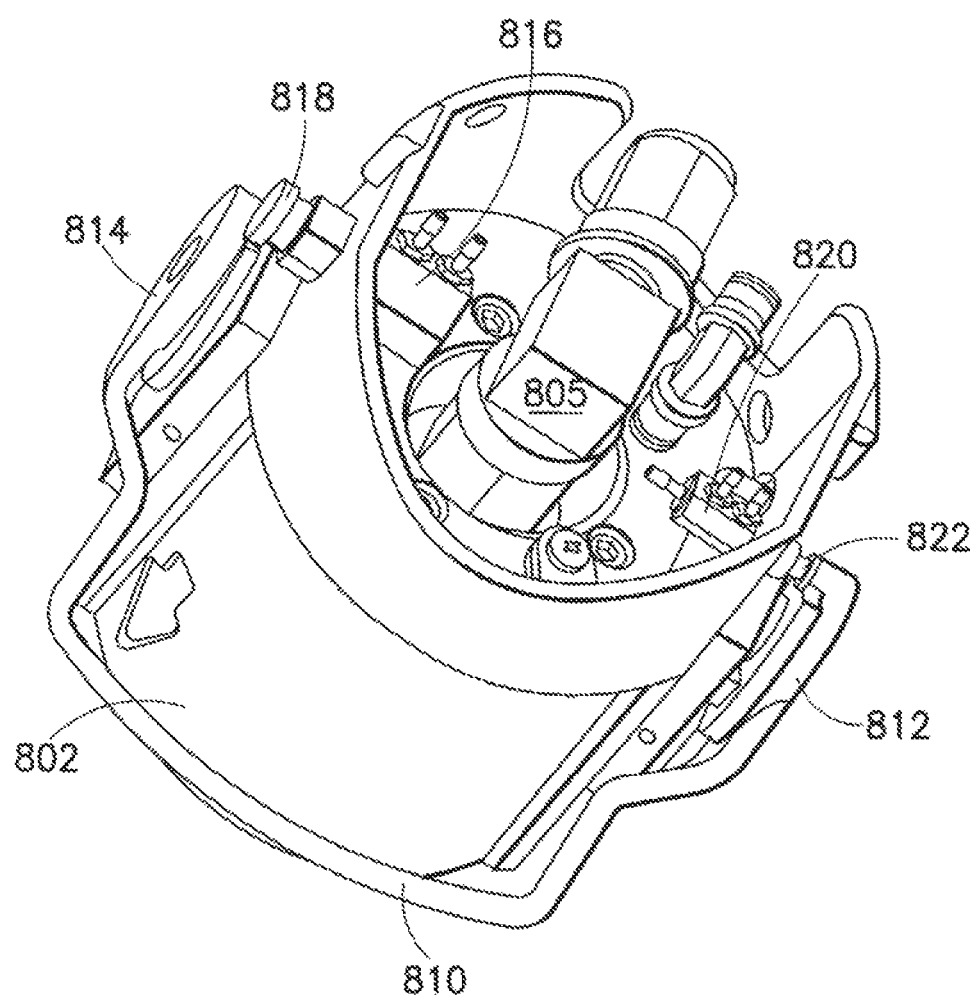
FIG. 61 is a prospective view of the connector of FIGS. 59 and 60, showing details of construction of such connector.

FIG. 61 is a corresponding perspective view, also labeled correspondingly with respect to the reference numbers shown in FIGS. 59 and 60.

As shown in FIGS. 59-61, when the handle 810 is in a down position, the depressible button 818 and depressible button 822 are biased to an outward position, which as shown in FIG. 60 prevents rotational movement of the handle 810, by virtue of the cam surface of the cam element 830 on the axle at each side of the handle.

Thus, when the connector is coupled to a material storage and dispensing vessel, and the handle is rotated to a down position, the spring-biased depressible buttons "pop out" from their associated housing and lock the handle in the down position.

Subsequently, when it is desired to depressurize the pressurized vessel and to disengage the connector from the vessel, the depressible buttons 818 and 822 are depressed, thereby actuating the pressure relief devices 816 and 820 to vent the overpressure to the ambient environment of the package. In another alternative to the arrangement shown, only one, rather than both of such buttons, is employed to actuate the pressure relief action. When the overpressure has been vented from the vessel, the mechanical locks 832 on the sides of the housing can be disengaged from the vessel by moving the handle upwardly to automatically open the locks. Referring to FIG. 60 it is seen that the locking of the handle 810, by the "pop-out" action of the depressible button on the pressure relief device, prevents the mechanical locks 832 from being actuated, since they are overlaid by the flanged portion of the axle of the handle.

As a result, there is provided a safe package configuration that avoids the hazard of inadvertently dispersing pressurized contents of a vessel when the connector is disengaged.

Figure 62:
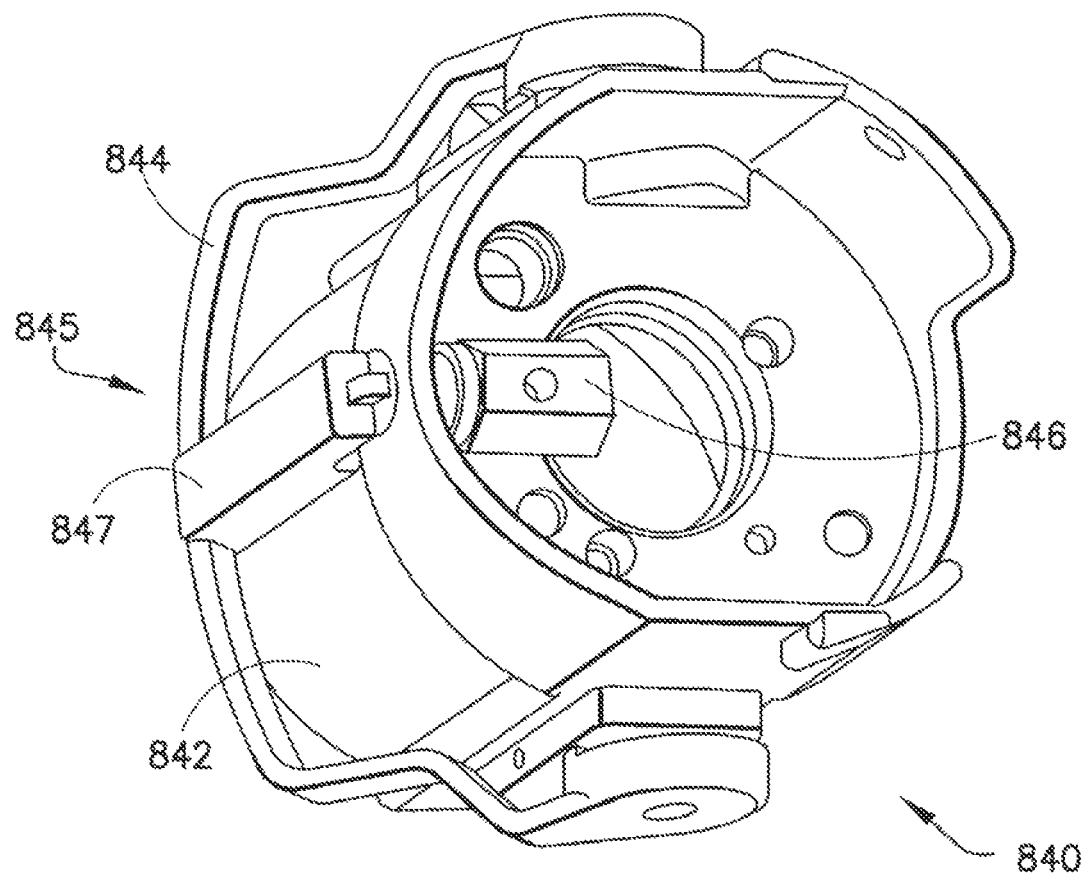
FIG. 62 is a perspective view of a connector according to another embodiment of the invention.
Figure 63:
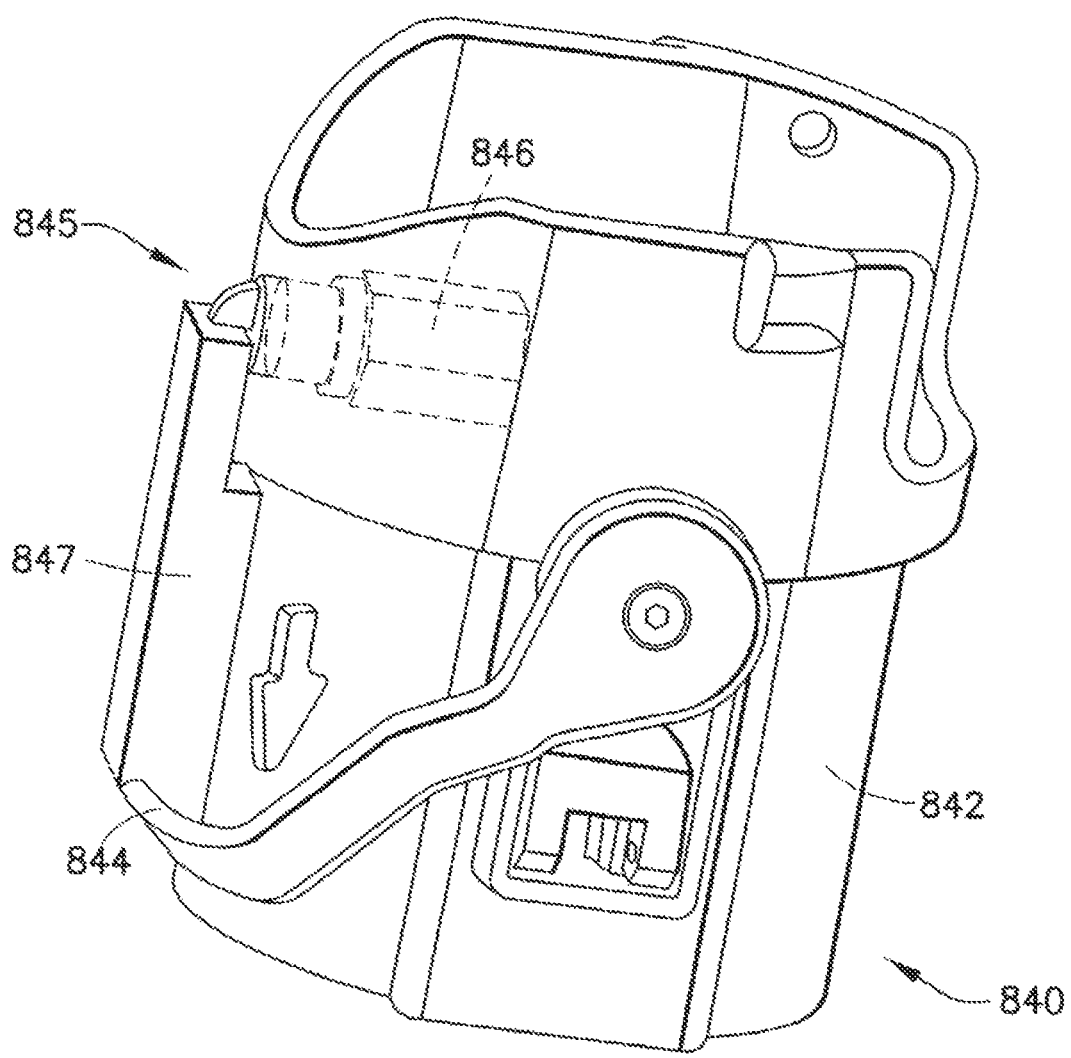
FIG. 63 is a perspective schematic representation of the connector of FIG. 62, showing the action of the release lever handle.

FIG. 62 is a perspective view of a connector 840 according to another embodiment of the invention.

The connector 840 includes a main body portion 842 on which is mounted a release lever in the form of handle 844. The connector in this embodiment is provided with a three-way pressure release device 845 including a slide member 847 coupled to a main body 846 of the device. When the handle 844 is lowered, the handle slides past the slide member 847 of the pressure relief device 845 and the slide member thereupon locks the handle in position, as shown in the perspective schematic view of FIG. 63, so that the handle 844 thereafter cannot be lifted or upwardly rotated, being secured by the slide member 847.

Subsequently, when it is desired to disengage the connector, the slide member 847 is manually translated in an upward direction, so that the slide member is lifted above the handle 844. The handle 844 thereupon is permitted to freely pivotally rotate upwardly, since the upward translation of the slide member 847 actuates the pressure relief device 845 to exhaust the overpressure from the vessel through the main body 846 of the device. In this manner, a hazardous overpressure condition is avoided, when the connector is disengaged from the associated vessel.

Figure 64:
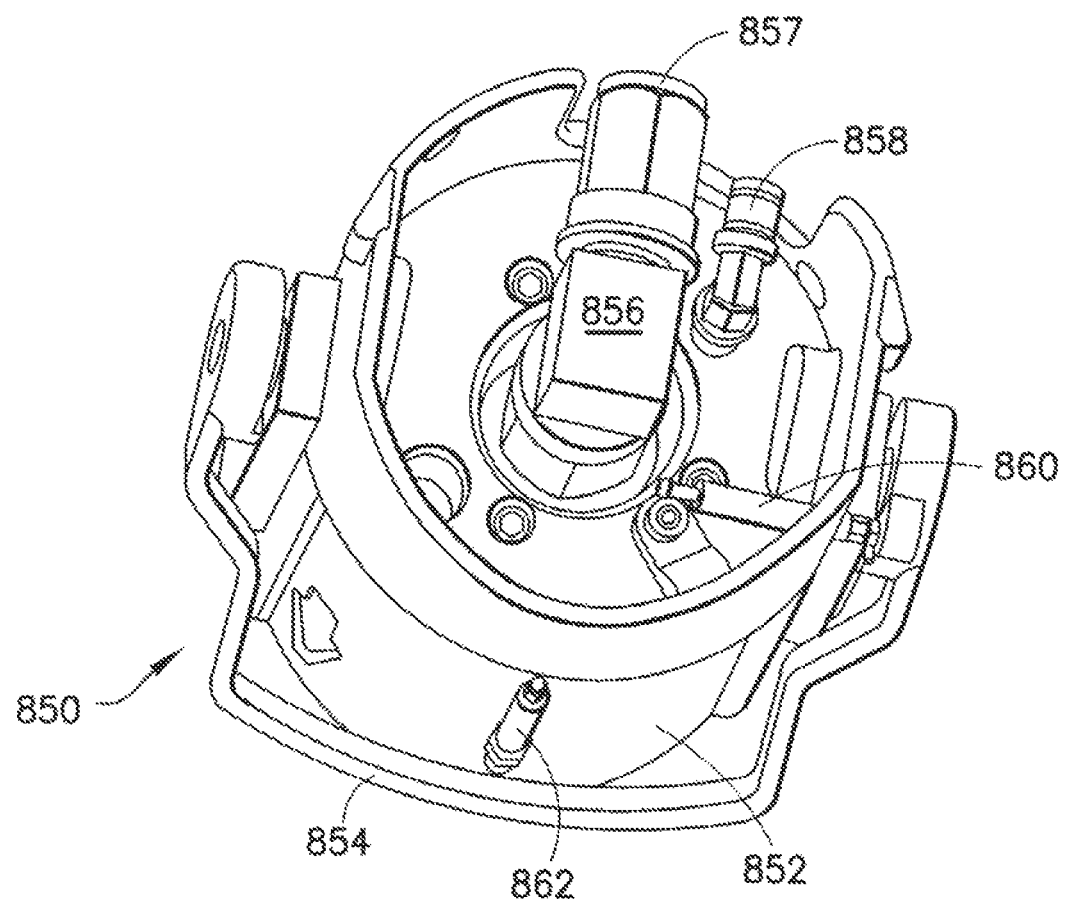
FIG. 64 is a top perspective view of a connector according to yet another embodiment of the invention, featuring two distinct handle locking mechanisms.

FIG. 64 is a perspective view of a connector 850 according to another embodiment of the invention, wherein two different types of locking mechanisms are illustratively employed.

The connector 850 shown in FIG. 64 includes a housing 852 having a top surface including a dispense fitting 856 defining a dispense port 857, and a pressurizing fitting 858 through which a pressurized gas may be directed to facilitate egress of material from a vessel associated with the connector.

The connector 850 features a handle 854, which may be locked into position by action of the cylinder 862 or alternatively, or additionally, by the action of the cylinder 860.

The cylinder 862 thus can be actuated to translate the cylinder or a projection member thereof downwardly against handle 854, to lock the handle in position against further movement.

The handle also, or alternatively, can be immobilized by translation outwardly of a portion of the cylinder 860, so that the cylinder or a projection therefrom engages the axle of the handle and prevents rotational movement of the handle about the axis defined by the axle portions of the handle.

Figure 65:
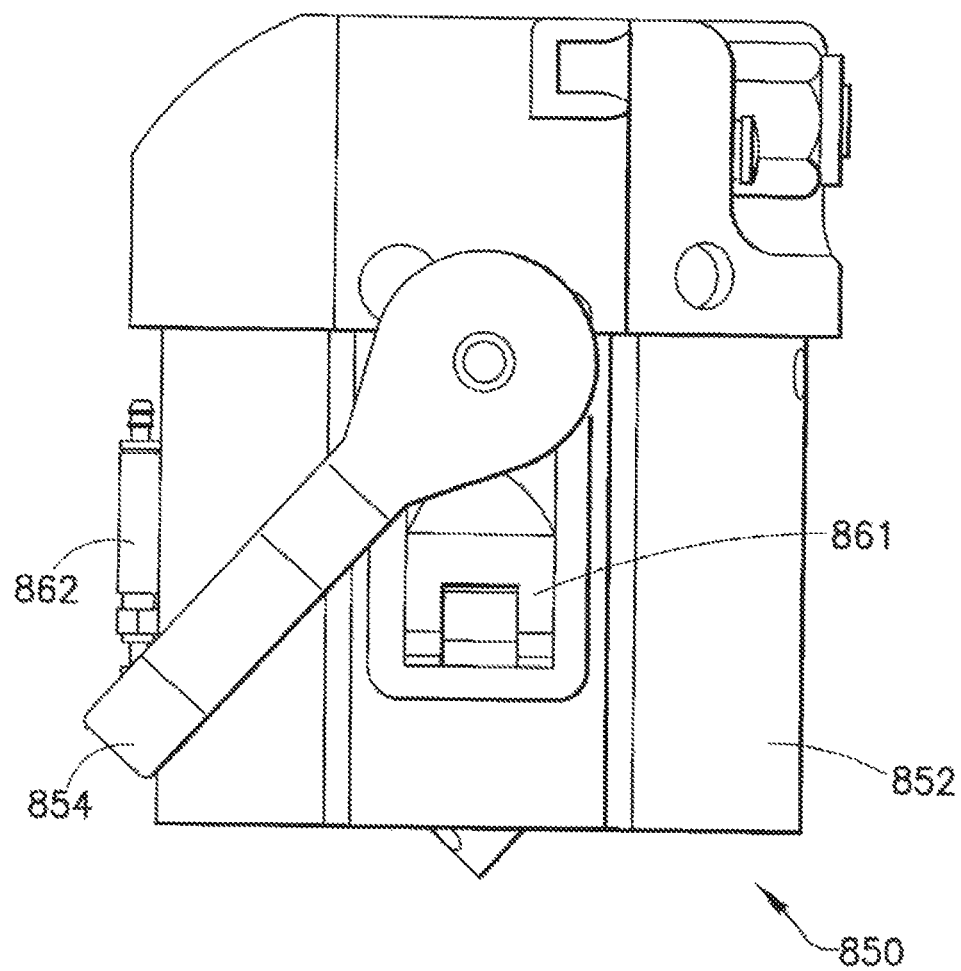
FIG. 65 is a side elevation view of the connector of FIG. 64.

Referring to FIG. 65, wherein all parts and features are correspondingly numbered with respect to FIG. 64, the handle 854 is shown as having been locked by cylinder 862 as a result of a projection element being extended from cylinder 862 to bear against handle 854 and thereby lock it in position.

In the locked position, the axle portions of the handle 854 cover the mechanical locks 861, so that the mechanical locks cannot be depressed to remove the connector from the vessel.

Figure 66:
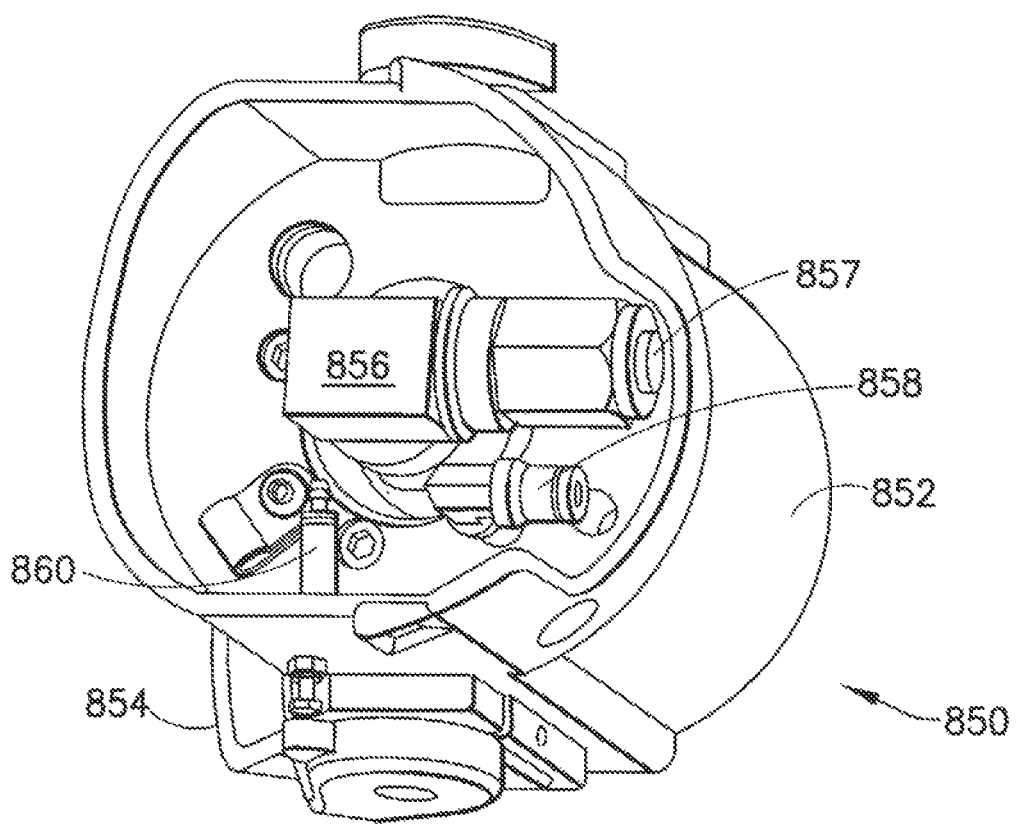
FIG. 66 is a top perspective view of the connector of FIGS. 65-65.

FIG. 66 is a perspective view of the connector shown in FIGS. 64 and 65, wherein all part and elements are correspondingly numbered. In this embodiment, the cylinder 860 on the top surface of the connector has a protruding portion that is translatable to effect engagement with the axle of the handle 854, so as to lock same in position. For this purpose, the axle of the handle may have an opening or cavity therein, which is engaged by the projection portion of cylinder 860, to restrain the handle 854 against movement.

Figure 67:
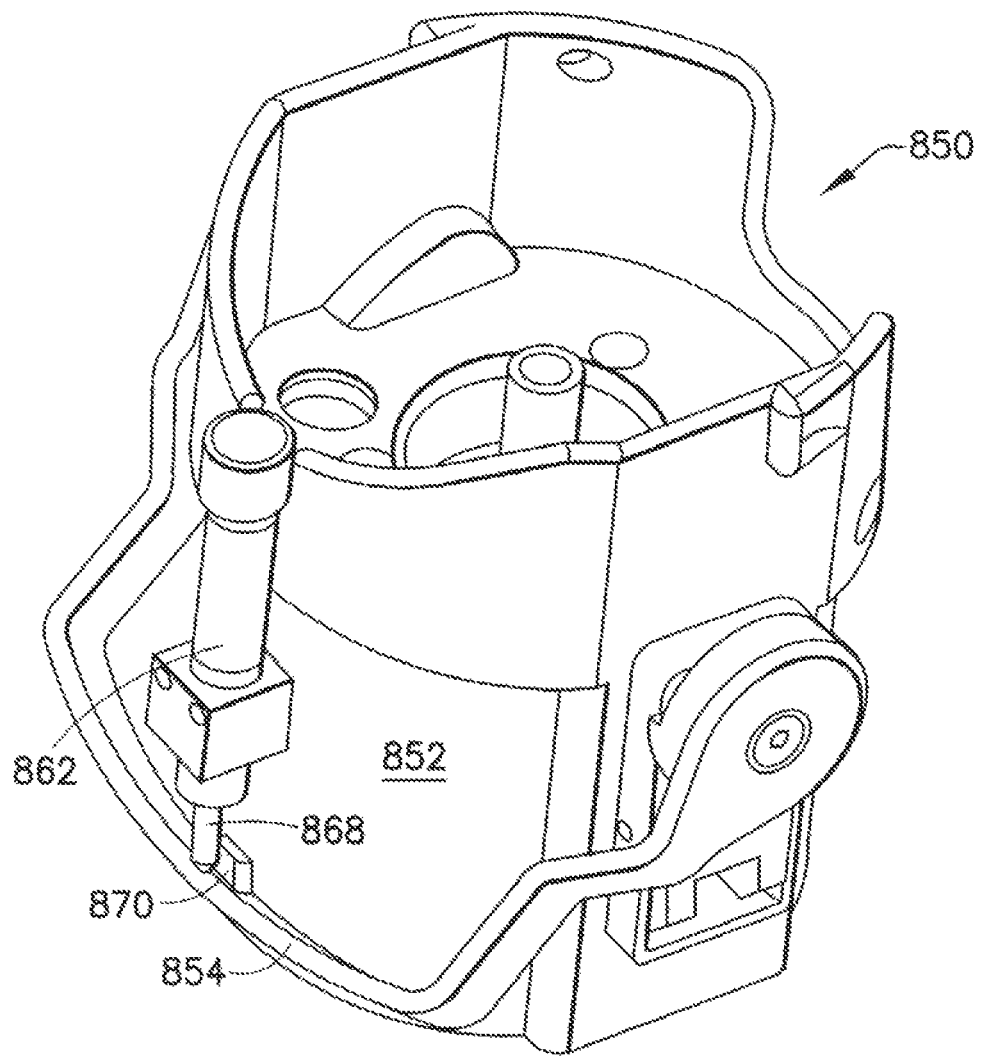
FIG. 67 is a perspective view of a connector utilizing one of the locking mechanisms illustrated in FIGS. 64 and 65.

FIG. 67 is perspective view of a connector 850 of a general type as shown in FIG. 64, but with only a single locking element, in the form of cylinder 862. From this cylinder is extended a locking projection element 868 that bears against the handle 854 and engages a receiving cavity 870 in the handle surface.

It will be recognized from the foregoing that a variety of handle immobilization elements and overpressure relief arrangements can be provided, whereby overpressure conditions existing in a vessel can be safely accommodated, so that the connector is not disengaged from the vessel with consequent occurrence of dispersion or spraying of contents of the vessel to the ambient environs.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

The invention claimed is:

1. A connector for a material storage and dispensing package, comprising a main body portion, including a handle mounted on the main body portion and pivotally translatable thereon, between an up position, and a down position, wherein the connector is adapted to be coupled with a material storage and dispensing vessel for closure thereof, and the connector includes a dispensing assembly for dispensing material from the vessel, and a pressure relief device operatively coupled with the handle and adapted when the handle is in the down position to prevent removal of the connector from the material storage and dispensing vessel, and a stop element operatively coupled with the pressure relief device to maintain the handle in the down position when the handle is pivotally translated to such down position, the stop element being selectively disengageable to cause the pressure relief device to vent the vessel to an ambient pressure, and to allow the handle to be pivotally translated upwardly, and with the connector thereafter being disengageable from the vessel when the handle is in the up position, whereby disengagement of the connector from the vessel is enabled to occur at said ambient pressure.

2. The connector of claim 1, wherein the pressure relief device is operatively coupled with the handle at each of opposite ends thereof and the handle at said opposite ends comprises axle portions coupled with the main body portion of the connector.

3. The connector of claim 2, comprising two of said stop elements, wherein each of the axle portions comprises a cam surface engageable with a corresponding one of said stop elements, and each of said stop elements comprises a button that is spring-biased to a locking position preventing movement of the handle, and that is manually depressible to disengage it from its locking position, and thereupon to enable movement of the handle.

4. The connector of claim 1, further comprising a pressurizing gas inlet assembly adapted for flow of pressurizing gas into the vessel when coupled with the connector.

5. The connector of claim 1, wherein the stop element comprises a cylinder that is selectively actuatable to cause extension of a protrusion element for engagement with the handle, and de-actuatable to cause retraction of said protrusion element disengaging the protrusion element from the handle.

6. The connector of claim 5, wherein the protrusion element is translated by action of a biasing spring coupled therewith.

7. The connector of claim 1, further comprising a pressurized gas inlet, for pressure-assisted dispensing of material from the vessel through the dispensing assembly of the connector.

* * * * *